US006640239B1

(12) United States Patent
Gidwani

(10) Patent No.: US 6,640,239 B1
(45) Date of Patent: Oct. 28, 2003

(54) APPARATUS AND METHOD FOR INTELLIGENT SCALABLE SWITCHING NETWORK

(75) Inventor: Sanjay M. Gidwani, Saratoga, CA (US)

(73) Assignee: Garuda Network Corporation, Fremont, CA (US)

( * ) Notice: Subject to any disclaimer, the term of this patent is extended or adjusted under 35 U.S.C. 154(b) by 0 days.

(21) Appl. No.: 09/437,557

(22) Filed: Nov. 10, 1999

(51) Int. Cl.[7] ............................................... G05F 15/16
(52) U.S. Cl. ........................ 709/203; 709/217; 370/353
(58) Field of Search ................................. 709/203, 219, 709/250, 217, 226; 370/353

(56) References Cited

U.S. PATENT DOCUMENTS

| | | |
|---|---|---|
| 4,985,891 A | 1/1991 | Fujiwara et al. |
| 5,430,722 A | 7/1995 | Jacob et al. |
| 5,805,600 A | 9/1998 | Venters et al. |
| 5,905,781 A | 5/1999 | McHale et al. |
| 5,926,480 A | 7/1999 | Deschaine et al. |
| 6,052,365 A | 4/2000 | Bhagalia et al. |
| 6,442,529 B1 * | 8/2002 | Krishan et al. ............... 705/14 |
| 6,452,925 B1 * | 9/2002 | Sistanizadeh et al. ....... 370/352 |

* cited by examiner

Primary Examiner—Zarni Maung
(74) Attorney, Agent, or Firm—Blakely, Sokoloff, Taylor & Zafman LLP

(57) ABSTRACT

An intelligent scalable switching network. The present invention provides a unified Internet portal server (UIP Server) having multi-line capability, and a unified Internet portal client (UIP Client) incorporating functionality of a Customer Premise Equipment (CPE) DSL Modem, wherein the UIP Client is capable of communicating with the UIP Server via a network to provide a service to a subscriber using the UIP Client. According to the invention, the UIP server comprises a single server chassis incorporating all of a plurality of processing elements. In addition, the UIP Server is located remote from a Subscriber Location (SL) and is capable of providing a plurality of services using a Digital Subscriber Line (DSL). The UIP Client is located at the SL and is capable of deploying DSL capability on a single communication line.

77 Claims, 38 Drawing Sheets

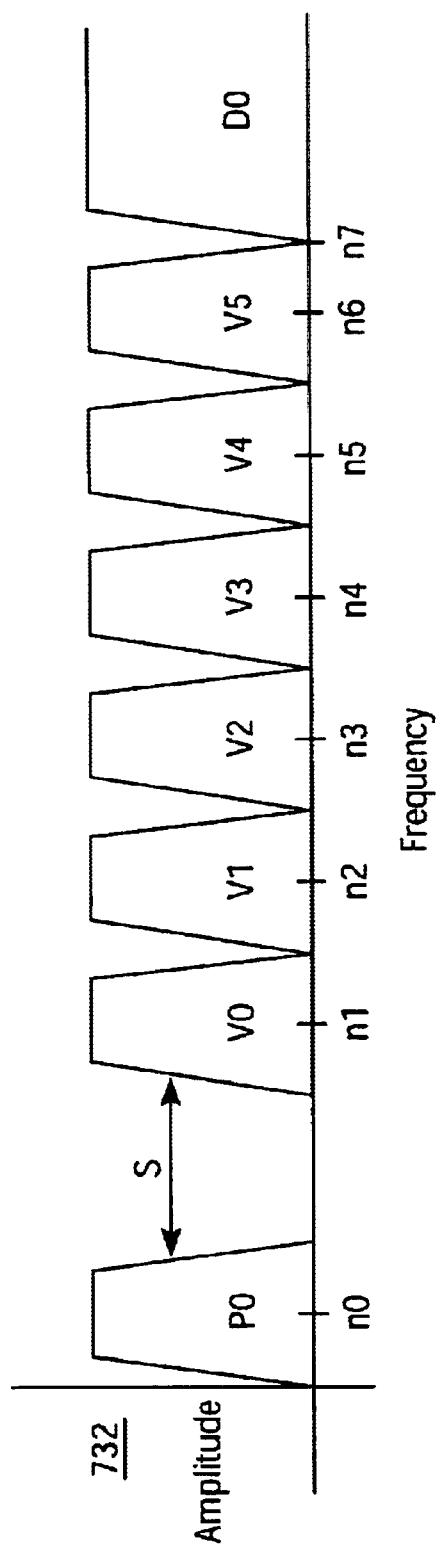
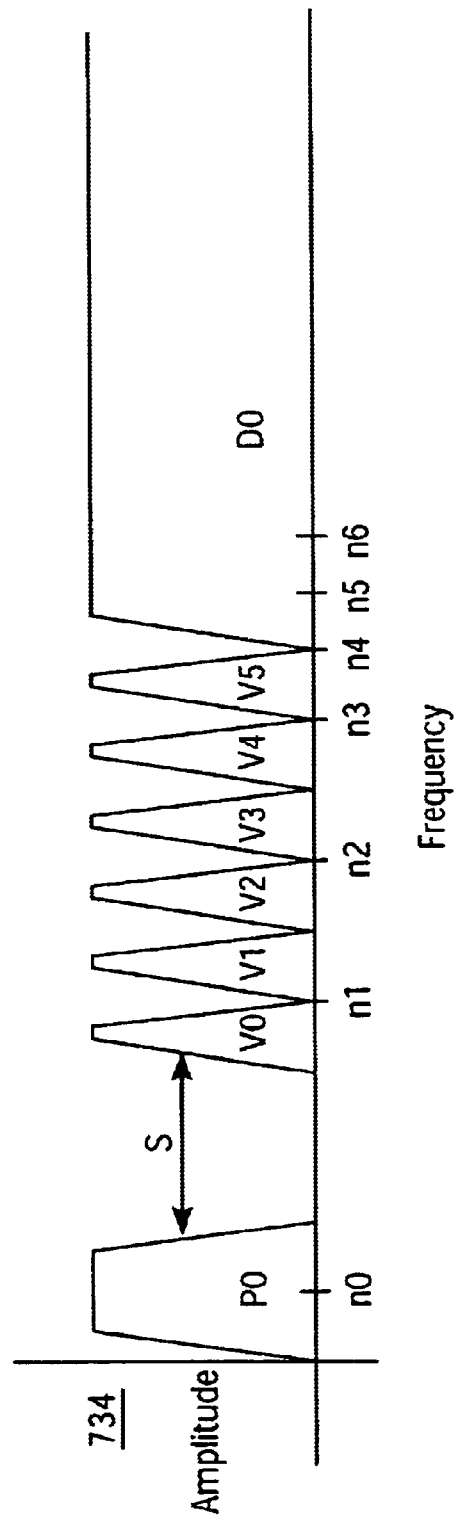
FIG. 12a
FIG. 12b

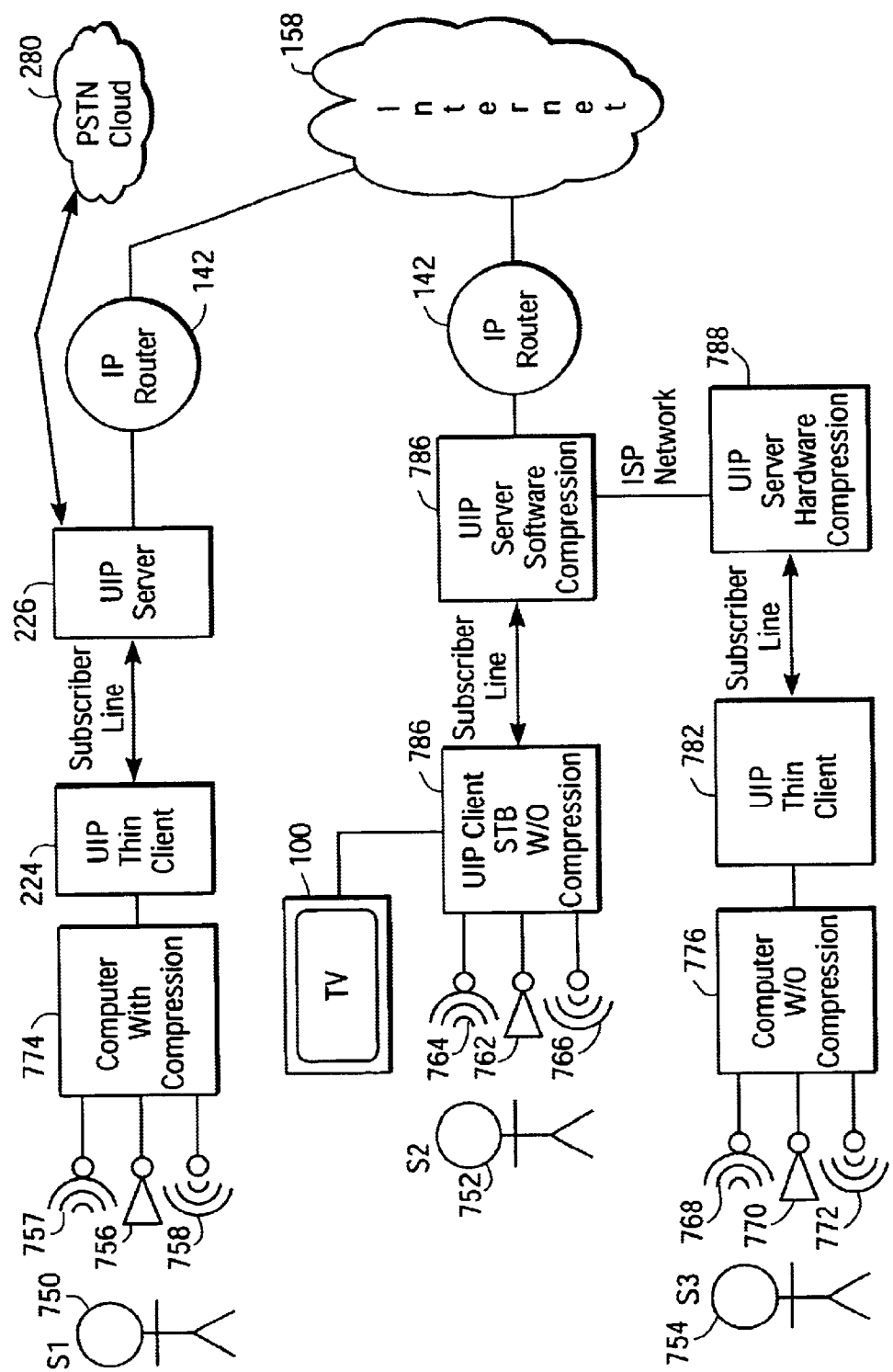
FIG. 13    Video Conferencing Deployment Diagram

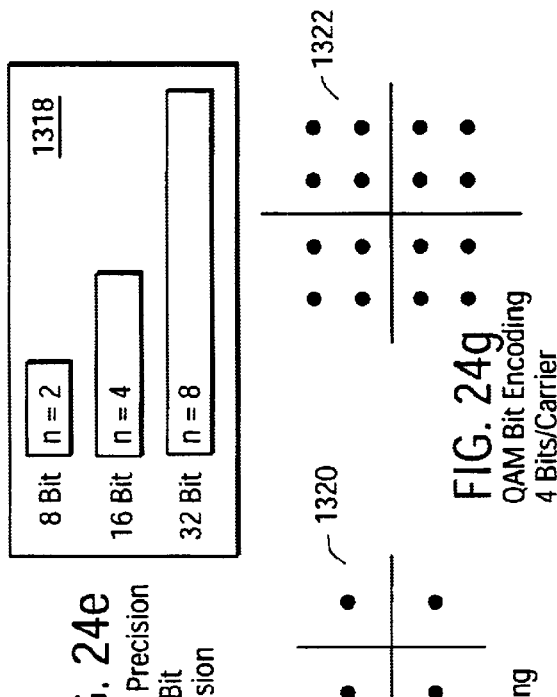
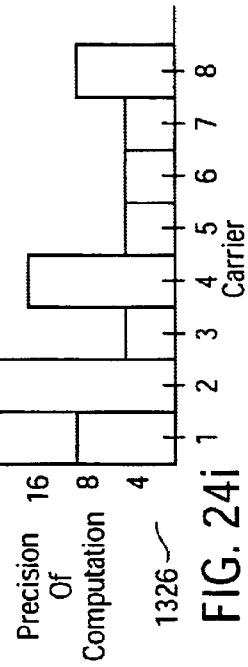
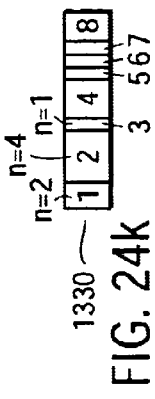
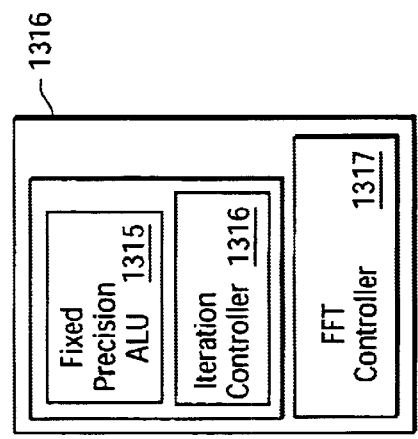
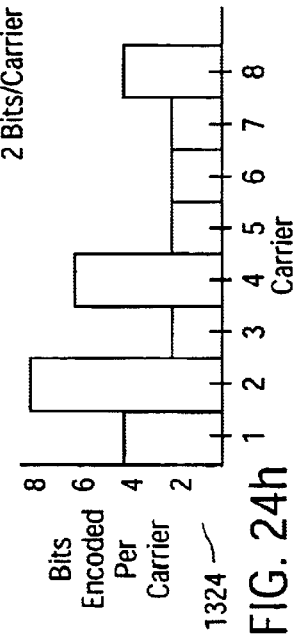
FIG. 24d
FIG. 24e — Fixed Precision Four Bit Extension
FIG. 24f — QAM Bit Encoding 2 Bits/Carrier
FIG. 24g — QAM Bit Encoding 4 Bits/Carrier
FIG. 24h
FIG. 24i
FIG. 24j
FIG. 24k

APPARATUS AND METHOD FOR INTELLIGENT SCALABLE SWITCHING NETWORK

FIELD OF THE INVENTION

The present invention relates to Computer and communication networks and, more particularly, to methods and apparatuses for an intelligent scalable switching network.

BACKGROUND OF THE INVENTION

The explosive growth of the Internet and the world wide web's increasing multimedia content is placing great demand on the telco local loop infrastructure. The advent of Internet telephony coupled with the increasing need for video services, such as video conferencing, video mail, video on demand, and Television over IP, promises to grow into an unprecedented market opportunity An integrated telecommunications device capable of supporting Internet telephony, high speed Internet access, next generation video services, and data communications is urgently needed to expand broadband residential and remote services. The present invention substantially fulfills this need.

SUMMARY OF THE INVENTION

The present invention provides methods and apparatus for implementing an intelligent scalable switching network. In one aspect, the present invention is an apparatus comprising a unified Internet portal server (UIP Server) having multi-line capability, and a unified Internet portal client (UIP Client) incorporating functionality of a Customer Premise Equipment (CPE) DSL Modem, wherein the UIP Client is capable of communicating with the UIP Server via a network to provide a service to a subscriber using the UIP Client. According to the invention, the UIP server comprises a single server chassis incorporating all of a plurality of processing elements. In addition, the UIP Server is located remote from a Subscriber Location (SL) and is capable of providing a plurality of services using a Digital Subscriber Line (DSL). The UIP Client is located at the SL and is capable of deploying DSL capability.

In another aspect, the present invention provides a method for providing an intelligent scalable network. According to the invention, the method comprises (a) providing, at a location remote from a Subscriber Location (SL), a unified Internet portal server (UIP Server) having multi-line switching capability, wherein the UIP Server is capable of providing a plurality of services using a Digital Subscriber Line (DSL); (b) incorporating all of a plurality of processing elements within a single UIP Server chassis; (c) providing, at a Subscriber Location (SL), a unified Internet portal client (UIP Client), wherein the UIP Client is capable of deploying DSL capability; (d) incorporating functionality of a Customer Premise Equipment (CPE) DSL Modem in the UIP Client; and (e) providing for communication of the UIP Client to the UIP Server via a network, whereby the UIP Server is capable of providing a service to a subscriber using the UIP Client.

As discussed more fully below, use of the present invention allows for many features and advantages, depending on the configuration of the various embodiments of the present invention.

1. Incorporation of a Digital Cross Connect Functionality Within a Single Server Chassis One of the innovative characteristics of an embodiment of the present invention is that a multi-line switching capability is incorporated. The incorporation of the multi-line switching capability gives this embodiment the capability of effecting a digital cross connect functionality within a single server chassis of the present invention. The digital cross connect functionality enables it to statistically multiplex the subscriber side interface in an efficient manner.

The digital cross connect capability relies on the principal that only a few subscribers need to actively be on the network at a given time, whereas a larger number of subscribers would at some time like to have connectivity to the network. The advantage of the over-subscription due to the digital cross connect is that the service provider is able to provide dial up connectivity to the network for a larger pool of subscribers, then he would be able to achieve with a dedicated connection methodology.

2. Multi-DSL per Line Capability

Embodiments of the present invention incorporate a multi-DSL configurational capability on a per line basis. A number of different types of DSL exist including but not limited to, SDSL which is Symmetric Digital Subscriber Line, ADSL which is Asymmetric Digital Subscriber Line, IDSL which is ISDN based Digital Subscriber Line. Each of these different DSL technologies have different characteristics, such as what bandwidth they can sustain, what reach they are able to accomplish DSL, and what line coding methodologies they use. For example, HDSL is a high bit rate DSL. VDSL is a higher speed based DSL. Each different DSL type addresses different requirements for different subscribers. One of the advantages of having a per line multi-DSL architecture is that the service provider is able to provide a wider selection of services to a broader customer base and thereby increase his own business viability.

Prior art methodology deploys multi-DSL capability within a chassis framework only. Within prior art there is a common chassis based connectivity and different line cards capable of supporting different DSL standards, such as SDSL, ADSL, VDSL, HDSL or IDSL, plug into the chassis on a line card basis. A given line card supports either a specific DSL standard or may support more than one DSL standard. The innovation within the current invention is that the Multi-DSL support is on a per line basis, thus unlike the prior art, a given subscribers line interface can be configured for any of the DSL standards under software configurational control.

In the prior art, a given line is configured for only one of the DSL standards. Therefore, prior art chasses steer the data from the various line cards to achieve a Multi-DSL capability on a chassis basis. One of the limitations of the prior art architectural design is that multiple types of linecards are required to deploy multiple services. Another limitation is that the multi-DSL capability is not a per line Multi-DSL in that a given subscriber line is specifically configured to the a single DSL flavor. Another limitation of the prior-art architectural design is that since a subscriber is either a SDSL, or an ADSL or another DSL standard so that re-provisioning to the subscribers DSL Standard requires service provider intervention.

The present invention deploys Multi-DSL capability on a per line basis. The present invention accomplishes the per line Multi-DSL by utilizing a more flexible front end that is simultaneously capable of addressing the needs of a number of DSL types. One specific embodiment of the current invention supports three specific DSL standards, namely, SDSL, ADSL, and IDSL. The current invention can then re-provision the line in a dynamic manner as required by the subscriber to any of the three DSL standards. The architecture of the present invention enables the subscriber to be able to deploy, for example, SDSL during the day, when perhaps its business needs require symmetric bandwidth, and, in the evening switch over to ADSL, when perhaps its requirements are asymmetric such as video on demand, broadcast TV type of applications. Another advantage of the per line basis multi-DSL capability of the present invention is that no service provider intervention is required for the dynamic provisioning and that this service capability can be re-provisioned by the subscriber based on his own changing needs and requirements.

3. Self Strapping in System Architecture

The architecture of one embodiment of the present invention is designed to be a self strapping architecture. One embodiment of the current invention incorporates a storage element, either in the form of a hard drive, semiconductor memory, or any other similar storage device. The storage element can either reside at the service provider premises or can alternatively reside remotely from the service provider premises by use of a wide area storage area network. The storage element holds the configurational capabilities and the initialization parameters for the operation of the present invention. In case such a storage device is incapable of service to the present invention for a limited or extended period of time, the present invention incorporates a self strapping methodology so that a minimal functional capability within the digital switching network is configured and that the network is capable of providing continued operation for its subscribers.

The present invention incorporates a self strapping capability within the architecture which is capable of initialization of the system. The self strapping capability of the present invention can configure its own basic functionality, and is then able to configure its own network capability. Particularly and in one embodiment, if the network element is found at a later time, the system is then able to download parameters and requirements at that time and continue operation. The self strapping functionality within the present invention makes it possible for reliability of the system to be limited by the reliability of the self strapping capability of the present invention rather than the reliability of the storage element, or the reliability of the storage area network. In this manner, the present invention is capable of meeting stringent reliability requirements while simultaneously providing much higher functionality than otherwise possible due to the low mean time between failure (MTBF) of storage elements such as hard drives or other high density storage devices.

4. Storage Element Incorporation within Apparatus

One embodiment of the present invention incorporates a storage element in the form of a local hard drive within the server chassis. The incorporation of the storage element provides a large storage device that is dedicated to a limited number of subscribers in a distributed manner. The innovative incorporation of the storage element makes it possible to provide an expanded service capability for the subscriber. The expanded capability enabled can be remote recording capability, video on demand capability, and other storage intensive capabilities.

The dedicated storage element incorporation differentiates this embodiment from the prior art in that a non-dedicated storage methodology such as a large network is not able to sustain the bandwidth and performance requirements of these storage intensive application. The storage element incorporation does not require a local hard drive but can rather be a network based storage area network. In the case of a storage area network the differentiating factor between prior art and the present invention is that there is a physical association of a storage element with a specific chassis. Moreover, the network topology is capable of supporting this relationship and performance so that the associated storage element of the present invention is able to get a guaranteed performance and delivery which is reasonably comparable to that of a local hard drive system. The present invention utilizes network based redundancy through out the network to achieve these goals.

5. ATM Based Network Interfaces

Embodiments of the present invention incorporate the capability of interfacing with an ATM network. The incorporation of the ATM interface enables the server to interface with a large number of broadband data networks that exist within the public switched telephone network system infrastructure, such as broadband ISDN and the core switching capability within the PSTN. One embodiment of the present invention incorporates an ATM based interface such as OC3, OC12, or OC48 which enables the present invention to quickly and easily interface to the existing infrastructure. Within the scope of this document the ATM based interface OC3, OC12, OC48, OC96, and OC-N, where N is an integer, are used interchangeably. The use of ATM interfaces enables the present invention to deploy Quality of Service guarantees. Furthermore, ATM is a very efficient packet based architecture and is a flexible means of delivering widely varying bandwidth and traffic performance requirements.

Another embodiment incorporates the use of Multi Protocol Label Switching(MPLS) wherein a tag is associated with the VPI/VCI combination. The designated tag is then utilized to manage Quality of service guarantee and other traffic, routing, and performance related functions. Yet another embodiment of the present invention incorporates the use of Multi protocol over ATM(MPOA). MPOA in conjunction with MPLS enables support, traffic policing, bandwidth allocation, and general quality of service control for IP based traffic such as Internet, or other computer network.

6. Video Farm Element

One embodiment of the present invention incorporates a video farm element capability. In one such embodiment, the video farm element is a DVD based optical video player architecture where a carousal is used to provide access to a plurality of video disc based media. For example, an embodiment of the present invention utilizes a DVD based front end carousal which can select one of many DVD discs. The front end carousal after selecting the specific DVD can then insert it into one of a plurality of DVD Players. The Video Farm element of one embodiment of the current invention utilizes an ATM-based interface, such as OC3, OC12, or OC48, as well as a Digital Video Broadcast (DVB) cable based infrastructure to deliver the video streams resulting from the Video Farm Element. A single video farm element and multiple video farm elements can be interconnected in various topologies to enable access to a large video database on a on-demand basis.

Use of the optical video farm element is advantageous in that it is possible to configure the embodiment so that no hard drive storage is required to have a large variety of video stream delivery. The limitation of such a embodiment is that the video stream performance is limited. One embodiment of the present invention utilizes a combination of local hard drives within the video farm element, as well as a plurality of optical drives to achieve a balance between performance and cost.

7. Cable TV Interface

The current invention also allows for incorporation of a standard cable TV interface. This interface enables efficient communication with existing broadcast infrastructures. In particular, a video farm element may be managed in a remote configuration. The output is then collated together in a DVB cable TV based head end. The head end can then transmit the video stream data using either satellite, hard wire or other means necessary to a host of other chassis residing either at the central office, a service provider premises, or at a subscriber premises. As provided herein, the terms Central Office (CO), service provider premises, central office site, and service provider UIP Server central location are used interchangeably.

The cable TV based video farm element broadcast stream as well as standard cable TV is incorporated to provide the capability of watching broadcast TV in an easy and seamless manner. Embodiments of the present invention utilize the video farm element broadcast stream a Cable TV based DVB-C interface, to concurrently deliver multi channel stream video. One embodiment of the present invention enables a specific chassis to tune to a number of digital sources and be able to isolate a single video stream on a per subscriber basis.

One embodiment of the present invention provides each subscriber his own digital tuner. In this embodiment, the subscriber is able to tune to any given broad cast signal within the network, thus the subscriber's designated tuner is responsible for delivering the selected content. One such embodiment of the present invention provides a limited number of tuners that subscribers share on an over-subscription basis. Each tuner is able to tune to a plurality of digital streams concurrently, in this regard each subscriber is assigned his own sub-channel. In particular, the Digital Video Broadcast (DVB) Cable based technology utilized within this embodiment typically has a single MHz channel that is the fundamental tuned channel. This tuned analog channel carries a plurality of digital channels. One embodiment intelligently manages these tuned analog channels and assigns up to 8 subscribers within the tuned analog channel. Each subscriber is allocated his own digital channel. In this respect only three separate analog frequencies, or tuners, are required for a 24 subscriber system. This embodiment simplifies the tuning requirements at the subscriber premises and is a cost efficient way of getting full independent tuning capability. A disadvantage of this embodiment is that specific streams within a channel would be allocated to specific subscribers, and that there would be a fixed relationship between network elements and channels. In such a topology, it would be difficult to scale beyond a finite number of total subscribers. An embodiment of the present invention circumvents this scaling limitation by having segregated network segments so that a pool of n specific subscribers are able to tune to a given network segment. The present invention enables the service provider to use either a per subscriber based tuning topology or a per chassis based tuning topology to deploy his broadcast environment.

8. Multi-Channel Statistical Multiplexing

Certain embodiments of the present invention also incorporate an innovative means of multi-channel statistical multiplexing. Statistical multiplexing in these embodiments is used to enhance the performance of network based on the fact that not all users utilize the network to the same extent. The subscriber is dynamically allowed to take up as much bandwidth as he requires and then the whole pool of subscribers are then treated on a statistical basis thus each subscriber is able to get access to more capability than he would have access to on a dedicated basis. Temporary statistical aberrations occurring as a consequence of few subscribers over utilizing their resources can be absorbed by the current invention in this manner. In this manner, most subscribers get access to a much larger bandwidth when they utilize it then the network would be able to support on a continuous basis.

The present invention utilizes a multi-channel statistical multiplexing by being able to take a number of DSL channels and essentially treat them as a single pool of DSL channels as enabled by the architecture of the present invention. The resources are dedicated on a per chassis basis rather than being dedicated on a per channel basis. The advantage for the subscriber is that every user sees a pool of resources that seems much larger than he actually ends up utilizing statistically and therefore is able to realize a much better performance than on a dedicated per line basis.

This embodiment of the present invention is differentiated from prior art in that prior art does not utilize statistical multiplexing at the processing level. In particular, when a signal is received it needs to be modulated and demodulated. For certain DSL embodiments, such as ADSL, the processing portion of the modulation/demodulation represents a large portion of the total resource requirements of the channel. Prior art implements such functionality on a per line basis. The present invention shares this processing power as a pool of resources and the processing power is utilized in the most conservative manner. A large percentage of the processing capability, such as the Fourier transform and other processing intensive portions of wire signal modulation and demodulation are shared across a plurality of lines within the present invention.

The disadvantage of the prior art methodology in an always on DSL technology is that when the user is not utilizing his maximum bandwidth the processing capability is sitting idle. The present invention uses that residual idle processing capability to be able to generate a pool of processing capability and then allocates it on a required bandwidth basis. The present invention thru the use of multi-line statistical multiplexing and front end activity detectors provides the always on capability in addition to the shared processing pool and the resultant cost reduction.

The use of statistical multiplexing within the present invention enables the ability to provide dynamic provisioning capability so that every subscriber is able to provision his own services without the intervention of the service provider. In addition to the cost aspects, the present inventions innovative use of shared multi-line statistical multiplexing allows the subscriber to utilize the bandwidth as he needs it on a transport load bases rather than a maximum bandwidth basis. The subscriber is able to utilize the bandwidth as he needs it and at times he is able to peak and go over his general subscribed levels. The service providers deployment model is simplified in that he can simply monitor total processing utilization numbers and total load factors to determine over-subscription and resource allocation needs of the network.

The present invention by the use of multi-line statistical multiplexing therefore provides a new means and level of network performance prediction and control. The current invention enables a new tiered billing methodology based on a level of service agreement. For example, when the level of service agreement is exceeded, such as at peak time, a tiered billing agreement can exists and subscriber can be charged more based on exceeding the basic service agreement.

9. Dynamic Provisioning

The present invention incorporates a means for enabling dynamic provisioning from the customer premises. In one embodiment of the present invention the subscriber is able to configure the performance of his services directly from the subscriber side to the service provider server. The present invention can achieve this dynamic provisioning capability without requiring any intervention from the service provider. The service provider configures the limiting parameters of the service offering, such as maximum bandwidth allowed, typical quality of service performance level, or the different type of DSL allowed. The subscriber then select either a semi dynamic profile or a dynamic profile. A semi dynamic profile enables the subscriber to simply select a given bandwidth and performance characteristic of his service and set this as the preferred configuration. A dynamic profile enables the subscriber to negotiate a specific bandwidth on a per application basis or on a per session basis.

The present invention is able to achieve the dynamic provisioning capability as a consequence of several innovations within the architecture. In one embodiment of the present invention, a multi-DSL capability is incorporated which enables the subscriber to choose the type of DSL selected. The subscriber can select the DSL flavor base on his immediate application requirements. The subscriber can select a symmetric DSL technology in case of symmetric applications thus if the subscriber wants to utilize a 1.5 megabit symmetric capability he is able to do so. Alternatively, if the user wants to select an asymmetric DSL technology in case of asymmetric application requirements he is able to do so.

The incorporation of the dynamic provisioning capability is advantageous to the service provider in that the network is able to defray congestion by not being mandated to maintain a service level when the subscriber is not utilizing any bandwidth. This provides a more expanded and unified service capability and enables the service provider to attract a larger customer base.

The use of dynamic provisioning, coupled with traffic conditions of the network and the time of day it is used, provide a tiered service rates structure that is capable of dynamically billing bandwidth usage. Within one embodiment of the present invention, symmetric bandwidth during the day costs more than symmetric bandwidth during the night. Thus, the service provider is able to maximize profits by aggressively targeting customer usage patterns.

One embodiment of the present invention also utilizes the dynamic provisioning capability to simplify deployment. The service provider configures all lines to be configured for a specific range of performance and DSL technology. When the subscribers' line is installed and he subsequently establishes connectivity for the first time, the subscriber is presented with a dynamic provisioning browsing screen. The subscriber can select the specific features of his service at this time automatically. At this time special promotions can be offered to the subscriber by the service provider.

10. Multi-Service Capability

One embodiment of the present invention provides the capability of simultaneously supporting multiple services such as Video, Voice and Data within a single chassis. The ability of providing multi-service model is one of the enabling technologies for providing the unified communications model in the next section.

11. Unified Communication Capability

An embodiment of the present invention incorporates the capability for a unified communications methodology. The present invention enables the subscriber to innovatively access multiple services in an unified, easy and useful manner. The unified communications model also enables the capability of managing quality of service based on a applications levels. One embodiment of the present invention utilizes the unified communications model to specify quality of service classes based on the applications within the unified communication model and thereby manages quality of service across the network.

One embodiment of the present invention assigns a certain quality of service characteristics to the video on demand application, and different quality of service (QoS) characteristics to other services such as distance learning. Thus, although the same type of transport and network is used, differing QoS characteristics are easily managed. In one embodiment, the specific application within the unified communication model in conjunction with the subscribers selected performance levels are used to assign the QoS parameters. The association of the QoS with the application service is done at the subscriber since all services congregate at the subscriber and the subscriber is capable of managing performance characteristics dynamically thru use of dynamic provisioning.

Furthermore, an embodiment of the present invention has the capability to charge on a per service request basis. Depending on the subscriber's service level agreement and his dynamic provisioning selection, one embodiment can charge the subscriber based on the application type used rather than the traffic type used.

Still further, one embodiment of the present invention incorporates the capability of a unified internet portal at the service provider side of the subscriber line interface. This embodiment is able to realize optimized performance from the subscriber perspective. In particular, when service data is available at one end of the wire and a request is made at the other end of the wire the transmission across the wire becomes the primary limiting factor, so long as devices at both ends of the wire are capable of supporting the application requirements adequately. Due to increasing computational speeds of personal computers the subscribers end is reasonably well equipped to adequately support the application demands. The embodiment described is specifically designed to support the necessary application requirements and is able to limit the network performance to simply the limitations of the wire interface.

The unified communication model makes it possible to access any service within the unified portal that are available to the subscriber in the highest performance manner possible within the network. Any data that is required beyond the unified portal is limited first by the same wire limitations but in addition such data is further limited by other network latencies and delays. The unified communication portal model always guarantees the highest performance possible for the subscriber. In addition to applications that require storage at the unified portal server, one embodiment utilizes the capacity of the unified portal server as a user cache. User data is stored within the network at the users server in a distributed manner for the group of subscribers. When the subscriber requests any specific services such as broadcast TV, video on demand, among others the content is delivered from the portal server to the subscriber directly.

In one embodiment, the unified portal is able to further the content down the wire right to the subscriber premise equipment. The limitation of pushing the data to the subscriber is that such configuration mandates an intelligent customer premise equipment, such as a computer with a hard drive, or a set top box. An intelligent customer premise equipment would increase the cost to the user over an unintelligent customer premise equipment. Furthermore, due to the dedicated nature of such a customer premise equipment and due to physical separation between individual customer premise equipment no sharing between multiple subscribers is generally possible. The service provider based unified portal residing at the service provider premise attracts a larger customer base because no high density storage is required at the subscriber premises, and thus inherently simplifies the deployment model for the subscriber. In one embodiment of the present invention a set top box has the capability of not only connecting to the network, but also of requesting the data either from the server or storing it within the customer premise equipment.

12. Routing Capability

One embodiment of the present invention incorporates a switching and routing capability. In one form, the invention incorporates an ATM switch within the service provider server. In addition to the switching capability enabled by the use of the ATM switch, an embodiment of the present invention also incorporates a routing capability within the service provider server. The routing module can maintain either a localized routing table within the distributed architecture of the network or else comprehensive routing tables can be maintained within a centralized architecture. The local routing tables within the distributed service provider servers can be synchronized and maintained thru the use of the interconnection network. The distributed routing architecture utilizes a distributed routing table at the service provider server location to look up addresses that cannot be resolved thru the immediate history of the ATM switch.

In one embodiment, when an ATM connection is setup a VPI/VCI is assigned based on a routing lookup based structure. The VPI/VCI directs the incorporated switch and the switch at the next layer the information for forwarding the packet. The packet forwarding occurs at a reasonably high speed and thus the ATM switch has to be able to maintain the wire speed. The server architecture requires the performance rate of the ATM switch to be at least one or two orders of magnitude greater than the routing resolution performance.

The routing performance within one embodiment of the present invention is significantly slower than the packet switching capability. When the ATM switch is unable to resolve the packet path on a VPI/VCI basis, the whole packet is scheduled for a routing action. The server uses the VPI/VCI and the packet information to attempt to achieve a local routing resolution. The local routing resolution is a historical cache of previous routes resolved. If this embodiment is unable to resolve the packet path from the local tables, the system then attempts to resolve the packet path utilizing the comprehensive routing table, that may reside remotely. If the system is further unable to resolve the packet path, it then executes a sequence of algorithms to attempt to locate the receiving end of the packet. Upon successful resolution of the packet path, the system forwards this information to the ATM switch, the comprehensive routing table, and the local routing table to begin forwarding the packet and to store the forwarding information within its tables.

13. Data Striping Capability

Another embodiment of the present invention incorporates a striping methodology for video on demand and general data striping. One embodiment of the present invention subdivides a stream of data into smaller pieces and distribute it in an intelligent manner across the network. The objective of the subdivision of data is that if the data is requested by multiple users at different times than a single server may be incapable of supporting the service load. By subdividing the data across the network the system is able to achieve a level of predictability and better network performance. Data striping is a means of load balancing the network so that if multiple subscribers serviced by a single server request an otherwise excessive service load then the service load is distributed across the network and no one server is overburdened.

This is accomplished in that the total load requirements are not solely the responsibility of the subscriber server, but rather are averaged across the network in a predetermined manner. One embodiment of the present invention attempts to optimize multiple levels of striping. In particular, striping occurs at the overall network level so that data is spread across a number of different servers across the network. As an example, if the network includes eight different servers and the required service happens to be a VOD movie than one eighth of each movie can-be striped across each of the servers. Thus, regardless of which specific subscriber requests a which specific movie, all servers will have an effective load of $\frac{1}{8}$th to be able to service any given request.

The striping within one such embodiment is done in such a manner that the first one eighth of the movie comes from the first server, the second eighth of the movie comes from the second server and so on. Consequently, there is a predictive behavior for the rest of the network in terms of what is going to occur at the next discrete time interval. For example, once a specific movie is requested, it is known ahead of time which server is responsible to deliver the first eighth of the movie. Furthermore, it is already known that server 2 for the specific movie will have a load after the time for the first eighth of the movie has elapsed.

In addition to the multi-server based striping methodology, one embodiment of the present invention expands on the striping model in that it includes the concept of a proxy server. When service of a striped data set is requested the system is able to make reliable prediction in regards to the subsequent loads from the various servers. Thus it is possible to project that a subsequent server will experience congestion based on the history of service requests. When congestion is anticipated the system can instead utilize a different proxy server instead of the assigned server and thereby circumvent the anticipated congestion. One embodiment of the present invention incorporates the proxy servers in a fashion so that different proxy servers are assigned to different data sets thus server n is not the proxy server for server 2 at all time, but rather any subset of proxy servers can be assigned as a proxy server for server 2 based on which data is requested by the subscriber. The striping capability in conjunction with the proxy server capability enables the present invention to balance the server load in a predictable and reliable manner.

In addition to the proxy server capability, one embodiment of the present invention also incorporates the capability of data striping within the specific storage devices within a single server. The same principle as multi-server striping is used but instead of using multiple servers the designated data is further subdivided into segments which are then striped across multiple storage elements within a given server. The upper limit to this methodology is the number of different storage devices that can reside within a single server. Assuming that a specific embodiment of the present invention has four hard drives, then the one eighth segment of the movie within the specific servers responsibility is further segmented into four sub-segments and each of the sub-segments reside within a different hard drive. The multi-storage data striping within one embodiment of the invention is a means of avoiding congestion at a given hard drive equipment level and achieving balanced data loading within a server. The multi-storage data striping can utilize different storage devices such as magnetic drives, optical drive, or semiconductor memory within a server. The use of semiconductor memory within the multi-storage striping additionally provides latency balancing in addition to load balancing. The first several seconds or minutes of a data segment are striped within semiconductor memory, such as dynamic ram or static ram. When a service request is received from the subscriber for a specific movie the initial few seconds are played from the semiconductor memory while the load tables are build and the network load balancing can occur. Any server within the network can be used to retain the first few seconds of the movie. In addition to the designated primary semiconductor memory server there also are proxy semiconductor memory servers distributed across the network that are responsible for alternatively providing the data striping few seconds within proxy caches. Consequently, this embodiment of the present invention is able to achieve very low latency between the time the subscriber requests a data service to the time the data service is delivered to the subscriber. While the short segment within semiconductor memory is exhausted, the system has computed the best scheduled bandwidth allocation based on the various load balancing algorithms and the sequence of server selection has been made to deliver a continuous data stream. In addition, in another embodiment of the present invention, the semiconductor memory and the hard drive can be alternatively used to store video clip, such as commercials and trailers, can be previews prior to the delivery of a continuous data stream.

14. Load Shedding Mechanism

One embodiment of the present invention incorporates a mechanism for load shedding within the network which further enhances the load balancing capability of the network. The present invention incorporates a intra-chassis load shedding mechanism by which a given subscriber can transparently be slotted to be managed by a different server within the network than its native server. The penalty of exercising this mechanism within one embodiment is that there is a slight latency penalty experience by the subscriber, however this is relatively insignificant in comparison to the poor bandwidth the subscriber would have experienced due to the congestion at its native server.

Tapered algorithms exist that are used to determine the level of load shedding so that as new subscribers come on line to the network, these new subscribers are then gradually negotiated thru the latent path to a non native server. In this manner, load shedding is achieved in a planned and simplified manner. The subscriber whose native server is experiencing a certain network conditions, will not be aware of any congestion, and will be completely unaffected.

One embodiment of the present invention implements load shedding at two different levels, at the line level and at the application level. In case of load shedding at the line level the processing of the line modulation and the modem capability is actually shed to a different box. Thus the native server is primarily only responsible for line interface functionality's. In case of application level load shedding, such as voice over IP, the initial digitization of the line interface, the modulation and basic modem functionality is handled by the native server, however, the application level functionality is managed by a non-native server.

15. Lifeline Service Support

One embodiment of the current invention incorporates a lifeline service capability. Life line services are those services that are required to be operational when no power is available at the subscriber premises. Within prior art the life line services are carried only over the pots lines. In the pots only configuration the power required for the service is supplied from the central office to the subscriber. The subscriber can pickup the pots line, and be able to dial out. The amount of power utilized by the subscriber during the telephone call is minimal. One embodiment of the present invention innovatively extends the support of voice service during power outages to also support the multiple voice extensions. The multiple voice extensions within one embodiment utilize packet based technology. The present invention makes it possible to deliver packetized lifeline services at the subscriber site as well as the central office site. The central office life line capability is achieved by use of a 48 V DC battery backed supply as is standard within the industry. The innovation within the central office side of the server architecture is that only the voice support and basic DSL modem functionality is active during a power outage condition, and all the basic video and data services are intelligently place in a standby mode. The service provider has the capability of over ridding the power standby mode and continuing to support specific subscribers, or specific services such as video on demand.

One embodiment of the present invention supports power conservation functionality in two distinct methods. Firstly through use of statistical multiplexing. Any resources not actively used throughout the general architecture are automatically placed in a power standby mode. In this manner power consumption is minimized.

One embodiment is further able to conserve power during a power outage by reprovisioning the Voice over IP services. VoIP services are actually data services and require power to data portions of the server architecture. However, in case of a power outage at the subscriber premises, no other data services can be utilized. Thus by reprovisioning the data portion of the service provider server, the system is able to minimize its power consumption. Basic Voice over IP services will be maintained by use of power management control.

Another embodiment of the present invention further utilizes similar power managed re-provisioned voice over IP services at the customer premise side. Specifically, incorporated within one embodiment of the present invention is the capability of managed power for the voice over IP portion of the subscriber access equipment. The voice over IP portion of the subscriber access equipment is responsible for not only the packetization and compression, but is also responsible for the basic digitization and line interface to the telephony peripherals like a telephone or answering machine.

If the subscriber premises are experiencing a power outage condition then the subscriber can chose to maintain his basic data services by use of a universal power supply. The universal power supply provides the capability of supplying the power to the devices while no line power is available. An embodiment of the present invention requires the use of a universal power supply if the subscriber chooses to maintain data services. If this embodiment of the present invention detects a line loss condition then the system is placed into a standby mode. In the standby mode data services are disabled and the basic modem capability is disabled. The service provider server is notified that the subscriber access equipment is in a standby mode. After this point, when a telephony peripheral is detected to be off hook or an incoming call thru the service provider server is detected, the system enables the voice over IP portion of the subscriber access equipment and begins minimal modem functionality for the normal operation of the telephony peripheral. Battery backup circuitry within the subscriber access equipment is designed to be automatically charged during the times when power is available to the system. During the power outage condition, the system uses the battery backup portion to derive the necessary power.

One embodiment of the present invention incorporates an indicator which reports the state of the battery backup in a power outage condition when any telephony device is detected to be off hook. Furthermore, the system further has the capability to utilize standard flashlight batteries such as AA, C, or D size, to derive the necessary power during an power outage condition. In this manner, the system makes every possible attempt to maintain voice services even during an extended subscriber power outage condition.

16. Web Caching

An embodiment of the present invention incorporates the capability of caching internet based data at the service provider server. Web caching is used to improve the realized performance for the subscriber. The system maintains a custom per subscriber based table summarizing subscriber internet data usage. For frequently used data, or custom configured data usage, or push based internet data, the system request the data over the internet and holds it in a temporary buffer at the service provider server. Subsequently, when the subscriber accesses the data the service provider server cached data is delivered to the subscriber. In this manner the subscriber realizes the highest performance across the network.

One embodiment of the present invention periodically refreshes its cache content, based on network conditions or manual request by the subscriber. An internet wide refresh token scheme is utilized by the service provider server. When any internet data is cached, a refresh token is issued by the conforming hosting server. Subsequently if a server changes its page content, the previously requesting service provider servers are notified by use of issuing a new refresh coupon. The service provider server then schedules the need for refreshing the specific internet data. At subsequent favorable network conditions, the cache is refreshed with new internet data. In case, of a non-conforming hosting server, the service provider can configure the system of either self generate the refresh request in a variety for manners, such as once only, on a specific timing interval, or on a strictly network condition basis.

The advantage of the web caching to the subscriber is that the internet data is fetched from the hosting server during previous to the subscribers request. Upon receipt of the subscriber request, the service provider server is able to immediately forward the requested data limited only by the wire limitations of the subscriber line. In comparison, if the internet data had to be fetch across the internet, then the subscriber experiences the network delay of the internet, the hosting server delay, as well as the wire limitations of the subscriber line.

One embodiment of the present invention also incorporates a statistic reporting mechanism whereby the hosting server is notified of the caching results. The view statistics are important to the hosting server. When the service provider server request for a refresh coupon based caching session with a hosting server, the previous caching results and statistics are also transmitted. The service provider can configure the nature of the reported statistics such as view hits, among others.

17. Distributed Server Model

An embodiment of the present invention incorporates the capability of a distributed server model. The prior art uses a central location for holding and storing subscriber data information. The present invention distributes intelligence across a host of service provider servers. The service provider servers are capable of subscriber line interfacing. Additionally, the service provider servers are able to respond to the requirements of the data, such as routing the data on a applications basis, or local storage, or local fetch requests.

The distributed server model also plays an intimate role in storage location decisions. Service provider administrative staff or subscribers can configure the service provider server to determine the storage usage based on an application basis. For example, e-mail data could be pushed down to the service provider server or subscriber premises; Video on Demand movie data could stay as part of the centralized network, and remote video recorder data could reside at the service provider server. One embodiment of the present invention incorporates a distributed storage model for the subscriber data.

The distributed server model of the present invention further enables a number of capabilities which otherwise do not exist in a centralized server model, such as in-expensive high performance web site hosting, and in-expensive high performance interactive voice response services. The use a plurality of servers to provide a given functional capability in the present invention enables it to provide a very high service capability. The distributed server model enables a high performance multi-service on a network level by virtue of the fact that a number of physically distinct elements are used to provide the functionality. Each of these elements has specific physical limitations, such as computational bandwidth and storage bandwidth. The distributed nature of the present invention enables it to utilize this capability in parallel. Whereas the centralized prior art approach is limited by the mandated serial nature of having to schedule the services in case of the limiting resources, such as storage access bandwidth, or computational bandwidth.

18. Video on Demand Couponing Scheme

One embodiment of the present invention incorporates the capability of delivering content to the subscriber on a couponing basis. One embodiment architecture incorporated a smart card based debit capability, as well as a conditional access module capability. The smart card based debit capability incorporates a card reader, capable of verifying physical presence of either a smart card, a debit card, or and credit card, and reading its contents. In the case of a smart card, the debit is made directly from the card itself. Whereas in the case of a credit card, or debit card, the information is processed locally, however, the actual debit is made at the card holding banking facility. The conditional access module is responsible to decryption of the delivered content at the subscriber site. In one embodiment of the present invention the content provider provides encrypted data to the network by use of either terrestrial or satellite based transport.

Only subscribers authorized to use the data are forwarded the decryption coupon. The decryption capability coupled with the couponing mechanism is used for unidirectional secure transmission such as a broadcast mode or video on demand mode. In this configuration the data resides in an encrypted form within the service provider server and the content provider is guaranteed that the service provider does not have the ability to provide copies of this content to multiple subscribers and thereby circumvent royalties or other licensing arrangements. A bidirectional secure channel can be achieved by use of decryption/encryption conditional access module within the same architecture.

The smart card based debit card is also used to enable secure e-commerce. Within the scope of this document, e-commerce is used as a term relating to any form of a transaction between two parties or more that is not a physical transaction. Wherein, a physical transaction is used as a term relating to any form of a transaction between two parties or more that requires the physical presence of all parties. E-commerce does not require any transactions of monies, electronic or otherwise, but simply relates to any transaction where two parties or more wish to transact. One of the limitations of internet based business commerce, consumer commerce is a fact that the consumer has to issue a credit card number over the internet. It is feasible for an intelligent electronic criminal to steal the credit card number and make multiple charges against the credit card. The use of a debit card within one embodiment of the present invention requires a multi-step process for a e-commerce transaction to take place. Firstly, the authorization number needs to be disclosed by the subscriber requesting the transaction. Secondly, the physical presence of the smart card based debit card is required. Thirdly, the smartcard must have the credit to complete the transaction. The debit card can be used to limit the potential monies lost by the subscriber in case of a stolen authorization code. Furthermore, the card can be physically removed when the subscriber is not actively engaged in a transaction to minimize risk of misuse. In addition, the subscriber is able to interrogate the smart card to establish the outstanding credit balance within the smart-card. The smart-card reader can be enhance to also accept a debit card and a credit card, thus a physical requirement of the credit card is mandated to complete the transaction. The rest of the transaction occurs over a secure encrypted means and the transaction is validated at the transaction termination site.

One embodiment of the present invention incorporates a smart-card based immediate crediting capability within the network whereby a content provider or bandwidth provider can automatically deduct an authorized amount from the smart card. The smart card based debit or credit card capability is used within one embodiment to purchase temporary connective bandwidth such as making a long distance phone calls or temporary network bandwidth or performance. In one embodiment of the present invention the subscriber household or business is given several individual smart-cards. Each of these can be assigned to various individuals at the subscriber premises and in this manner individual usage and charge patterns can be monitored.

19. Statistically Multiplexed FFT Capability

An embodiment of the present invention incorporates the capability of a statistically multiplexed modulation, demodulation, and channel processing. The Asymmetric Digital Subscriber line technology (ADSL) modulation requires a Fast Fourier Transform(FFT). The processing of the FFT is very computationally intensive. One embodiment incorporates the capability that the FFT processing is done on a demand driven basis. Thus, only those terms of the FFT which are non-zero are demanded to be computed. If a given carrier within the Discrete Multi-Tone (DMT) standard of the ADSL standard does not convey any information, its associated FFT term is not computed. One embodiment of the invention utilizes a shared processing pool for computational needs. Thus, the saved computational load, resultant from the uncomputed FFT term, is available for use by other subscriber line interfaces.

One embodiment of the present invention intelligently manages the carrier bit packing so that the minimal number of carriers are used by a subscriber line to transmit the required bandwidth subject to the associated signal to noise ratio. An embodiment minimizes the number of carriers and packs the maximum number of bits to deliver the service and thereby reduces the statistically multiplexed FFT computational load.

One embodiment of the present invention incorporates the use of a variable precision computation of the fourier transform. When only a few bits are packed within a carrier, a larger constellation size results in comparison to when more bits are packed within a carrier wherein a smaller constellation size results. However, the number of bits at the Analog to Digital converter and the Digital to Analog converter are fixed within the architecture of this embodiment. When fewer bits are being packed within a carrier this is because the system has a higher presence of noise. In this case, the maintenance of high precision within the FFT and other portions of the embodiment is futile, since the limiting factor becomes the noise within the channel. One embodiment of the present invention incorporates a variable precision FFT, where in the precision of the FFT is proportional to the packing density within the carrier. The precision maintained is more than the resultant noise at the carrier within the system. The variable precision FFT computation module enhances performance by utilizing the less computationally intensive lower precision computations wherever possible, and only computing the higher precision FFT carrier terms with high signal to noise ratio.

20. Bandwidth on Demand model (ABR, VBR . . . )

An embodiment of the current invention incorporates the capability of managing the quality of service (QoS) delivered to the subscriber. Traffic management in deployed at the service provider server. Several ATM traffic types are supported, in particular ABR, CBR, VBR, and UBR. ABR is an ATM traffic type where the packet is transported by the ATM switch on a Available Bit Rate means, wherein if the ATM switch has available bandwidth it forwards the packet. CBR is an ATM traffic type where the packet is transported by the ATM switch on a Constant Bit Rate means, wherein the ATM switch will forward the packet at a constant rate. VBR is an ATM traffic type where the packet is transported by a Variable Bit Rate means, UBR is an ATM traffic type where the packet is transported by a Unspecified Bit Rate means, wherein the ATM switch forwards traffic in an unspecified manner. One embodiment differentiates between ABR and UBR in that in ABR policy, the system gives a minimal bit rate guarantee with more bit rate capability if the network condition allow. In UBR policy, the system gives no minimal bit rate guarantee and data is forwarded with only a guarantee that it will be forwarded in sequential order within the network.

One embodiment of the present invention incorporates the capability of supporting multiple traffic types from the subscriber on an application basis. Furthermore, the subscriber is dynamically able to modify his bandwidth requirements so that he is able to achieve the his performance objectives without the need of the service provider intervention. An embodiment is able to deliver a bandwidth on demand capability by the use of dynamic provisioning in conjunction with the Quality of Service traffic management.

21. Remote Video Recording

One embodiment of the present invention incorporates the capability of Remote Video Recording. The service provider server has the capacity to store selected recorded video content upon request by the subscriber. The present invention is differentiated from the prior art in that the prior art requires the subscriber to have an intelligent device at the subscriber premises to have the storage capacity to store the video content, whereas the present invention does not require such a intelligent storage capable device.

One embodiment utilizes the storage element within the service provider server to store the content of the video recording and then deliver this content to the subscriber in a demand basis. The Remote Video Recorder gives the subscriber capability of fast forwarding, rewinding, playing, pausing and stopping.

An embodiment incorporates within it the capability of video on demand which is functionally similar to a remote video recorder functionality, however, the main difference between video on demand and remote video recorder is that Video on demand data can be transmitted to any subscribe, whereas the remote video recorder data is only of interest to the subscriber. In one embodiment, a simple access device is used to interface to the service provider server, decode the video stream from the remote video recorder, and to interface to the television.

22. Voice Services

One embodiment of the present invention incorporates the ability for voice messaging services as well as a interactive voice response service. The algorithmic IVR capability and the voice messaging service capability reside at the service provider server. In one embodiment the subscriber has the capability to record custom greetings and options at the service provider server and be able to access these in a native telephone keypad based manner or a browser based interface.

23. Video Conferencing

An embodiment of the present invention incorporates a video conferencing capability. Prior art approach to video conferencing is typically done by use of ISDN lines or bonded multiple ISDN lines are brought into the subscriber premises. Dedicated hardware and software exist which then enables the user to be able to communicate with another video conferencing stations elsewhere. Prior art methodologies achieve full protocol compliant compression at the subscriber premises. The prior art approach is wasteful in that the subscriber based dedicated hardware can not be shared due to its physical location at the subscriber premises.

Another embodiment of the present invention segments the video conferencing capability into two pieces, the subscriber premise resident front end and the service provider server resident back end. The video conferencing front end is responsible for the Analog to Digital conversion and the Digital to Analog conversion as well as a cursory compression and formatting of the data to utilize the subscriber line. The video conferencing back end is responsible for full protocol compliance with the industry wide video conferencing standards such as H.320. The video conferencing back end is capable of interfacing to the video conferencing front end and is additionally responsible for the full protocol compression/decompression capability.

Another embodiment of the present invention has the capability to deploy desktop video conferencing within a business environment or a remote SOHO subscriber premises. SOHO subscriber premises capability can either be achieved by a dedicated stand alone back-end add in card and then subsequent use of typical DSL or ISDN interface, or by use of a service provider deploying the infrastructure of the present invention. Businesses can deploy video conferencing within the company premises by utilizing the standard PBX phone wiring and connecting it to the service provider server. In effect the standard PBX phone wire is then able to deploy DSL in the same manner as the service provider. In this manner, the businesses can easily deploy desktop to desktop video conferencing to every office within the premises.

DESCRIPTION OF THE DRAWINGS

FIG. 12a illustrates a frequency multiplexed multi-channel voice channel.

FIG. 12b illustrates a frequency multiplexed multichannel voice over IP communication channel.

FIG. 13 is a functional block diagram setting forth a video conferencing embodiment of the present invention.

FIGS. 24a thru 24k illustrate computational strategies according to one embodiment of the present invention.

DETAILED DESCRIPTION OF THE INVENTION

A. Prior Art Voice-Data Communications Network Architecture

Figure 1:
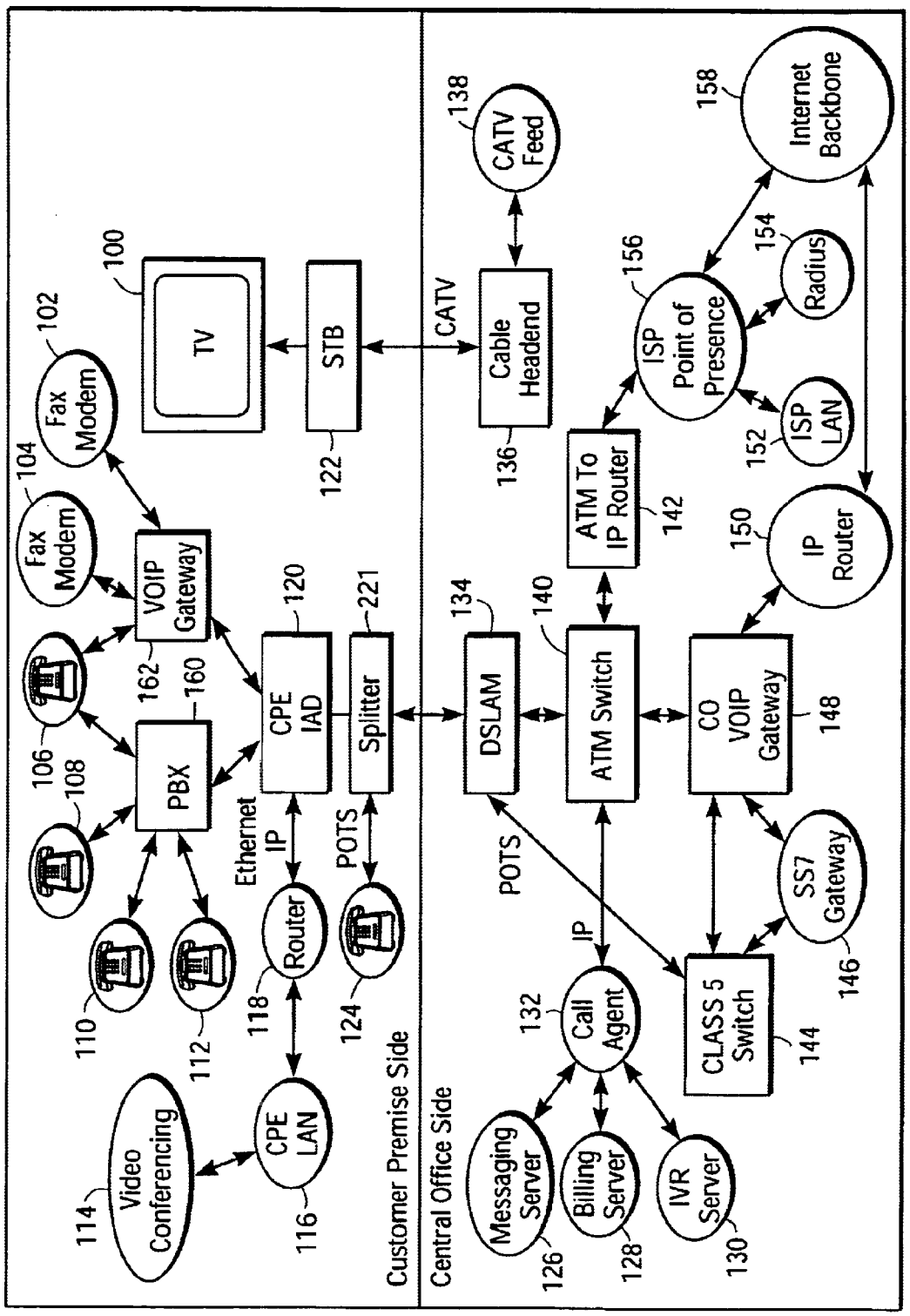
FIG. 1 is a functional block diagram illustrating a typical prior art voice-data communications network architecture.

FIG. 1 outlines the state of the prior art as it is typically deployed. As is illustrated in FIG. 1, the prior art often features a highly complex network topology for deployment of multiple services. Certain prior art has integrated limited functionality in order to simplify the network topology. However, the prior art falls short of the need to simplify the network topology of a true multi-service network. The present invention is differentiated from prior art in that a unified model is implemented by use of a distributed access methodology that enables multiple services to be deployed through distributed interconnection of similar systems.

FIG. 1, Prior Art Equivalent Deployment Model, outlines the general prior art methodology of deploying the various voice, data and communications services incorporated within one embodiment of the present invention. In one prior art embodiment, the main link between the Central Office (CO) and the subscriber premises is a DSL link. Within the scope of this document the word Central Office (CO), service provider premises, central office site, and service provider UIP Server central location are used interchangeably. The services that are illustrated within FIG. 1 demonstrate prior art DSL connectivity service. The DSL connectivity is delivered using an ADSL modem or an integrated access device (IAD) at the subscriber premise side connected through twisted wire interface to a DSL Access Multiplexer (DSLAM) at the Central Office (CO). The telephony capability is provided through either a Plain Old Telephone System (POTS) line or over a voice over IP packet network. Although an ADSL subscriber line is disclosed, any other type of DSL subscriber line can and is often used.

FIG. 1 illustrates the capability of a local LAN to interface to a router which in turn interfaces to the Customer Premise Equipment (CPE) side Integrated Access Device (IAD). The IAD in turn interfaces to the CO DSLAM. Furthermore, FIG. 1 illustrates the capability for video conferencing from the subscriber's premises to the local LAN, as well as multiple telephone extension capability. Furthermore, FIG. 1 illustrates a fax and modem capability from the subscriber premises. FIG. 1 further illustrates a Private Branch Exchange (PBX) capability. The prior art deployment diagram of FIG. 1 also illustrates the capability of supporting video services, such as standard television, and local LAN based Internet television, video conferencing, or video mail.

On the central office side, FIG. 1 illustrates the server complimentary functionality. Additionally, an Interactive Voice Response (IVR) capability is illustrated at the CO side. FIG. 1 also illustrates a billing capability, as well as the class 5 switch to support the standard telephony capability and the voice over IP capability. One of the primary infrastructures that exists within the voice capability is the SS7 gateway which is used for billing as well as switching capability and phone routing functionality.

FIG. 1 also illustrates the Internet backbone connectivity which provides the capability for a plurality of subscribers to communicate with each other across the Internet Backbone. FIG. 1 further illustrates the routing capability, the switching capability and the local networking capability at the CO required to provide the Internet Service Provider (ISP) functionality. FIG. 1 additionally illustrates a broadcast cable TV capability based on either a cable TV feed or a satellite feed.

FIG. 1 illustrates a segregated television network from the telephony and data services as typified in prior art deployment. FIG. 1 also shows a television set 100 through which a subscriber is able to receive and possibly make video communication decisions, such as watching video on demand, movies, broadcast television, or Internet television among others. The television set 100 is connected to a Set Top Box 122 which hosts a certain degree of intelligence. Minimally, it is capable of interfacing with the cable television infrastructure or a video broadcast satellite network. Set Top Box 122 connects to a cable television infrastructure. In one prior art embodiment, Set Top Box 122 interfaces via the cable television coaxial cable to a cable headend 136 which in turn interfaces to a cable TV feed 138.

Fax modems 102 and 104 are non-compressed full bandwidth fax modems and interface to the network through a voice over IP gateway. The full bandwidth fax modems 102 and 104 are not compressed nor are they IP encapsulated.

The voice over IP gateway 162 interfaces to a CPE IAD 120. CPE IAD 120 aggregates multiple traffic types within the premises. Telephony and data services are then aggregated to go across a DSL link as illustrated in FIG. 1. The digital subscriber line (DSL) link is connected to a Digital Subscriber Line Access Multiplexer (DSLAM) 134. Telephony peripherals 112, 110, 108 and 106 are standard POTS based telephones which can interface to either a Private Branch Exchange (PBX) 160, or a Voice Over IP Gateway 162. The PBX 160 and the Voice over IP Gateway 162 interface to the CPE IAD 120. The Voice Over IP Gateway and PBX are differentiated between each other in that typically Voice Over IP Gateway is compressed using specific coding methods and then encapsulated by IP (Internet Protocol). The Voice over IP Gateway is primarily a packet-based device, whereas a PBX is a time division multiplexer-based device and uses different compression standards, if any. Fundamentally, the functionality of both of these items is to digitize and encode the voice telephony channel hand then transmit it through the CPE IAD 120.

FIG. 1 illustrates a video conferencing station 114, that can be a simple television camera connected to a PC using either a simple network or a plug-in card. A video display can be a PC screen. Audio methodology can be a speaker used as a stand-alone or part of the computer system. The video conferencing station 114 communicates through use of a CPE local area network (LAN) 116, through either a PC or directly. The CPE LAN 116 communicates to an internal local router 118. The local router 118 utilizes Ethernet IP and interfaces directly to a CPE IAD 120. The local router 118 enables multiple sessions of either the video conference station, PC, or other peripherals within the subscriber network. Local Router 118 connected to CPE IAD 120 using Ethernet IP is exemplary of a typical subscriber network within the premises. Alternatively, other networks such as Universal Serial Bus (USB) or Firewire (IEEE1394) among others can be used. Telephone 124 is a POTS only telephone and is capable of deploying life line services. Telephone 124 is also capable of a stand alone capability within an ADSL equivalent deployment model. Telephone 124 through use of the POTS line or the CPE IAD 120 and high speed data traffic is multiplexed together and steered using a DSL link to a standard Digital Subscriber Line Access Multiplexer (DSLAM) 134.

The functionality of the DSLAM 134 at the central office is to convert analog signals from the DSL link into digital signals and to convert digital signals to the analog signals on the DSL link. The traffic output of DSLAM 134 is either an IP-based or ATM based output. FIG. 1 illustrates an ATM interface to an ATM Switch 140. The ATM Switch 140 is responsible for distributing traffic of different types and distributes IP traffic directly to a Call Agent 132. All traffic related to an Interactive Voice Response Server 130, a Billing Server 128, or a Messaging Server 126, goes through the Call Agent 132. ATM Switch 140 is also responsible for segregating traffic to the Internet through use of ATM to IP Router 142. The ATM to IP Router 142 steers traffic within the network of the service provider. The ATM Switch 140 is also responsible for distributing the voice traffic to a Central Office voice over IP Gateway 148. The Central Office voice over IP Gateway 148 can direct traffic utilizing another IP Router 150 across to the Internet Backbone 158. For traffic that is terminated within the Central Office (CO) itself, the ATM Switch 140 can either route or switch the traffic back and direct the Central Office voice over IP Gateway 148 to route the voice traffic back to another subscriber within its own network.

POTS traffic can directly interface from DSLAM 134 by use of a dedicated link, such as a T1, a DS0 or a DS1, to a Class 5 Switch 144. The Class 5 Switch 144 can utilize standard SS7 signaling capabilities and interface to an SS7 Gateway 146 to determine the telephone route. DSLAM 134, via ATM Switch 140 and Central Office Voice Over IP Gateway 148 can directly interface with the SS7 Gateway 146, as well. The SS7 Gateway 146 can be used to route voice over IP traffic, if the voice over IP traffic is to be terminated within Class 5 Switch 144.

B. Intelligent Scalable Switching Network—
Overview

Figure 2:
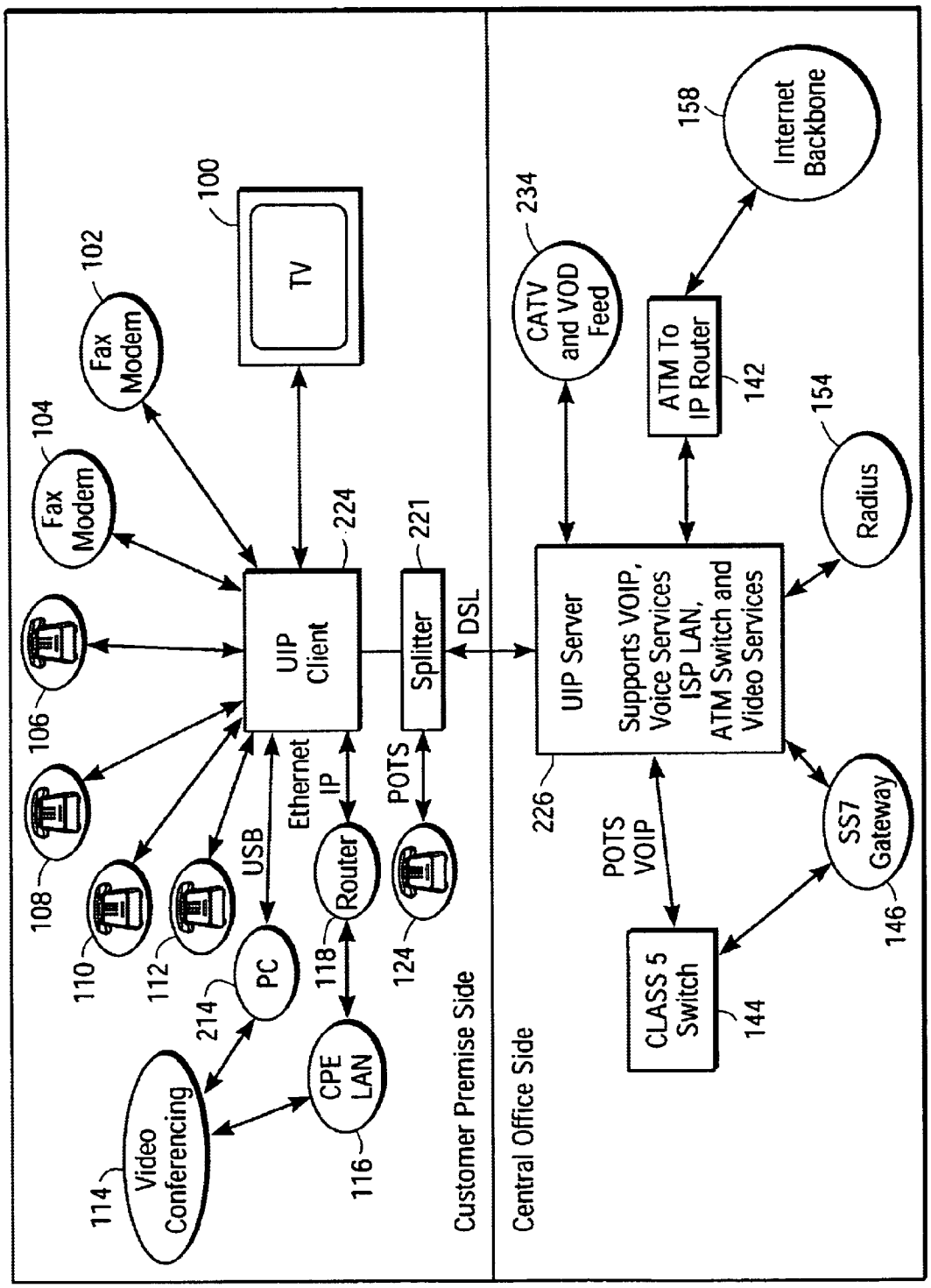
FIG. 2 is a functional block diagram illustrating one embodiment of the intelligent scalable switching network of the present invention.

FIG. 2 is an overview of one embodiment of the intelligent scalable multimedia switching network of the present invention. As FIG. 2 shows, the inter-connectivity is greatly simplified due to use of a unified access device-i.e., the Unified Internet Portal (UIP) Server 226 operably connected via a DSL line to a UIP Client 224.

1. UIP Client Side

The UIP Client 224 is capable of directly interfacing with a plurality of voice and data communications devices. For example, UIP Client 224 is capable of directly interfacing with a standard television set (TV) 100. In addition to the direct connection between the UIP Client 224 and the TV 100, it is possible to insert a Set Top Box between UIP Client 224 and TV 100. In either embodiment, the deployment model is simplified. In one embodiment, the UIP Client 224 can be simplified, in that it is only capable of supporting limited functionality. This limited functionality could simply be an interface to either just a PC or other computer device, or just a set top box. This form of a UIP client is referred to as a UIP thin client, wherein a thin client includes a subset of the functionality of the UIP client and is a simplified embodiment of the UIP client.

FIG. 2 also illustrates the interconnection between a UIP Client 224 and two fax modems 102 and 104. The characteristic of a fax modem is that the line interfacing circuitry does little or no compression. The line interfacing circuit has a digitization capability enabling full bandwidth transmission of voice channels. Differentiated from the Fax Modem 102 and 104 are the telephones 106, 108, 110, and 112. There are a minimum of one and up to a plurality of telephone connections including and not limited to the fax modem. In one embodiment, the voice channels from the telephones 102, 104, 106, 108, 110, and 112 are digitized and compressed by use of advanced compression mechanisms resident in UIP Client 224. The telephones devices 102, 104, 106, 108, 110, and 112 can either be POTS telephone devices or voice over IP telephone devices. Thus, the digitized voice data could then be further encapsulated within a data communication protocol such as the Internet Protocol (IP). In addition to the telephony devices mentioned, a standard POTS telephone 124 is also available which can either be an integrated or separated from the UIP Client 224.

FIG. 2 shows a separated POTS only device telephone 124. The telephone 124 interfaces to the Digital Subscriber Line through use of a splitter 221 at the link between the subscriber line of the DSL circuit and the POTS line. In one embodiment, the UIP Client 224 incorporates internally splitting functionality; thus, a single POTS telephone wire is made available as a single connection from the splitter unified UIP Client.

UIP Client 224 is also capable of interfacing with a personal computer, PC 214, by some form of a networking capability, either a Universal Serial Bus (USB) or any other suitable networking device. Computing device 214 is also capable of interfacing to UIP Client 224 through a standard Ethernet IP networking methodology which could then interface directly to a router 118. Router 118 enables the UIP Client's 224 access to multiple PC 214 devices. Traffic can be routed by use of the Router 118 to any devices interfaced with the CPE LAN 116. FIG. 2 also illustrates a video conferencing station 114 demonstrating connectivity of at least one video conferencing site within a subscriber network. Video conferencing station 114 could have dedicated compression capability at a specific video conferencing station 114 or it could incorporate the compression capability at the PC 214 using either a plug-in card, other hardware device, or software-based algorithm. Furthermore, the compression capability required for the video conferencing station 114 could reside within UIP Client 224.

2. UIP Server Side

As shown in FIG. 2, the Intelligent Scalable Multimedia Switching Network is a flexible unified mechanism which is able to deliver multimedia content and perform this in a distributed and controlled fashion between a UIP Server and a UIP Client. The UIP Server can service a number of links from a few lines to hundreds of lines in this network. For example and in one embodiment, the network shown in FIG. 2 is capable of transmitting data in raw form from video conferencing station 114. Specifically, the data is transmitted to UIP Client 224 which then communicates it to UIP Server 226. UIP Server 226 can take the video conferencing raw data stream, compressed only for transport purposes, for data transport across the DSL link. In one embodiment, the resulting data stream is then un-compressed at the UIP Server 226 and is then re-compressed using standard industry wide compression algorithms for video conferencing, such as H.320. The standards compressed video conferencing stream is then transported across a PSTN network through use of a Class 5 Switch 144. This capability is advantageous because of interoperability concerns with the existing video conferencing systems.

In one embodiment, UIP Server 226 has a dedicated capability of supporting voice over IP and interactive voice response services as well as messaging and storage capability. It is also capable of acting as an Internet service provider local area network ("ISP LAN"). In addition, it is also able to perform edge switching and edge routing, and is able to deliver a host of video services, among them video on demand, broadcast TV, Internet TV, and video mail. In one embodiment, UIP Server 226 has dedicated connectivity to an authentication and verification Radius server 154 which is required to be able to authenticate and verify any kind of data traffic (for example, the Internet service providers local area network), as well as be able to maintain some virtual private networking capability. In one embodiment, UIP Server 226 is also capable of interacting, directly or indirectly, to an SS7 Gateway 146 which is utilized for decision making on routing class 5, or standard POTS telephone calls. The SS7 Gateway 146 directly interfaces with Class 5 Switch 144 and instructs the switch how to steer and manage the voice traffic generated from UIP Server 226. In another embodiment, UIP Server 226 also interfaces directly to a video subsystem network, Cable TV and Video On Demand Feed 234. This is a primary input to the UIP Server for broadcast and video on demand services. UIP Server 226 also directly interfaces to ATM To IP Router 142 which is fundamentally responsible for converting the ATM traffic to IP and determine the routing that is required to be able to interface to Internet Backbone 158.

Figure 2A:
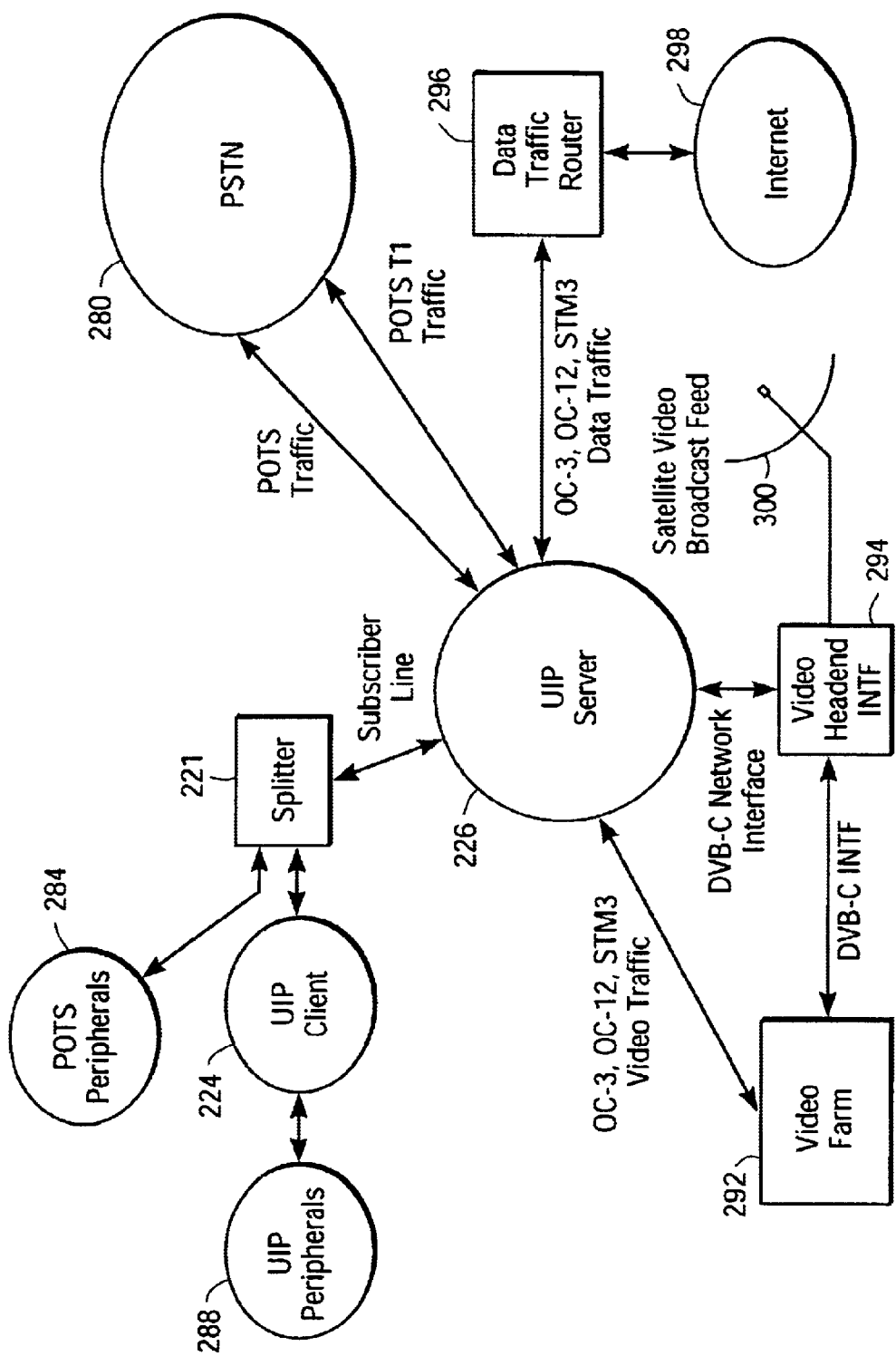
FIG. 2a is functional block diagram illustrating an alternative illustration of a scalable multimedia switching network of the present invention.

FIG. 2A presents an alternate view of the scalable intelligent multimedia network of the present invention. UIP Server 226 is illustrated within FIG. 2a as the central location of the server-side network. In another embodiment, a plurality of UIP servers 226 are connected to the server-side network. UIP Server 226 interfaces to the existing Public Switch Telephone Network 280 with either direct POTS traffic or POTS T1 traffic. The fundamental difference between these two separate links is the fact that the standard POTS traffic could be a DS0 non-terminated circuit whereas the POTS T1 traffic is a digitized T1 terminated circuit. A typical T1 is a plurality of digitized voice circuits transmitted in a specified protocol. FIG. 2A illustrates a Data Traffic Router 296 that interfaces to the Internet 298. A number of Data Traffic Routers (296) are available in the market with varying interfaces. The Data Traffic Router 296 also interfaces to a plurality of UIP Servers 226. In one embodiment, Data Traffic Router 296 is a data oriented packet-based transport device for interface to the Internet 296. In one embodiment, the link between Data Traffic Router 296 and UIP Server 226 is an OC-3, OC-12, or a STM1 or STM3 Data Traffic protocol.

In one embodiment, the UIP Server 226 interfaces directly with a video headend interface 294. Video headend interface 294 can have multiple interfaces as illustrated by FIG. 2A, such as to a Satellite Video Broadcast Feed 300. FIG. 2a illustrates a direct satellite broadcast link. The Satellite Video Broadcast Feed 300 antenna can reside on the roof of a central office where an extended Video Farm 292 or a DVB Cable interface is not available. In such an embodiment, the Video Headend 294 includes tuning circuitry capable of interfacing the Satellite Video Broadcast Feed 300 to the UIP Server 226 and tuning to specific frequencies. Alternatively, the UIP Server 226 can also directly interface to Video Farm 292, comprising one to a plurality of video storage and retrieval systems capable of interfacing to the scalable intelligent multi-media switched network through standard communication interfaces such as OC-3, OC-12, and STM3.

FIG. 2A also illustrates the interface between the UIP Server 226 to a subscriber line. UIP Server can be connected to one to a plurality of separate subscriber lines. In one embodiment, each subscriber line at the terminating end requires either a Splitter 221 in the case of a splitter-based capability such as ADSL, or a direct interface in case of non-splitter-based DSL. The Splitter 221 in the example of the ADSL embodiment is responsible for splitting the data traffic and the Pots Standard Traffic. FIG. 2A illustrates a POTS Peripheral 284 such as a standard telephone, answering machine, or the like, which connects directly to Splitter 221. The other side of the Splitter 221 interfaces with UIP Client 224. The UIP Client 224 is fundamentally responsible for the modulation, demodulation and general modem functionality such as within the ADSL protocol. As illustrated in FIG. 2A, the UIP Client 224 can further interface with one of more UIP Peripherals 288, such as computers, voice over IP peripherals, or standard POTS peripherals.

C. UIP Client Architecture

Figure 3:
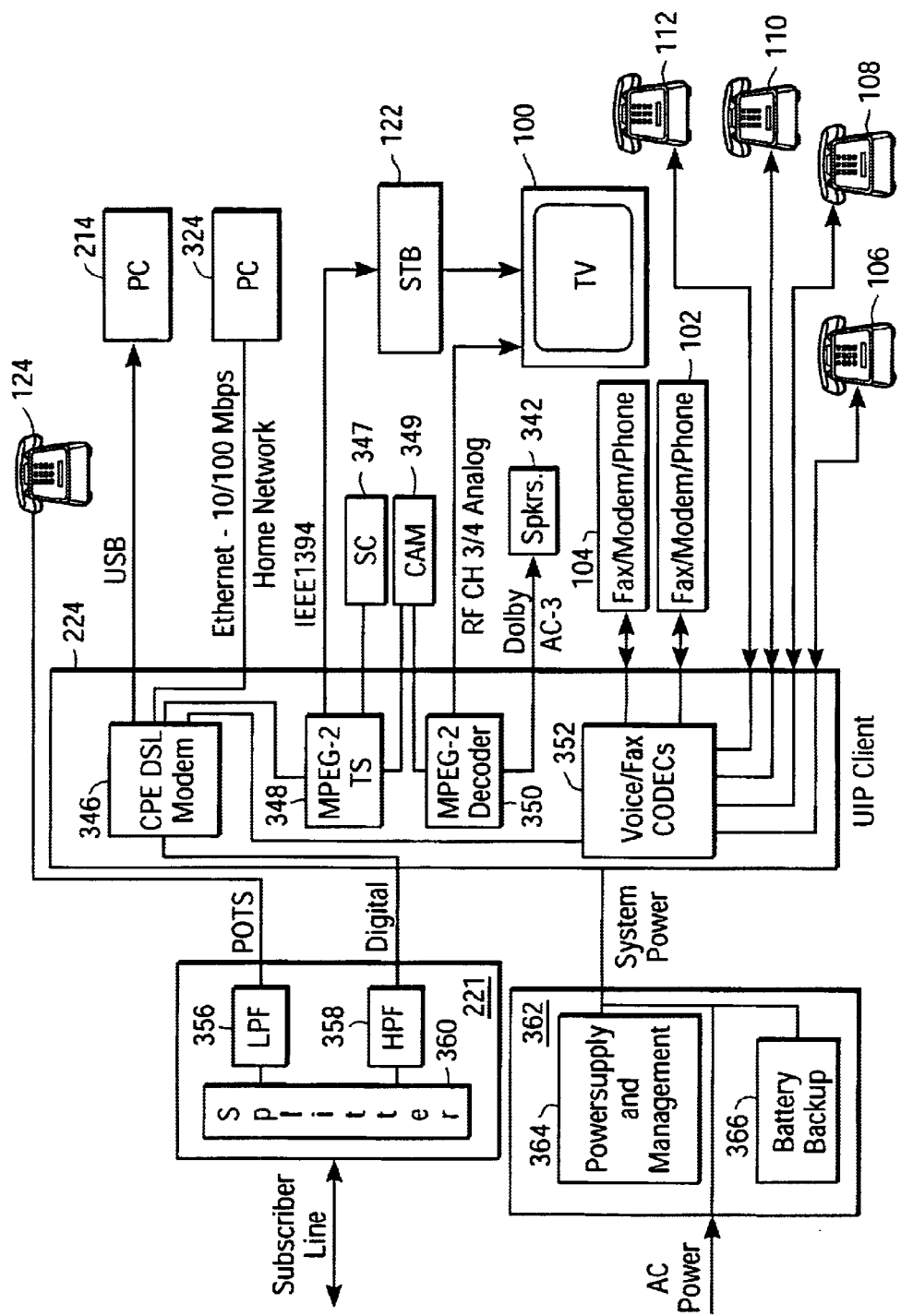
FIG. 3 is a functional block diagram illustrating an embodiment of a UIP Client architecture.

FIG. 3 provides a more detailed illustration of the UIP Client architecture and interfaces in the embodiment of the UIP Client 224 illustrated in FIG. 2A. The interfaces related to UIP Client 224 are shown in a home environment deployment scenario. UIP Client 224 can also reside in a business and other client relationships where specific devices and specific capabilities would be enhanced or subtracted from the home environment deployment scenario based UIP Client 224.

FIG. 3 illustrates an ADSL embodiment of a client interface. In particular, the Splitter Functionality 221 is illustrated for ADSL. The Splitter 360 is essentially a transformer for isolation and interfacing purposes. The splitter 360 segregates the frequency spectrum so that a standardized POTS spectrum is sent through a Low Pass Filter 356. The end result of the output of the Low Pass Filter 356 is a standardized POTS based voice service capability. The Low Pass Filter 356 output is connected to a standard POTS peripheral 124. The filter block functionality 221 also illustrates a High Pass Filter 358. The High Pass Filter 358 is used to filter the data traffic and to interface it with the UIP Client 224.

In one embodiment, UIP Client 224 incorporates within it the functionality for a Customer Premise Equipment DSL Modem 346. The CPE DSL Modem 346 is responsible for the modulation, demodulation, and the general modem interface capability. In addition, CPE DSL Modem 346 takes the digital traffic and splits it into a plurality of digital streams of data based on their functionality. In particular, the CPE DSL Modem 346 can interface with a Universal Serial Bus (USB), or other interface to a personal computer 214 as illustrated in FIG. 3. Additionally, one of the functionalities of the CPE DSL Modem 346, in one form, is to directly interface with either an Ethernet-based home networking capability, or any other suitable home networking standard. In one embodiment, traffic generated for the video network and the audio network for home entertainment is directly separated at the CPE DSL Modem 346 in the form of a MPEG-2 Transport Stream 348, as exemplified in FIG. 3. The MPEG-2 Transport Stream 348 illustrates a standards-based circuitry used to decode given MPEG-2 streams. In one embodiment, the output of a MPEG-2 Transport Stream 348 is an IEEE 1394 firewire standard. Of course, any suitable standard can be used. In one embodiment, the IEEE 1394 firewire directly interfaces to a Set Top Box 326. The Set Top Box interfaces to a television set TV 328. The IEEE 1394 firewire-based interface is one of the simplest means of delivering MPEG-2 digitized video streams to a television. The MPEG-2 Transport Stream 348 has within it a built-in capability for a Smart Card Interface 347. The Smart Card Interface 347 is responsible for authorizing and enabling specific functionality. The Smart Card Interface 347 can also be utilized for subscription services as well as standard debit and credit exchanges. Within the scope of this document the smart card interface, the card reader, and the card interface are used interchangeably. In one embodiment, MPEG-2 Transport Stream 348 also interfaces to a Conditional Access Module 349. Conditional Access Module (CAM) 349 is responsible for encryption and decryption of specific streams. The decryption portion of CAM 349 enables the decryption of data streams for subscriber-based authorization. The CAM 349 can service multiple streams, such as, video or voice/fax CODECS for security control and authorization.

As FIG. 3 provides, one embodiment of the general UIP Client architecture includes a MPEG-2 Decoder 350 whose output can be a standardized analog output, such as channel 3 or channel 4. The analog output from the MPEG-2 Decoder 350 directly interfaces to television 328. The specific channel utilized for transmission is for exemplary purposes only and is only one of many such possible analog direct connects to a television, among others such as direct video and audio connect. In another embodiment, the output of MPEG-2 Decoder 250 is a digitized Dolby AC-3 interface or a standardized analog interface to a set of speakers or a home entertainment audio system, illustrated by Item 342.

The CPE DSL Modem 346 of the embodiment shown in FIG. 3 also segregates traffic directed for standard telephony capability to directly or indirectly interface to voice/fax CODECS 352. The functionality of the voice/fax CODECS 352 includes the ability to interface to several standard telephone peripherals such as a fax/modem/ phone devices 102 and 104. In one embodiment, the voice/fax CODECS 352 functionality can include within it an encapsulation capability such as being able to encapsulate the standardized voice telephony into IP traffic. In one embodiment, Fax/Modem/Phone devices 102 and 104 are standard regular POTS phones. In one embodiment, the data used by Fax/Modem/Phone devices 102 and 104 are not compressed, but are instead digitized at the standard maximum digitizing capability required by the phone system. This enables an interface to a standard PC, fax or modem and is critical in being able to deploy the UIP Client 224 in a simplified manner. In addition to the capability of interfacing with fax modems 102 and 104, the Voice/ Fax CODECS also interfaces to all standard telephone peripherals, such as telephone 106, 108, 110 and 112. The POTS peripherals 112, 110, 108, and 106 are differentiated from the POTS peripheral 124 in that the telephone 124 interfaces to the scalable intelligent multimedia network through a POTS line bypassing most of the UIP Client functionality. In contrast, the signals from telephones 106, 108, 110 and 112 are digitized through Voice/Fax CODECS 352 and then go through a UIP Client's transport mechanism to be delivered in a digital means. The advantage of this methodology is that multiple extensions can be supported and more intelligent phone management can take place at the UIP client 224. In one embodiment, data is digitized at the UIP Client 224, and therefore no significant signal degradation occurs due to noise from the subscriber line. In one embodiment, UIP Client 224 includes a battery backup 366 and power supply and management 364 capability inherently within its design. The objective of the power backup and management capability is to maintain operation during a power outage.

One embodiment of the present invention guards against power failures. Specifically and in one embodiment, Power Supply and Management circuitry 364 is utilized in conjunction with a Battery Backup 366 to maintain system power at all times to UIP Client 224. In one embodiment, the input to this block of circuitry is a standard power interface such as 110 volts or 120 volts connected directly into UIP Client 224. In one embodiment, Power Supply and Management circuitry 364 and the Battery Backup 366 are responsible for delivering the minimal power required by the service requested. In particular, if a video stream is enabled and a telephone/fax/modem is enabled, only the circuitry that is actively being utilized is actually enabled. In one embodiment, the Voice/Fax CODECS 352 as well as the CPE DSL Modem 346 that are required to be able to deliver telephony services for telephones devices 106, 108, 110 and 112 are managed on an on-hook, off-hook basis. In one embodiment, power is managed so that the UIP Client 224 goes in a standby mode for power conservation as soon as the service requirements are met. In terms of the modulation and the demodulation occurring within CPE DSL Modem 346, all CPU capability is put in a standby mode and only the direct interface circuitry for the digital interface is enabled during a standby mode. Standby mode is detected by monitoring the status of the AC power as it comes into UIP Client 224. In one embodiment, battery backup 366 incorporates the capability to interface to a standard flashlight-type battery. The use of a flashlight battery enables a simple subscriber-controlled means of temporary power supply capability. The subscriber can install a battery on a temporary basis to bring life to a UIP client that may have already exhausted its standby life due to an extended power outage.

D. UIP Server Architecture

Figure 4:
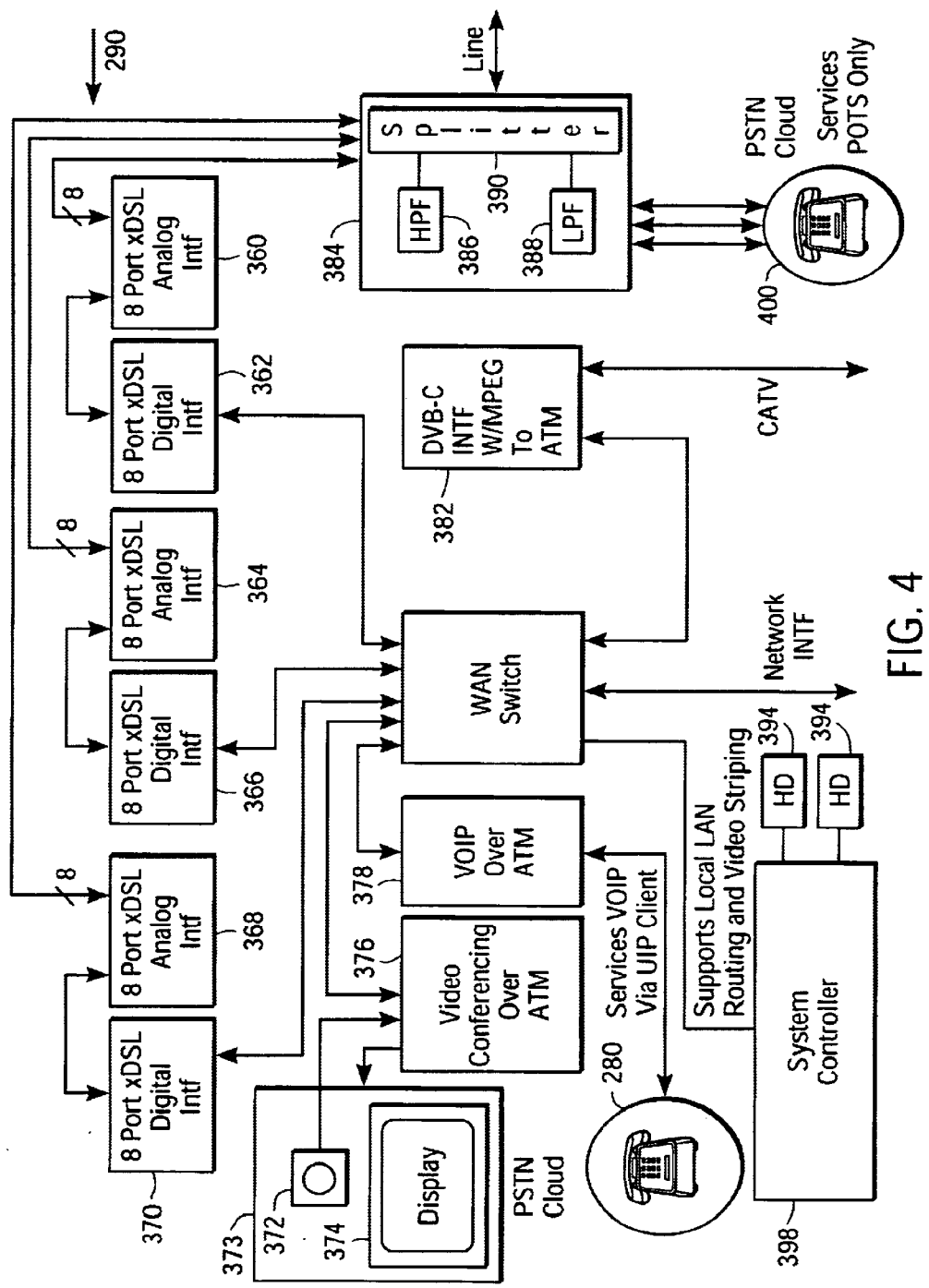
FIG. 4 is a functional block diagram illustrating an embodiment of a UIP Server architecture.

FIG. 4 outlines functional circuitry of one embodiment of the UIP Server 226 of the present invention. UIP Server 226 includes a splitter block 384 utilized to segregate data traffic from the low pass voice traffic as is customary in a splitter based DSL network and also illustrated in FIG. 2A splitter block 221. The difference between splitter block 221 and splitter block 384 is that the splitter block 384 is responsible for segregating the traffic at the central office site whereas, the splitter block 221 is responsible for segregating the traffic on the UIP Client side. Similarly to splitter block 221, the splitter block 384 is subdivided into three separate sub sections. Splitter transformer 390 is responsible for segregating high frequency and low frequency traffic. The high frequency traffic contains the digital traffic that is processed by a high pass filter 386 to condition the circuitry for recovery by analog interfaces 360, 364 and 368. The low frequency traffic content portion of the signal is then processed within Splitter Block 384 by a Low Pass Filter 388 whose responsibility is to condition and provide connectivity to a standardized PSTN cloud 280. The simplest model of deployment using this DSL POTS only functionality is a simple telephone 124 (as in FIG. 3). In one embodiment, a POTS telephone 124 (see FIG. 3) is connected to the low pass filter 356 of splitter block 384 on the client side, then out through the subscriber line to the subscriber line in FIG. 4, into the splitter block 384, then to the splitter 390, then to the low pass filter 388, then to the PSTN Cloud 280. The PSTN Cloud switches and routes the telephony service to wherever required. A similar UIP Client Architecture may or may not exist at the receiving end. This is the simplest way of connecting two telephones through the UIP Client and the UIP Server. In addition to the voice traffic, the data traffic is segregated off the high pass filter 386 which then is terminated at the Analog Interface 360, 348 and 368. The signal is then further processed by the Digital Interface 362, 266, and 370.

As FIG. 4 illustrates, UIP server 226, in one embodiment, provides a means of servicing 24 ports by a standard single chassis. It contains six boards, three analog interface boards 360, 364, and 368, and three digital interface boards 362, 266, and 370 providing the 24 line modulation-demodulation capability. One embodiment of the present invention uses an ADSL interface. A number of other DSL interfaces exist as alternatives, such as SDSL and IDSL. One to a plurality of DSL connections can be terminated and digital traffic segregated and formatted to connect to a Wide Area Networking (WAN) Switch 380. The Wide Area Networking Switch 380 typically switches packets based on an OSI Layer 2 or Layer 3 basis. However, any other levels of switching can be implemented within the Wide Area Network Switch 380, such as application Layer 7. The functionality of the WAN Switch 380 routes and switches traffic between multiple DSL lines, voice lines, video lines, and data lines. In one embodiment, WAN Switch 380 also provides a general network interfacing capability that can then be utilized to interconnect multiple UIP servers. In one embodiment, WAN Switch 380 also has the capability of interfacing with an existing broadband ISDN infrastructure within the public telephone network.

In one embodiment, WAN switch 380 also has the capability to interface to a cable TV infrastructure as illustrated in FIG. 4 by the DVB Cable interface with MPEG to ATM 382. The traffic resulting from the cable TV infrastructure is converted to ATM traffic by the DVB Cable interface with MPEG to ATM 382. The DVB Cable Interface with MPEG to ATM 382 exemplifies the capability of encapsulating a standardized video stream, such as MPEG-2 over DVB cable feed, into an ATM traffic type. The UIP server architecture incorporates the interface and encapsulation of the DVB cable feed into an ATM traffic type, so that a simple cable TV interface, such as coaxial cable, is simply connected to the UIP Server. The DVB Cable Interface with MPEG to ATM 382 is then able to tune to a specific frequency, be able to isolate the digital signal through a DVB cable protocol from the tuned frequency, be able to route and switch a given digitized transport stream encapsulated into ATM, and deliver it to the wide area networking switch 380.

In addition to the video capability incorporated within the UIP architecture is also the audio capability incorporated by voice over IP over ATM 378. The voice over IP over ATM 378 interfaces directly through ATM interface to the wide area networking switch 380. The voice over IP over ATM 378 takes ATM traffic originated by a specific voice channel and encapsulates it within a standardized protocol such as the Internet Protocol (IP). The voice over IP over ATM 378 delivers this stream over the PSTN cloud 280 to a plurality of UIP clients. Within the PSTN cloud 280 the voice over IP over ATM 378 interfaces to a standard set of POTS peripheral, such as telephones, and answering machines. The functionality of voice over IP over ATM 378 includes the subscriber line termination of the phone circuit, the digitization of it, the compression of the resultant stream, the IP encapsulation, the segmentation and re-assembly into an asynchronous transfer mode (ATM) traffic type, and finally the conditioning of the stream to interface to the wide area networking switch 380. Alternatively, the voice over IP over ATM 378 interfaces directly to a digitized PSTN stream such as a T1 circuit instead of the individual subscriber line termination of the phone circuit and the digitization of them.

The wide area networking switch 380 interfaces to a standardized network interface, such as OC3, OC12, OC48, STM1, STM3 or any other commonly used standard within the PSTN infrastructure. In addition to the voice over IP over ATM 378 functionality, the general UIP server architecture also incorporates a video conferencing over ATM functionality 376. Video conferencing over ATM 376 and the voice over IP over ATM 378 are analogous to the extent that standardized telephony circuitry, such as, for example, ISDN capability 374, can be utilized. The Video conferencing over ATM 376 incorporates the ability to convert video and audio streams in the a standard video conferencing protocols, such as, H.320, then encapsulating the resultant stream into ATM traffic type, and then conditioning the resultant stream to interface to the wide area networking switch 380. Alternatively, raw video and audio streams may be processed by the video conferencing over ATM interface through use of multiple bonded ISDN lines, or the traffic resulting from the digital interface 362, 366, or 370 via the WAN switch 380. The raw stream would be formatted to a standard video conferencing standard such as H.320, and then the video conferencing over ATM interface then encapsulates the resultant stream into an ATM traffic type. The stream is then forwarded to the WAN switch for general routing and switching. The video conferencing over ATM 376 can also take traffic from the WAN switch and then interface to a standard ISDN connection for dedicated communication to video conferencing sites.

In addition to the various interface capabilities, one embodiment of UIP server 226 also includes a system controller 398 that provides a means of local storage in the form of hard drives 394, in one embodiment, or remote storage 1276 through use of a Storage Area Network (SAN). The system controller 398 incorporates the capability of a self-strapping mechanism where the functionality of the UIP server architecture would be able to be brought on-line without intervention from a hard drive such as 394 or the remote storage 1276. The hard drive 394 typifies temporary storage, such as caching data, messaging data, among others and effectively yields a performance improvement advantage to the UIP server 226 as opposed to a mandatory operational requirement of the UIP server 226 architecture.

E. Multi-DSL Line Interface Capability

Figure 5:
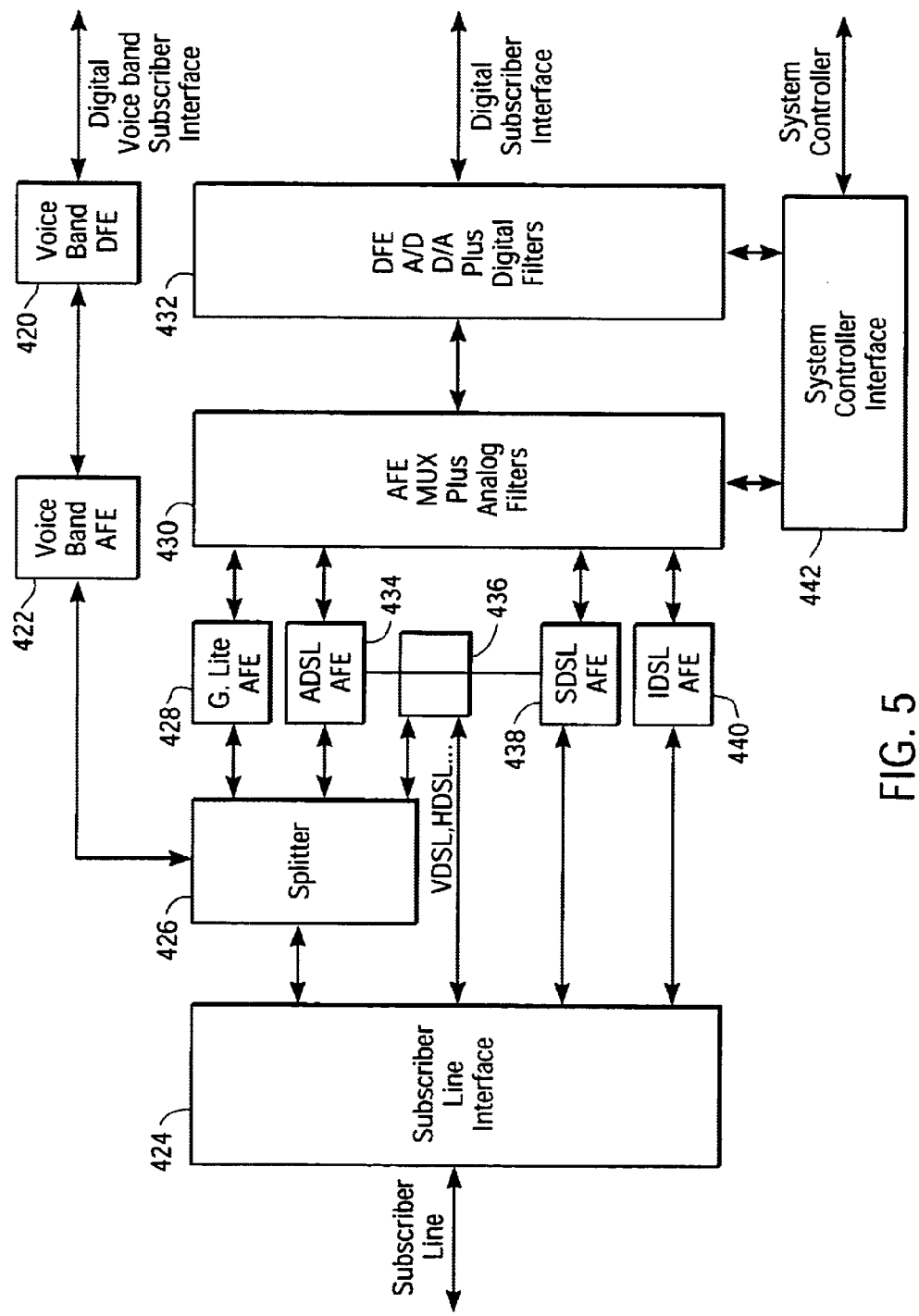
FIG. 5 is a functional block diagram illustrating an embodiment of the multi-DSL line interface.

FIG. 5 is a detailed illustration of the multi-DSL line interface capability of one embodiment of the current invention. In one embodiment, the AFE MUX plus analog filters 430 allow for the integration of multiple protocols, such as G. Lite and ADSL. More particularly, the embodiment shown in FIG. 5 interfaces different protocols in such a manner that a MUX existing at the front end on the analog side is used to select, under the control of the system controller interface 442, which specific front end output is digitized by the system. Selection under the control of a system controller interface 442 enables dynamic switching between various protocols, such as ADSL to SDSL by the use of the multiplexing capability. Appropriate analog filters required by the specific DSL technology protocols are utilized to achieve the required signal characteristics and are part of the capability of the AFE MUX plus analog filter block 430. The subscriber line interface 424 incorporates the capability of interfacing with a variety of DSL technologies and has the ability to aggregate these multiple functions within one subscriber line interface.

The Digital Front End (DFE) Analog to Digital (A/D) Digital to Analog (D/A) plus digital filters functionality 432 incorporates the capability of converting the signal from the digital to the analog domain and back from the analog to the digital domain. Additionally the DFE A/D D/A plus digital filters 432 is also capable of processing the resultant digital signal based on the specific protocol used, such as G. Lite or ADSL or SDSL. The DFE A/D D/A plus digital filters 432 in conjunction with the AFE MUX plus Analog Filters 430 process multi-DSL technologies at the input side and output a digital stream under the control of the system controller interface 442. FIG. 5 outlines the general multi-DSL interface capability that is able to deliver the line coding and the analog and digital processing to be compatible with the various DSL protocols, such as SDSL and/or ADSL. The multi-DSL capability of the present invention enables the ability to deploy dynamic provisioning.

In particular, multiple different subscriber line interfaces for digital traffic exist, among others; IDSL, which is essentially an ISDN-based DSL; SDSL, which is a symmetric digital subscriber line capability; ADSL, which is an asymmetric digital subscriber line interface, as well as more popularly known interfaces as G. Lite. These multiple DSL technologies are illustrated in FIG. 5. Subscriber Line Interface 424 incorporates the capability of interfacing to the subscriber line, isolating and protecting the subscriber line so that a multi-DSL capability can be serviced. In one embodiment of the present invention, separate Analog Front End (AFE) circuits interface to several DSL technologies, such as G.Lite (AFE 428), ADSL (AFE 434), SDSL (AFE 438), IDSL (AFE 440), among others. In one embodiment, the AFEs interface to a general AFE multiplexer/analog filter 430. The AFE multiplexer/analog filter 430 incorporates the capability of selecting one of the AFE output signals, and filtering and conditioning the signal so that a Digital Front End is able to digitize and further process the signal. The multi-DSL line interfacing capability of the present invention makes it possible to support only a single DSL technology, so that only ADSL circuitry can be implemented, or just a SDSL circuitry or any combination of circuitries.

One embodiment of the present invention incorporates dynamic configuration of the DSL technology by selecting which of the AFE interfaces (428, 434, 436, 438, and 440) are actively utilized to interface to the AFE multiplexer/ analog filters 430. Splitter block 426 is a standardized splitter capable of isolating voice traffic from data traffic at the central office analogous to splitter block 384 of FIG. 4. The differentiation between the 426 splitter and the splitter blocks discussed in FIG. 4 splitter block 384, is that the splitter block 426 is a multi-signal splitter and provides isolation and interface capability to multiple front ends, such as G. Lite AFE 428, ADSL AFE 434, as well as other splitter based technologies as illustrated in 436 of FIG. 5. The general DSL AFE 436 incorporates AFEs for various other DSL types, such as HDSL, VDSL, among others. These technologies may be splitter or splitterless, symmetric or asymmetric. The SDSL AFE 438 and the IDSL AFE 440 interface directly to the subscriber interface because no POTS-based voice traffic is within the scope of this interface. New DSL technologies can also be expanded within this multi-DSL line interface functionality as standards are established and compatibility with existing standards allows. The splitter block 426 segregates the POTS-based voice traffic to interface to voice band AFE 422. The voice band AFE 422 incorporates an analog compression and digitization capability. The voice band AFE 422 is the analog interface for the voice circuit, and the voice band digital front end (DFE) 420 is a digital front end including compression and protocol formatting functionality. The digital voice traffic is then routed and switched using either POTS or voice over IP basis to the general network interface within the service provider's equipment.

F. Multi-Channel Multiplexing

Figure 6:
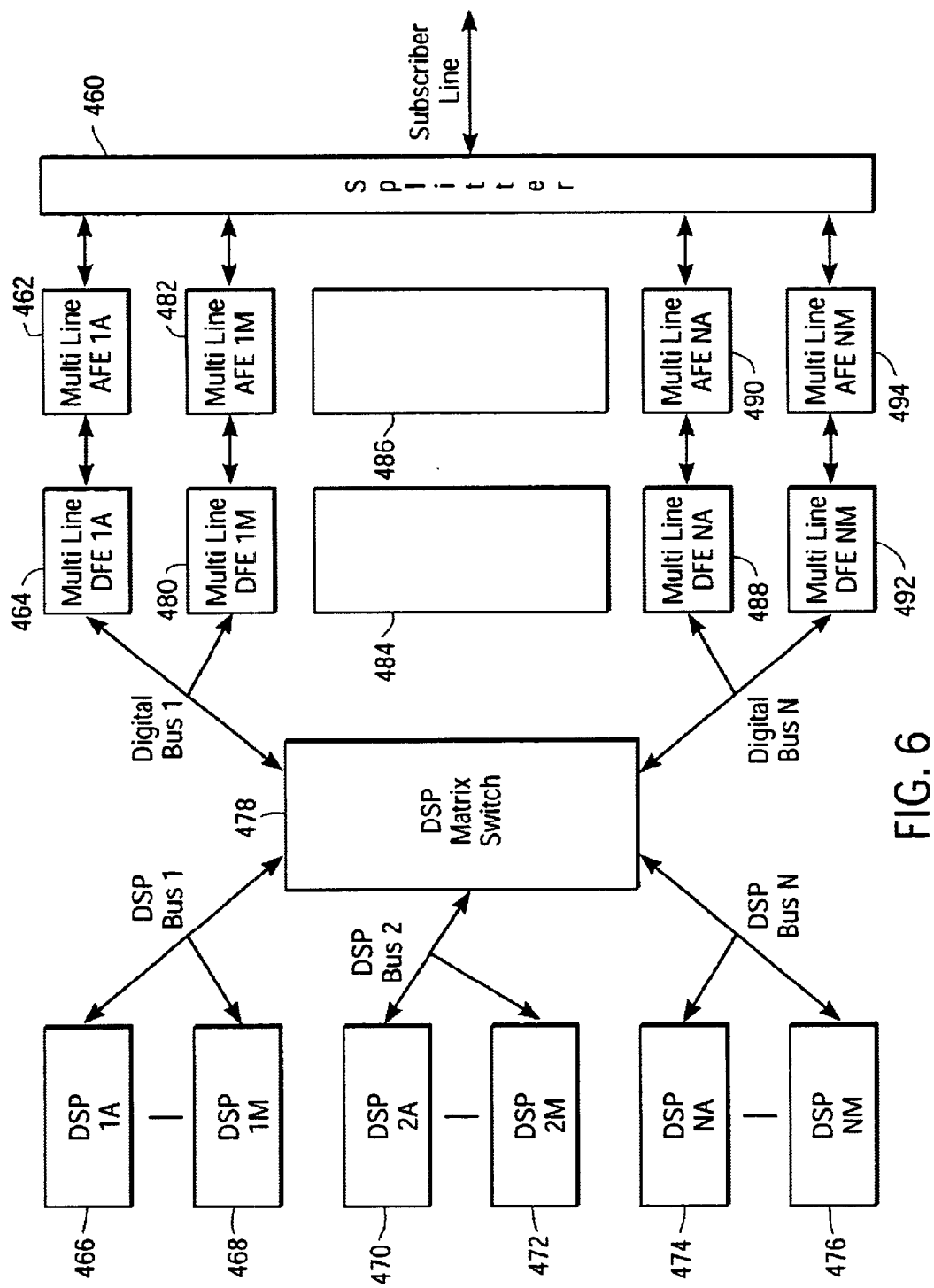
FIG. 6 is a functional block diagram setting forth a scalable, statistically multiplexed UIP Server architecture according to one embodiment of the present invention.

FIG. 6 illustrates the multiplexing nature of the present invention. One of the underlying themes within the UIP server architecture is that resource usage has been optimized at every level of the architecture. In particular, FIG. 6 splitter block 460 demonstrates the interface to multiple subscriber lines. One to a plurality of subscriber lines interface to the splitter block 460, the high frequency content of the signal is then forwarded to the multi-line AFE 462, 482, 486, 490 and 494. Multi-line AFE 1A is a multi-DSL analog front end and the associated circuitry as discussed earlier. One to M separate subscriber lines can be combined to a singular digital bus to be connected to the DSP matrix switch 478. FIG. 6 illustrates a multiline AFE 1A 462 connected to a multiline digital front end (DFE) 1A 464. The 1 in 1A indicates that the final target for this level of multiplexing is digital bus 1; the A in 1A indicates that the referenced line is line A, the first in a plurality of lines aggregated to digital bus 1. This notation will become clear as we go through the rest of the digital front ends and analog front ends. The high frequency signal split from the subscriber line through splitter block 460 into analog front end 462 1A, which is then processed for a multi-DSL capability, and is then passed on to multi-digital front end 1A 464. 462–464 complex can utilize ADSL service, in which case the multi line AFE 462 is a ADSL analog front end and the multi line DFE 464 is a digital portion of the ADSL front end. The output of 464 then goes through a digital BUS that can be shared among a plurality of digital front ends 464 and 480 to ultimately connect to DSP matrix switch 478. The shared digital BUS is labeled Digital BUS 1 in FIG. 6.

In one embodiment, the DSP matrix switch 478 is a dedicated resource for connecting multiple digital buses to multiple DSP buses. It is responsible for routing various pieces of traffic to the various DSPs. The DSP matrix switch 478 is also responsible for traffic labeling and general housekeeping. The DSP matrix switch 478 in its simplest form is a simple programmable chip, such a FPGA or an ASIC. In a more complex embodiment the DSP matrix switch 478 is a full cage subsystem, in which the DSP matrix switch comprises either a bused architecture or a packet multiplexed architecture. The DSP matrix switch 478 can take multiple digital buses and then interface them to multiple DSPs through the use of a DSP bus 1 through N as illustrated in FIG. 6. The DSP resources illustrated by 466, 468, 470, 472, 474, and 476 are a plurality of DSP. Any one to any plurality of the DSP resources 466, 468, 470, 472, 474, and 476 can be populated based on the specific requirements of the network topology deployed. The DSP matrix switch 478 enable a great deal of customization and flexibility in terms of how much capability and how much processing deployment is done for a given service offering.

One or more digital front ends and the respective analog front ends can be bonded together to form a digital bus 1 and that multiple digital busses, such as 1 through N, can then interface to the DSP matrix switch. The multi subscriber line bonding enables a multiplexing capability, either in a time domain or packet switch manner, of interconnecting multiple subscriber lines, process them by multiple DSPs.

Multi-line AFE 462 and 482 and multi-line DFE 464 and 480 show a plurality of digital and analog front ends going into one digital bus. Items 484 and 486 illustrate a plurality of digital front ends and their respective analog front ends for multiple buses that interface to the DSL matrix switch. Multi line AFE 490 and 494 and multi line DFE 488 and 492 interface together to form the final bus that goes into a DSP matrix switch. When certain lines or busses are inactive on the DSP matrix switch 478, it intelligently monitors traffic and only routes and switches the traffic to the appropriate DSPs. The DSP matrix switch 478 enables the capability of sharing the DSP resources across the multiple digital front ends. This methodology enables optimized scalable capability of expanding the network. In a particular embodiment, assuming four digital busses exist and each bus has at least two multi-line subscriber lines attached to it. The sum total represents eight different subscriber lines interfacing to the DSP resources. The four digital busses in this embodiment could be directed towards a single DSP bus in which only a single DSP is actually installed. Scalability is achieved when during initial deployment of the service offering which enables each subscriber to achieve a minimum connectivity, such as for example an ADSL service of 256 kilobits downstream. If the service provider later chooses to either expand the subscriber lines by expanding the total number of subscriber lines per additional bus or be able to expand the bandwidth of any given subscriber line, such as 256K service to 512K service, one or more DSP resources can be added on an as-needed basis. The DSP matrix switch 478 dynamically takes this into account. FIG. 6 illustrates the capability of expanding the DSP resource capability while yet maintaining a very low cost of entry.

Figure 6A:
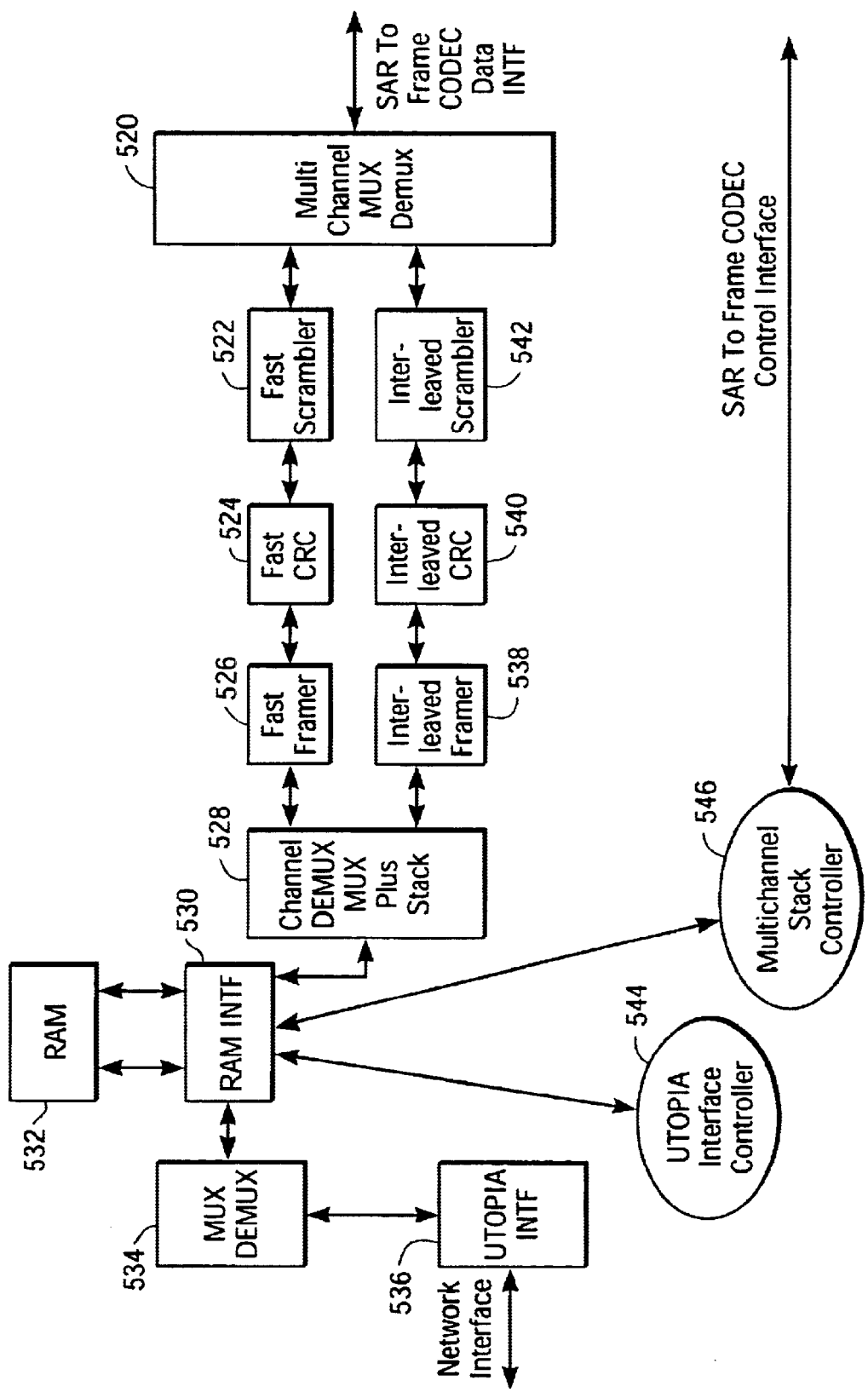
FIG. 6a is a functional block diagram of a scalable statistically multiplexed SAR controller.
Figure 6B:
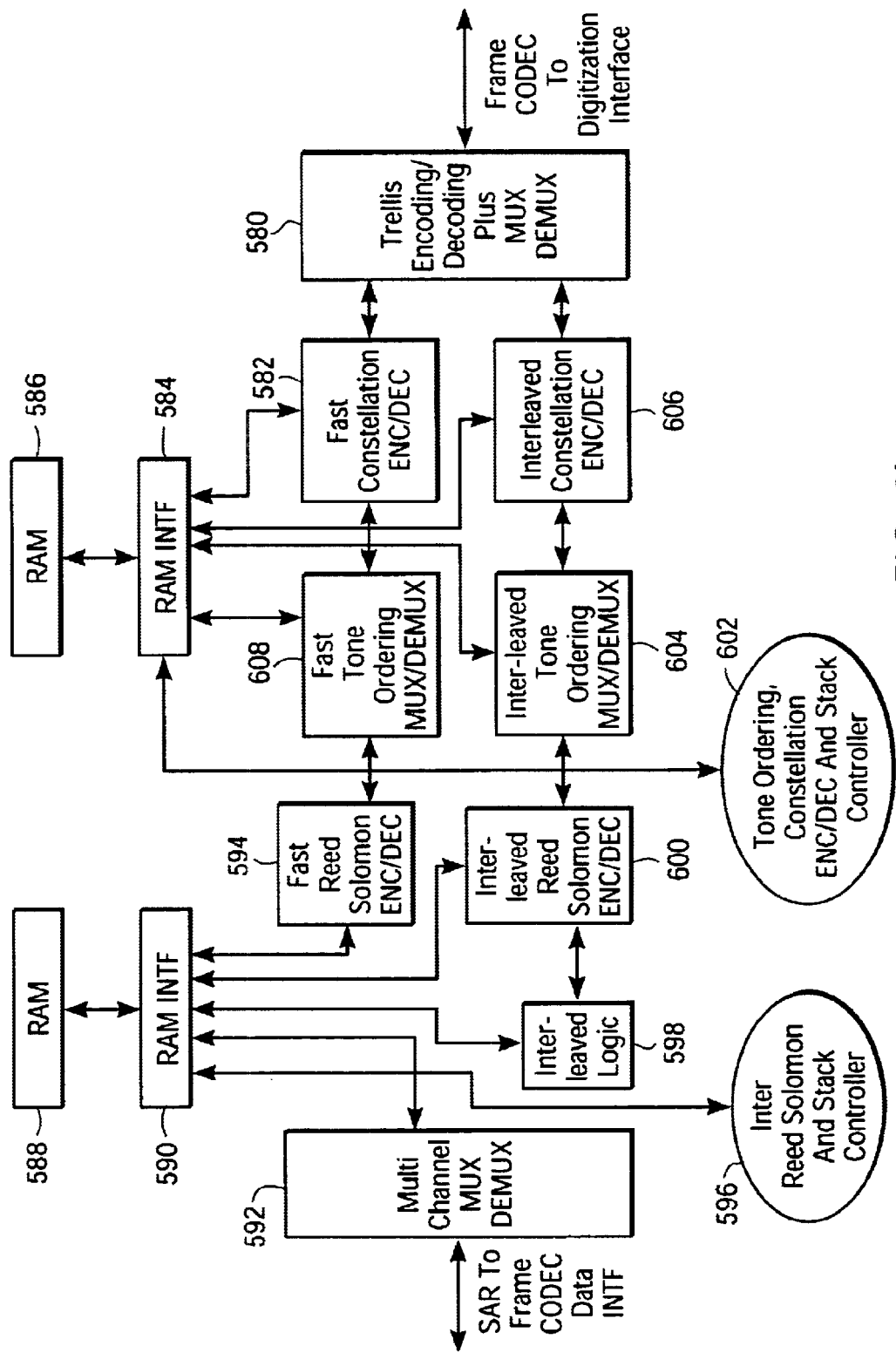
FIG. 6b is a functional block diagram of a scalable statistically multiplexed frame CODEC controller.

FIG. 6a and 6b outline the details of the multi-line digital front end statistical multiplexing capability. The multi-line DFE 464 as illustrated in FIG. 6 can either interface to one subscriber line or a plurality of subscriber lines. The digital front end in the embodiment of an ADSL modem is subdivided into two separate portions. FIG. 6a illustrates the segmentation and re-assembly controller (SAR) and FIG. 6b illustrates the frame CODEC controller. In FIG. 6a, the SAR controller is a programmable or a one-time programmable device or a custom device such as an ASIC that is capable of interfacing to a plurality of subscriber lines. Diagram 6a shows a Utopia interface 536, MUX DEMUX 534, RAM interface 530, RAM array 532, Channel DEMUX MUX plus STACK interface 528, fast framer 526, fast CRC 524, fast scrambler 522, interleaved framer 538, interleaved CRC 540, and interleaved scrambler 542, with a multi-channel MUX DEMUX 520, and the interface to the frame CODEC data interface. In one embodiment, these elements are the minimum required functionality to be able to support at least a single channel of traffic for the segmentation and re-assembly controller, which is a subset of the ADSL modem chip.

The multiplexed SAR controller uniquely implements a multi-channel stack controller 546. The utopia interface 536 is inherently a multi-channel-capable device. Multiple data streams are supported by utilization of addressing within this bus. One embodiment of the SAR controller is able to isolate any given stream with a specific address or a plurality of specific addresses and process it for either broadcast capability to a plurality of DSL channels or a unicast capability to a given DSL channel through use of a multi-channel stack controller 546. The RAM interface 530 and the RAM array 532 form a storage mechanism to buffer the traffic from the utopia interface 536. Utopia traffic is stored on an as is basis and is utilized by the multi-channel stack controller. Under configuration of the utopia interface controller 544 specific utopia channels are assigned to specific DSL subscriber lines. Furthermore, utopia traffic data is stored in the RAM array 532 through use of the utopia interface controller 544 and the RAM interface 530. The multi-channel stack controller queries to see which channel is ready for processing through use of a time-out. When a time-out occurs on a specific DSL subscriber channel there is a requirement for additional data to be transferred from the RAM array to the SAR to Frame CODEC data interface. The multi-channel stack controller takes the data out of the stages of the fast framer 526, fast CRC 524, fast scrambler 522, the interleaved framer 538, the interleaved CRC 540, the interleaved scrambler 542, by use of the pathway of the channel demux mux plus stack 528 and stores it within the RAM array for later recovery. The multi-channel stack controller then switches the context of the stack to the required channel by restoring the data previously stored into the RAM array 532 through use of the RAM interface 530 and loads the required stack condition via the channel demux mux plus stack 528. Under control of the system controller a stack push occurs in that the previous state or initialization state is stored from the respective elements 528, 526, 524, 522, 540, and 542. Under control of the system controller a stack pop occurs in that the previous state is restored from the RAM array 532 to the respective elements 528, 526, 524, 522, 540, and 542.

The system controller in conjunction with the multi-channel stack controller 546 is managed such that a given state can be recovered from the RAM array as the sequencing requires. By utilization of the stack capability, a single set of dedicated digital resources can be utilized to service multiple channels. The multi-channel MUX DEMUX is capable of processing multiple channels and being able to tag each of these channels so that data can be recovered in a predictable manner. This illustrates the multi-channel stacking capability. The single channel capability can simply be the limiting case were the stack push and pop mechanism has an infinitely long cycle time. A unified channel processing multiplexed architecture of FIG. 6a is advantageous in that real estate and power consumption is minimized and the architecture is demand driven. The multi-channel MUX DEMUX 520 is responsible for multiplexing and de-multiplexing based either on a packet-basis or a time-multiplexed basis. The data stream is then forwarded to a framed CODEC through use of the SAR to frame CODEC data interface as illustrated in FIG. 6a.

In FIG. 6b, the multichannel MUX DEMUX 592 accomplishes the reverse process of the multichannel MUX DEMUX 520 of FIG. 6a. The multichannel MUX DEMUX 592 is responsible for de-multiplexing or multiplexing based either on a packet-basis or a time-multiplexed basis. The multichannel MUX DEMUX 592 then packetizes the data stream and forwards it to the RAM interface 588 as illustrated in FIG. 6b. The RAM interface 590 controls the interface to the RAM array 588 and stores the data stream into the RAM array 588 as required. The combination of the RAM interface 590, the RAM array 588, and the interleaving Reed Solomon and stack controller 596 enables the stack capability, the interface capability of loading and storing multiple data streams in a recoverable manner. Data is stored within the RAM array and then, based upon the stack controller timing as described earlier for the SAR controller, and under the control of the system controller, the Reed Solomon processing takes place. The data stream is extracted from the RAM array, and, in the case of the fast data, is made available to the fast Reed Solomon encoder/decoder 594 which then interfaces to a fast tone ordering MUX/DEMUX 608. The output of the fast tone ordering MUX/DEMUX 608 is then stored within the different RAM array 586 through use of a different RAM interface 584. The data stream is then reordered by use of the tone ordering, constellation encoder/decoder and stack controller 602. The data stream out of the RAM array 586 is extracted in a different order than was originally stored. In this manner tone ordering can be accomplished in a simplified manner.

The data is then passed on to the fast constellation encoder/decoder 582 which then stores the data and executes a lookup functionality in one embodiment. An alternative embodiment implements the fast constellation encoding/decoding through dedicated hardware. The resultant data stream of the fast constellation encoder/decoder 582 is then further processed by the Trellis encoding/decoding plus MUX DEMUX 580. The output of the Trellis encoding/decoding plus MUX DEMUX 580 is ready to interface to the analog front end. The interface is called the frame CODEC to digitization interface. The interleaved path is analogous to the fast path with the addition of the interleaving logic 598. The interleaving logic 598 reorders the data stream so that the data from the SAR to frame CODEC data interface at the multichannel MUX DEMUX 592 is in a different order as resulting to the interleaved Reed Solomon encoder/decoder 600. The interleaved tone ordering MUX DEMUX 605 and the interleaved constellation encoder/decoder 606 is analogous to the same circuitry for the fast circuit but essentially maintains a separate stream boundary. A further optimization of the statistically multiplexed scalable architecture of FIG. 6b is that the stack controller functionality could not only process a single type of a multiple channel stream, such as just a fast stream or just an interleaved stream, but rather it can be expanded to include a stack context switch from the fast and interleaved stream capability. FIG. 6b statistically multiplexed frame controller illustrates the capability of accepting a multichannel interface from the SAR controller of FIG. 6a, processing the data on a either packetization or time-domain multiplexing basis and as required for the specific DSL technology, and finally to provide a data stream ready for forwarding to the digitization interface.

Figure 8A:
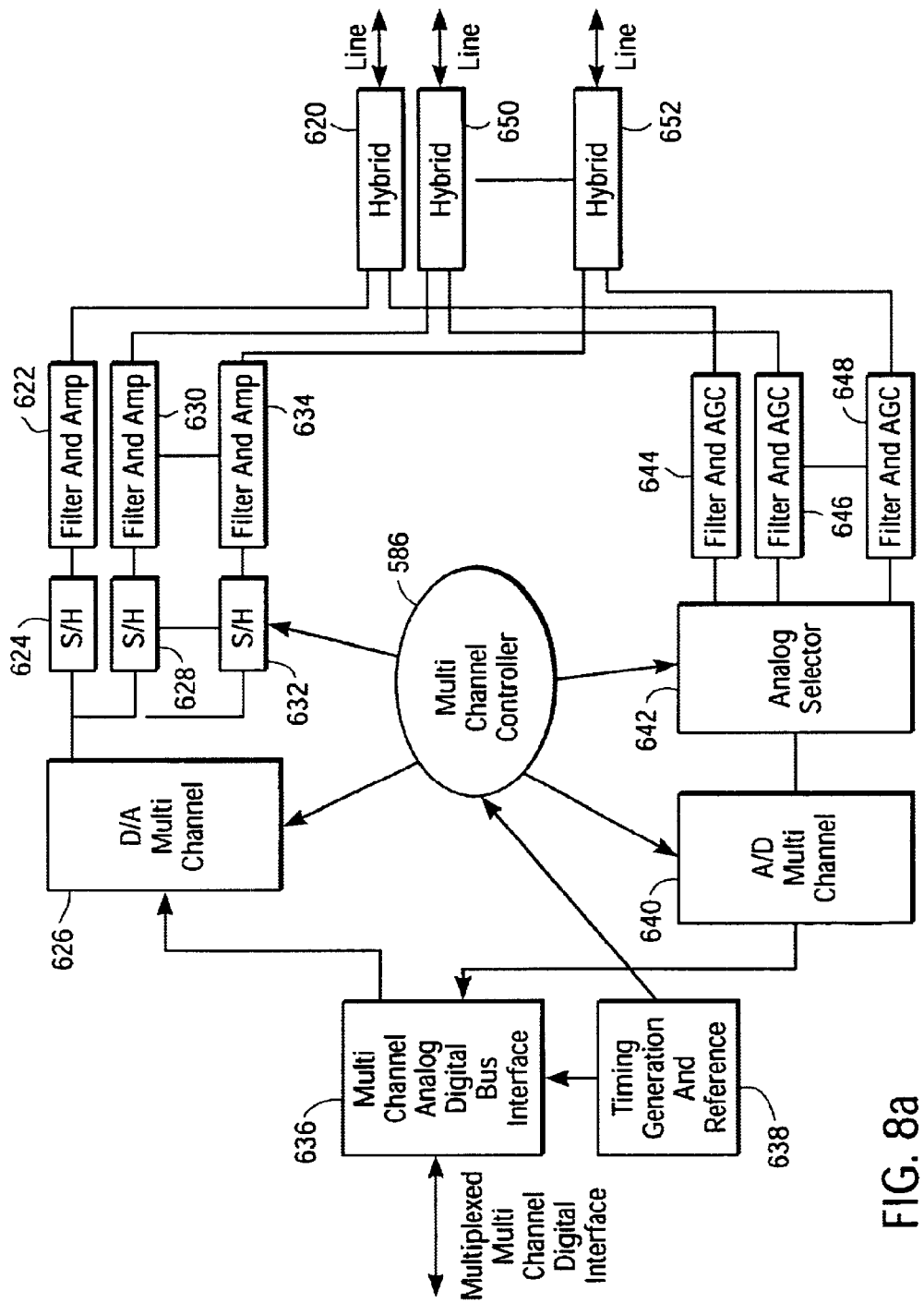
FIG. 8a is a functional block diagram setting forth an embodiment of a multi-channel A/D-D/A architecture.

The present invention incorporates the capability of a multichannel architectural design for the analog/digital and the digital/analog conversion. FIG. 8a illustrate the capability of the multichannel analog front end. The multi-channel AID and D/A architectural design utilizes a digital to analog converter (D/A) multichannel device 626 as illustrated in FIG. 8a and a multichannel A/D device 640 also illustrated in FIG. 8a. The D/A 626 and the A/D 640 are both capable of oversampling compared to the standard frequencies at which a standard single-line DSL interface works. FIG. 8a is exemplary of a ADSL architecture although the application of the multichannel capability relates to number of different DSL formats, such as IDSL, and SDSL. The A/D 640 and the D/A 626 operate at a much higher frequency than a single line interface the exact oversampling ration is a function of the total number of line interfaces that are supported, and the oversampling implemented at every single channel.

A subscriber line interfaces to a hybrid 620 which is essentially a multi-DSL line analog front end as discussed in an earlier section. The hybrid circuitry separates a signal from the transmission perspective and the reception perspective. Furthermore, it incorporates the line interfacing capability and the various requirement of the analog circuit based on a variety of DSL technical requirements. The received signal is then processed by a filter and ACC 644 module that filters and provides an automatic gain control within the requirements of the specific DSL protocol implemented. The output of the filtered signal is then sent to a analog selector 642.

The analog selector 642 selects one input from a selection of multiple inputs. FIG. 8a multichannel A/D and D/A architectural design illustrates a four-channel design. Therefore 644, 646, and 648 represent three of the four channels and the dashed line between the filter & agc 646 and the filter & agc 648 represent anywhere from one to plurality in the standard case and in the case of a four channel design represent a single channel filter & amp. Filter & amp 644 through 648 represent four channels to be filtered. In one embodiment the analog selector 642 is a four-to-one analog selector. The output of the analog selector 642 is forwarded to a multichannel A/D 640. The multichannel AND 640 derives its multichannel capability from the oversampling and the timing correlated to the analog selector. The A/D multi channel 640 is itself a single analog-to-digital converter device. The timing relationship between the analog selectors channel selection and the A/D multi channel 640 digitization represents a given channel's bit stream. The resultant bit stream is either time-multiplexed or is packet multiplex and is forwarded to a multichannel analog/digital interface bus 636.

Timing generation and reference module 638 is responsible for coordinating the timing through the use of the multichannel controller 586. The timing generation and reference module 638 controls the timing of the A/D 640, the timing of the analog selector 642, digitization from the A/D 640, multiplexing across multichannel bus interface 636, and the timing for the formatting of the multi channel analog digital bus interface 636. The timing generation and reference 638 is not only responsible for the timing and reference generation for the A/D side but also for the D/A side 626. In combination with the timing generation reference 638 and the multichannel controller 586, the D/A 626 digitizes a digital stream from the multichannel analog/digital bus interface 636. The data at the 636 multichannel analog/digital interface in combination with the D/A multi channel converter 626 creates a stream of digital data with specific timing correlation, either in the packet or time-domain manner. The resultant data stream is then forwarded to a sample-and-hold circuitry 624, 628 and 632. The sample-and-hold circuitry at 624, 628 and 632 is a time multiplexed signal, and therefore the multiplexing of the D/A multi channel 626 and any buffering of the streams in the case of packet stream as required would occur previous to this section, either at the D/A multichannel digitizer 626 or multichannel bus interface 636. In either case, after the sample-and-hold circuitry 624, 628 and 632, separate segregated signals are generated that are sampled under the control of the timing generation and the multichannel controller 586 to represent a continuous single stream at each of the separate modules 624, 628, and 632. These separate signal streams are then forwarded to dedicated filter and amplification circuitry 622, 630, and 634 and respectively create an analog stream. The resultant transmitting analog stream is then combined to the receiving analog stream by the hybrid circuit 620, 650, and 652. In the case of a four-channel design, the dotted line represented between 628 and 632 represents only a single additional sample and hold circuit, the dotted line between the filter and amp 630 and 634 represents only a single additional filter and amp, the dotted line between the hybrid 650 and 652 represents only a single additional hybrid. The D/A multi channel 626 and the A/D multi channel 640 are limited resources. Single higher performance devices are utilized within the present invention and intelligently managed for multichannel capability through use of either analog selector or analog sample and holds. The data is multiplexed and de-multiplexed in the analog domain.

Figure 8B:
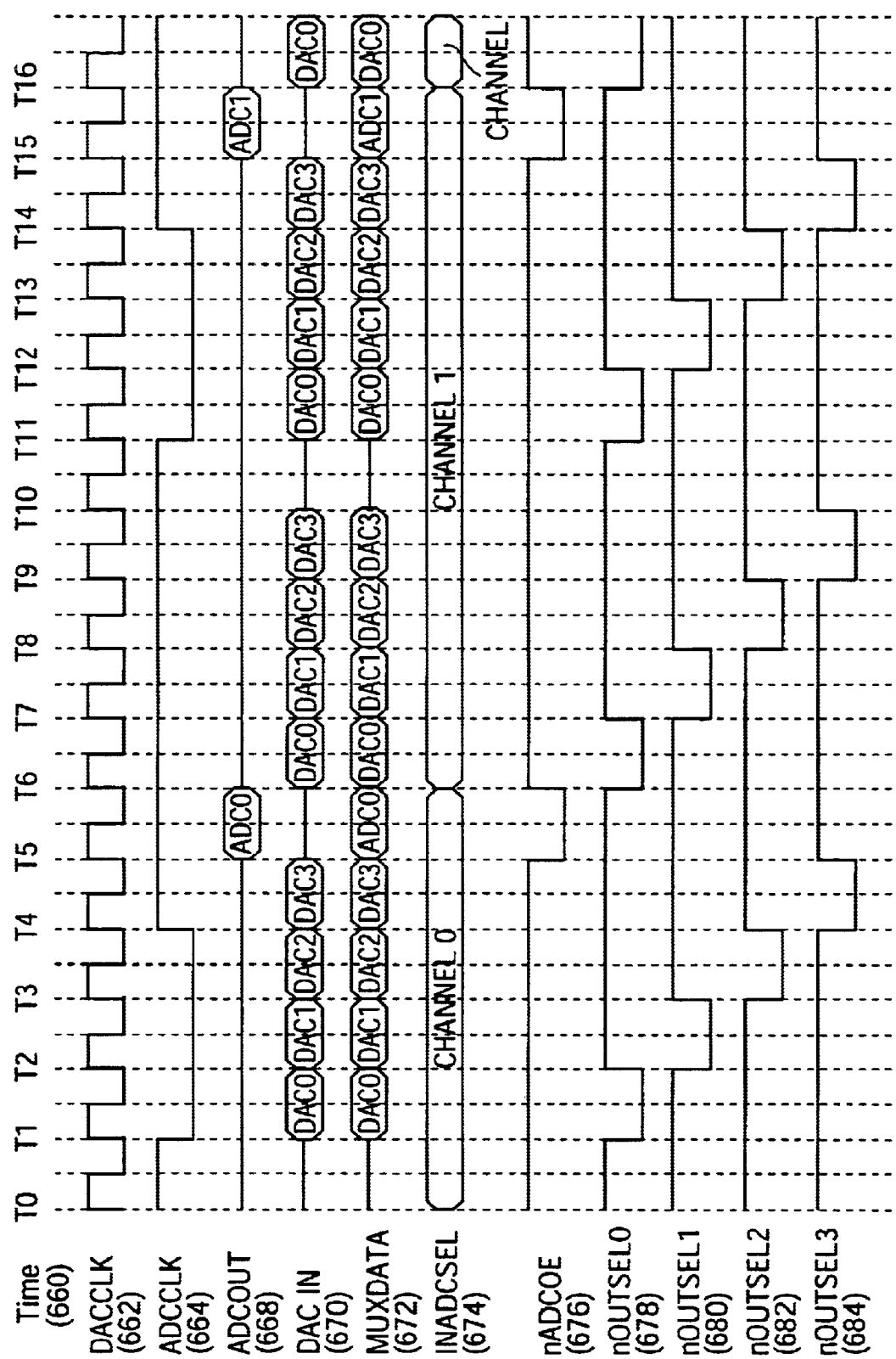
FIG. 8b is a timing diagram illustrating multi-channel multiplexing.

FIG. 8b illustrates the timing diagram of the multichannel multiplexing of the Analog to Digital and the Digital to Analog converters of one embodiment of the present multichannel device for a single DSL technology, namely ADSL, with a four line multi channel support. In the case where a singular DSL technology is followed, the exemplary diagram shows a simple ADC clock 664 relationship to a DAC clock 662 relationship. For multi-DSL capability this relationship would be more complex, and depending on which channels are multiplexed, multiple A/D devices may be required to achieve a dedicated multi-DSL capability.

The basis of the timing relationship in the embodiment shown is the DAC clock. The DAC clock in the case of ADSL will operate at some nominal frequency related to 2.208 MHz, as required by the ADSL protocol. ADSL is an asymmetric bandwidth protocol in that the downstream bandwidth and the upstream bandwidth ratio is greater than unity. The ADC clock 664 in this diagram is a 10:1 relationship to the DAC clock and is equal to a multiple of 276 kHz sampling clock as required by the ADSL protocol. The ADC out 668 illustrates two sample points at timing intervals between T5 to T6 called ADC 0 and between timing intervals T15 through T16 called ADC 1. These two points represent two discrete sample points of the A/D converter. ADC 0 represents the timing sampling of channel 0, whereas, ADC 1 represents the sampling of channel 1. The next signal DACIN 670 represents the input side data to this module. Between interval T1 to T2 sample point DAC 0 is transmitted, between interval T2 to T3 DAC 1 is transmitted, between interval T3 to T4 DAC 2 is transmitted, and between interval T4 to T5 DAC 3 is transmitted. Between the interval T5 to T6 the ADC out signal is active on the bus as illustrated by the MUXDATA 672 timing diagram below the DACIN 670 diagram. The DACIN 670 timing diagram further illustrates that between the timing interval T6 to T7 DAC 0 is again transmitted and so on as illustrated in FIG. 8b.

The MUXDATA 672 represents the state of the bus at the interface. MUXDATA is a bidirectional bus and, therefore, incorporates the ADCOUT signal at the output side, and the DACIN signal at the input side. The direction of the bus is determined by the state of the nADCOE 676, and the nOUTSEL0 678, the nOUTSEL1 680, the nOUTSEL2 682, and the nOUTSEL3 684. Thus FIG. 8b timing diagram for multichannel multiplexing illustrates the interleaving capability of the ADC data and the DAC data to form one singular data bus.

Furthermore, FIG. 8b also illustrates that null cycle time slots can be strategically incorporated within valid cycle time slots to manage the required timing relationships, this is illustrated in the MUXDATA 672 timing diagram between timing intervals T0 to T1 and then again between timing interval T10 and T11. Furthermore, FIG. 8b also illustrates the capability of oversampling the Digital to Analog converter by a factor of 2 while not oversampling the Analog to Digital converter.

The signal INADCSEL 674 of FIG. 8b indicates the channel state of the analog selector. Previous to timing interval T6, the channel state of the analog selector is in 0. Once the analog to digital converter has been sampled, previous to timing interval T5, and the result is transmitted to the next stages by the beginning of interval T6, the channel state of the analog selector changes to channel 1. The channel 1 then stays stable throughout the complete sampling cycle to timing interval T16.

The nADCOE 676 signal is the state of the circuitry that enables the ADC data onto the multiplexed BUS, and it manages the timing to ascertain that the ADC and the DAC data do not contend with each other. The next four signals labeled nOUTSEL0 678, nOUTSEL1 680, nOUTSEL2 682, and nOUTSEL3 684, illustrate a selection mechanism which indicates to the D/A which of the specific D/A channels are active. In the timing interval from T1 to T2 when DAC 0 data is made available the nOUTSEL0 678 signal indicates to the sample and hold that the current digitized data should be sampled by the sample and hold for channel 0. Whereas, the nOUTSEL1 680 from interval T2 to T3 indicates to the sample and hold for channel 1 that its data should be sampled at that point. From the interval T3 to T4 nOUTSEL2 682 signal indicates to the sample-and-hold circuit that channel 2 sample and hold should be activated. nOUTSEL3 684 from interval T4 to T5 indicates to the sample-and-hold circuitry that its data for channel 3 should be sampled and held.

The timing intervals between nOUTSEL0 pulse 1, between timing interval T1 and T2, to nOUTSEL0 pulse 2, between timing interval T6 to T7, and from nOUTSEL0 pulse 2, between timing interval T6 to T7, to nOUTSEL0 pulse 3, between timing interval T11 and T12, are symmetric. Due to the symmetric periodicity of the signal, the A/D circuitry, the filtering circuitry, the D/A circuitry, sample-and-hold circuitry, and the filter circuitry can implement a simple sampling system and no special timing considerations need to be made due to the multichannel muxing capability of this interface. The diagram in FIG. 8b is only an exemplary diagram of sample processing on a time domain basis for a specific ADSL four line multiplexer, other DSL technologies, oversampling ratios, line counts, among other factors will vary with the specific embodiment of the present invention.

G. General Process Controller Architecture

Figure 9:
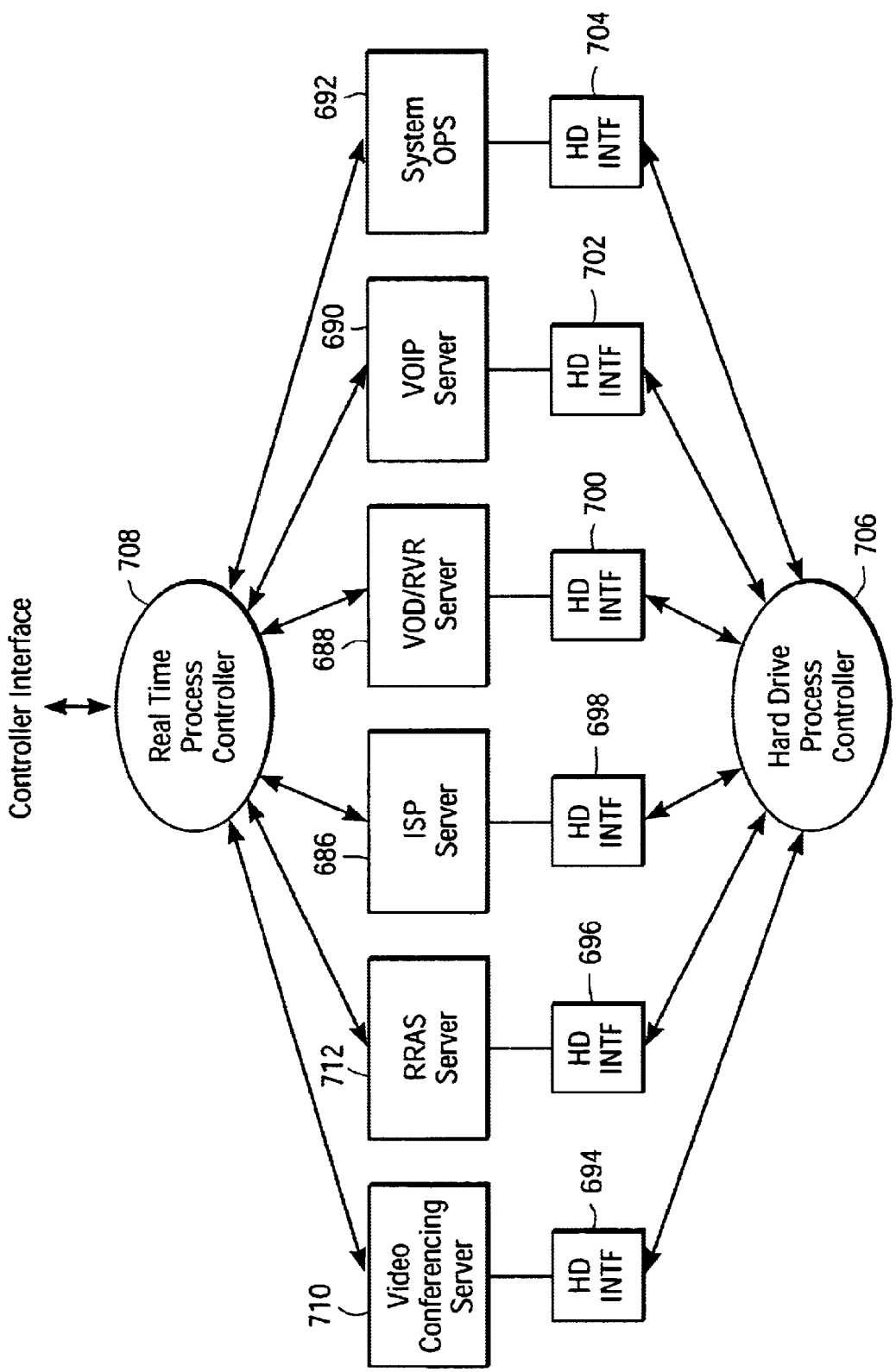
FIG. 9 is a functional block diagram showing an embodiment of the general process control architecture.

FIG. 9 illustrates the general process controller architecture of one embodiment of the present invention. FIG. 9 illustrates that multiple modules that requiring differing levels of quality of service and differing bandwidth needs can interface with their own specific hard drive interfaces which are optimized to access serialized and non-serialized data from a storage device in an efficient manner. The overall process model within the process controller architecture is demand driven in that whenever a subscriber or system controller requests a service, the general process controller architecture is optimized to be able to provide the requested service in the specified manner as necessary to maintain the bandwidth and quality of service considerations. Due to the high performance requirements of the current invention the realtime process controller 708 is designed to support multiple streams.

A hard drive process controller 706 is illustrated in FIG. 9 which is responsible for all accesses to the hard drive interface through a direct hard drive interface, through an operating system BIOS interface, or through a network interface. Several parameters, hardware interfaces, and functional subsystems interact to coherently access the hard drive process controller 706 in an efficient multiple stream based manner. In particular, through use of a system controller interface, real-time process controller 708 detects a condition where service is requested by a specific process. The real time process controller 708 then schedules the request either in a round robin fashion, or on an interrupt fashion, to access functionality for the real time process controller as required. When, for example, a video conferencing data is required, the video conference server 710 makes a request to a hard drive interface 694, which in turn negotiates with the hard drive process controller 706 the bandwidth and performance required.

The RRAS server 712 is used for scheduling routing functionality. When RRAS server 712 determines that RRAS service is required from the hard drive it schedule this with the real time process controller 708. The real time process controller 708 classifies the request as a RRAS server request and, depending on its performance and quality of service requirements, negotiates a hard drive interface 696 to the hard drive process controller 706. The hard drive process controller 706 interfaces to the physical hard drive. When an ISP service is requested by one or more subscribers, the ISP server 686 negotiates the bandwidth and performance requirements from the hard drive interface 698. The hard drive interface 698 negotiates the data access to the hard drive process controller 706.

Similarly, VOD and remote video recorder capability is also negotiated by the VOD/RVR server 688 through the request to the real time process controller 708, and the negotiated access through the hard drive interface 700, to the hard drive process controller 706. Voice over IP services are negotiated through a voice over IP server module 690. The voice over IP server module 690 schedules a request with the real time process controller 708, and the negotiated access through the hard driver interface 702, to the hard drive process controller 706. Any system operations and maintenance requirements are negotiated through the system operations module 692, which in turn schedules and negotiates with the real time process controller, the negotiated access through the hard drive interface 704, to the hard drive process controller 706.

H. Multi-Protocol Activity Indicator

Figure 10:
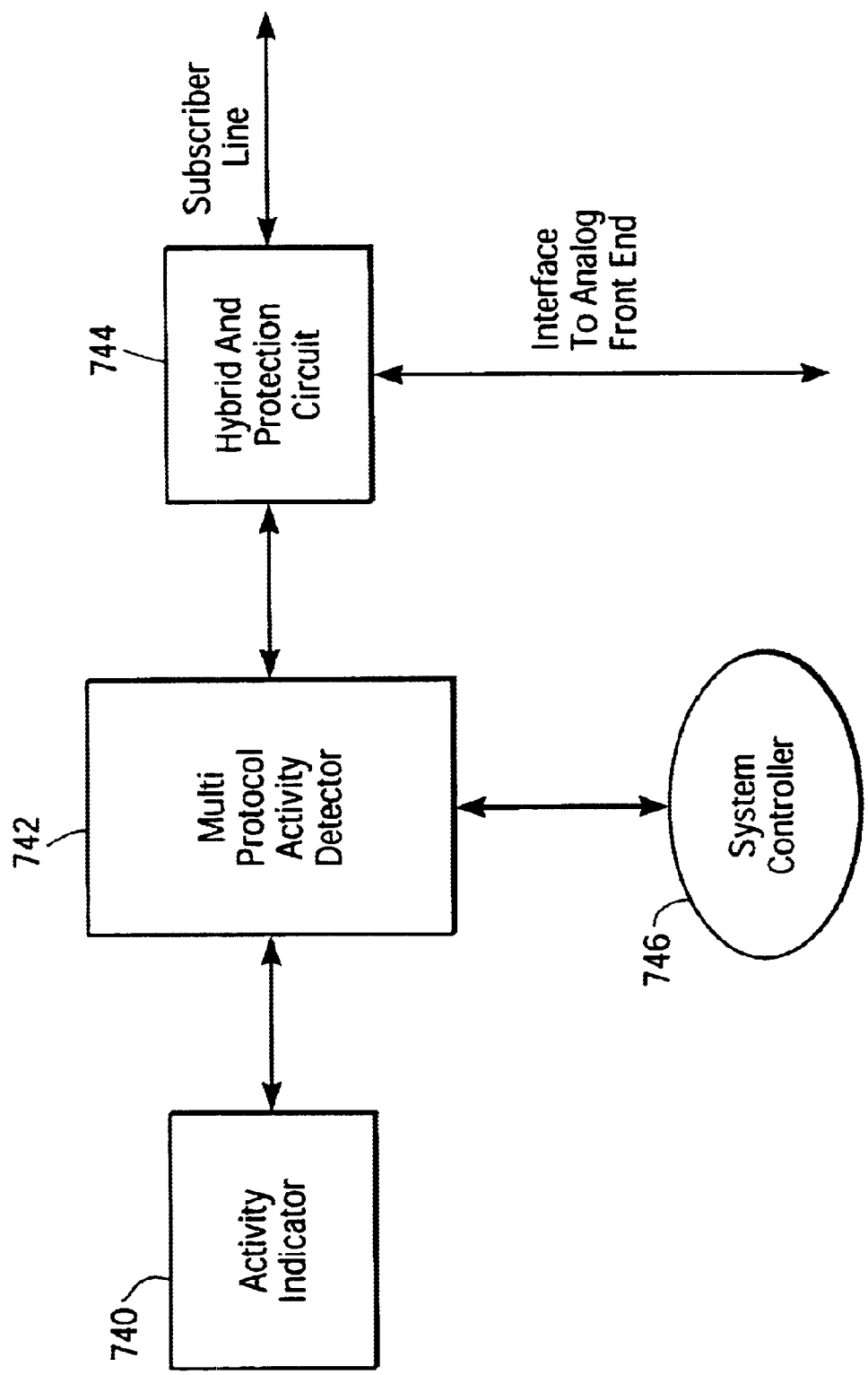
FIG. 10 is a functional block diagram illustrating an embodiment of a multi-protocol activity indicator.

An embodiment of the present invention incorporates the capability of a multi-protocol activity indicator. FIG. 10 illustrates the multi-protocol activity indicator. The present invention supports the capability of multiple DSL technologies and the ability to dynamically provision the type of DSL technology in service on any given subscriber line. Furthermore, the effective use of a multi-DSL platform requires the intelligent power conservation methodology. The present invention incorporates an activity indicator that then directs the system controller to switch the specific subscriber line into a standby mode when the subscriber or the central office is not actively utilizing data. Whenever data is not being utilized, the processing for modulation/demodulation can be placed in a standby mode to conserve power. Hybrid and protection circuit 744 is responsible for subscriber line interface, interface to the analog front end, the voltage and the power protection, and an interface to a multi-protocol activity detector. In one embodiment of the present invention, the multi-protocol activity detector 742 incorporates the capability of detecting SDSL, ADSL, and IDSL under control of a system controller 746. In one embodiment, the multi-protocol activity detector 742 does not distinguish between the information carried by the subscriber line, but rather simply focuses on performing a signature analysis on the received waveform to categorize it a SDSL, ADSL, or a IDSL active signal. The activity indicator 740 is a circuit which interfaces with the multi-protocol activity detector 742. If any data activity is detected by the multi-protocol activity detector 742 the activity indicator 740 forwards the detection state to the system controller.

I. Voice Traffic

Figure 11:
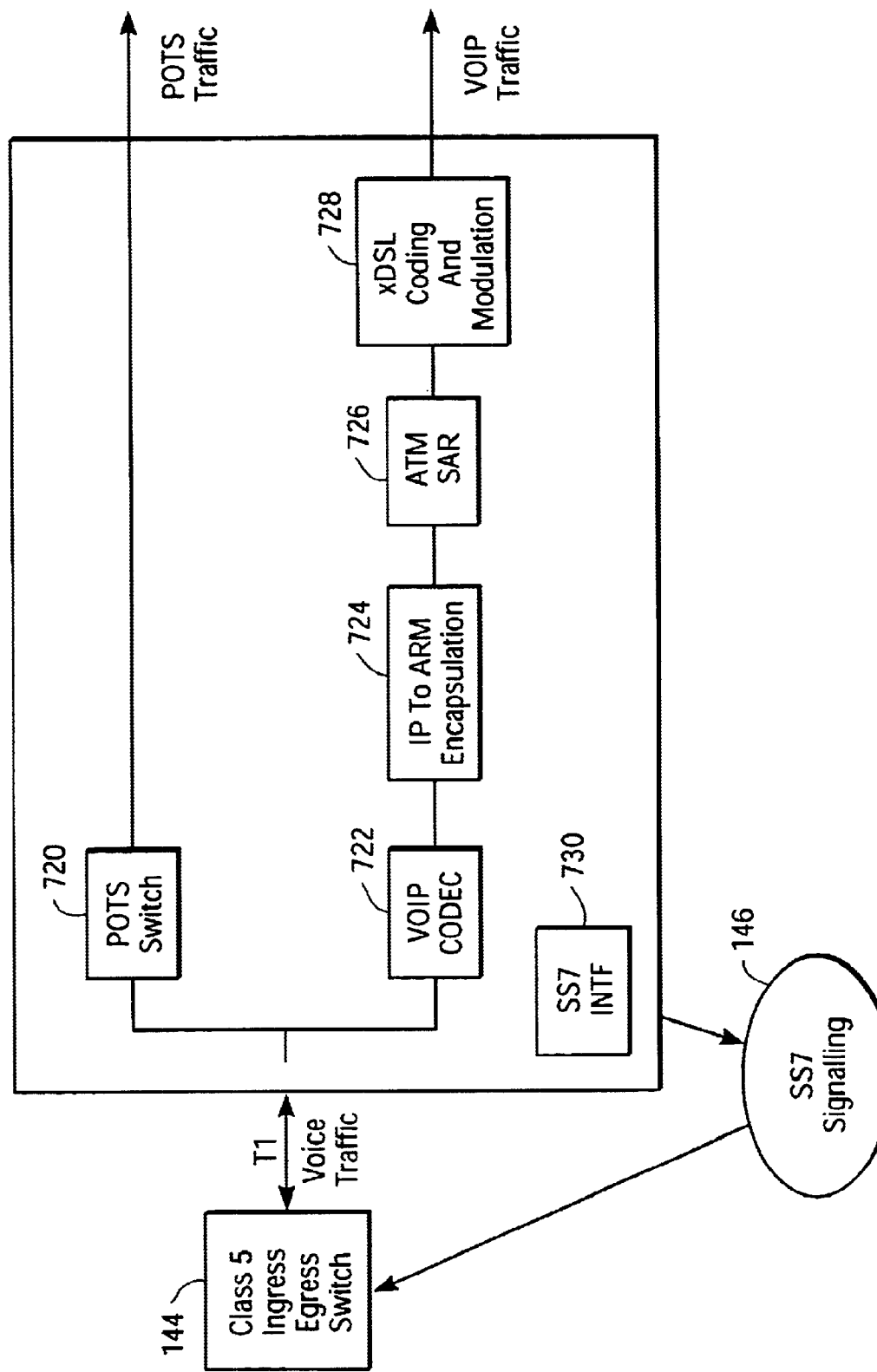
FIG. 11 is a functional block diagram illustrating an embodiment of the interface for a class 5 switch.

FIG. 11 outlines the class 5 switch interface of the UIP server architecture. Item 718 is a voice interface block of the UIP server. The voice interface block is comprised of two tracks, the POTS track and the VOIP track. The POTS switch 720 enables POTS traffic to be switched within the UIP server. The voice over IP track comprises of the voice over IP CODEC 722, IP to ATM encapsulation 724, ATM SAR 726, and DSL coding and modulation 728, it then forwards the DSL coded voice over IP traffic to the subscriber interface. Furthermore, the voice interface block 718 of the UIP server incorporates an SS7 interface. The voice interface block, in its entirety, directly interfaces to an SS7 signaling network 146 which directs traffic across a Class 5 ingress/egress switch 144. The actual voice traffic to the Class 5 ingress/egress switch 144 takes place either through a T1 voice line or across a standard DS0 un-terminated POTS line. From the perspective of the Class 5 ingress/egress switch 144, both the POTS traffic coming from submodule 720 and the voice over IP traffic coming through submodule 722 look identical in that they are both either digitized T1 voice traffic or DS0 traffic. The traffic to the Class 5 ingress/egress switch 144 in conjunction with the SS7 signaling is managed in a standard methodology of the public switching telephone network. The SS7 interface 730 incorporates functionality to be able to direct voice over IP traffic, to be able to isolate signaling as required from the POTS switch 720, to be able to indicate to the SS7 signaling network 146 the routing, switching and other information regarding the interaction with the Class 5 ingress/egress switch. The voice over IP CODEC enables DSL connectivity. The IP to ATM encapsulation 724, is responsible for digitizing the voice over IP traffic and then to encapsulate it in an ATM header. The resultant stream is then forwarded to an ATM segmentation and reassembly module 726, which is responsible for packetizing the stream into a standard ATM traffic type. The ATM segmentation and reassembly module 726 then forwards the traffic to the xDSL coding and modulation 728 module. The xDSL coding and modulation 728 module is responsible for formatting and processing the data stream into the required DSL-technology, such as SDSL, ADSL or IDSL among other.

FIG. 12*a* illustrates one of the simplest means within the current invention to carry multiple voice-based streams across the network. In particular, FIG. 12*a* is a graph of amplitude content versus frequency. Frequency carriers are centered at N0 with a spacing of distance S, and then N1, N2, N3, N4, N5, N6. The distances between N1 through N6 has been normalized to unity. The distance between N0 to N1 is S, where S is greater than unity. The separation between N0 and N1 is established by the relationship that the signal P0 centered around N0 is analog. Whereas the signals V0, V1, V2, V3, V4 and V5 centered around N1, N2, N3, N4, and N5 are digital carriers. Filtering between the analog P0 traffic and the digital V0 through V5 and D0 traffic needs to be done over a spectrally spaced channel, whereas the separation between N1 to N2 is smaller because the traffic V0 and V1 are actually digitized voice traffic and, therefore, no great separation is required except as required for the FFT in terms of being able to carry the carrier itself. FIG. 12*a* illustrates a single analog signal P0 and then six voice lines, V0, V1, V2, V3, V4, and V5, and finally data signal D0, carried across a single DSL channel. Traffic V0 through V5 as well as D0 could be either asymmetric traffic, or unidirectional traffic. Furthermore it can be bidirectional traffic through use of echo cancellation and like methodology as feasible within the specific DSL protocols. The separation N1 through N2 is fundamentally a carrier separation which is approximately to the order of 4 kHz which will be able to compress a maximum of 64 Kb across the given channel. This implies that the traffic V0 through V5 is uncompressed traffic and is fundamentally just either a uLaw or Alaw digitized standard voice traffic. D0 represents data traffic and occupies the spectrum above V5. The indicated spectral histogram is only an exemplary histogram of the embodiment shown.

FIG. 12*b* illustrates a frequency multiplexed multichannel voice over IP communication channel. It is analogous to FIG. 12*a* 732 with the addition of voice compression. FIG. 12*b* illustrates an analog carrier centered at N0 labeled P0 and is analogous to the voice traffic P0 as illustrated in FIG. 12*a* at carrier N0. The separation between N0 and N1 is S. S is the separation required for isolation of an analog POTS channel from the digitized high frequency data channel. FIG. 12*b* illustrates voice channel V0 through V5, the standard six channels, and also includes a data channel D0. In the frequency multiplexed multichannel compressed voice over IP communications channel diagram of FIG. 12*b* the data channel D0 begins at carrier N4 rather than N7 as illustrated in FIG. 12*a*. The channel bandwidth gain is resultant from the compression from 64 kbps to 32 kbps of the voice channels V0, V1, V2, V3, V4, and V5. Further compression beyond the 32 kbps is possible through use of a variety of known voice over IP standardized protocols, such as G.722. One embodiment of the present invention supports the voice compression standards so that the bandwidth utilized can be subscriber configurable between 64 kbps to 8 kbps.

J. Video Conferencing

FIG. 13 outlines the configuration of the video conferencing capability of the end-to-end subsystem incorporating UIP clients and UIP servers. FIG. 13 is a topographic diagram of the video conferencing aspect of an embodiment of the present invention. FIG. 13 illustrates three subscribers, S1 750, S2 752, and S3 754, each subscriber utilizing a different mode of video conferencing capability of the present invention. Subscriber 1 750, utilizes an interface through a standard personal computer with compression 774. The personal computer with compression 774 has direct connectivity for a microphone 757, a video camera 756, and a speaker 758. The personal computer with compression 774 compresses the video conferencing information into a standard protocol such as H.320 and transports this to a UIP thin client 224. The UIP thin client 224 is operationally a UIP client except in that it only supports the connectivity from a single interface, such as a personal computer. The responsibility of the UIP thin client 224 is to transport data from the personal computer with compression 774 and to provide the required modulation/demodulation capability and the subscriber line interface functionality required for the specific DSL technology or technologies. In this respect the data stream resultant from the video conferencing session is treated simply as a data stream with specific quality of service parameters. The video conferencing stream data from the UIP thin client 224 is transferred across the subscriber line to a UIP server 226. The UIP server 226 is a standard full-range UIP server. The video conferencing stream data from S1 is treated as data traffic and is either routed through the public switch telephone system 280 or routed through a standard IP router 142. The standard IP router 142 interfaces to the Internet 158. The advantage of the support for Subscriber 1 scenario to the present invention is that this is a typical current deployment, wherein the personal computer with compression 774 can be substituted by a dedicated video conferencing station.

Subscriber S2 752 in FIG. 13 utilizes a stand-alone UIP client set-top box without compression 780. The UIP client set-top box without compression 780 does not have the capability to compress the video conferencing data stream. The video conferencing digitization is done in a raw mode with only a cursory channel compression to carry the raw video conferencing traffic across the subscriber line. The subscriber S2 752 utilizes the standard television set 100 to communicate by use of the UIP client set-top box 780. In one embodiment of the present invention, the subscriber UIP client set-top box 780 has provisions for providing a camera input 762, a wireless microphone 764, a set-top box speaker 766, a television speaker via the television set 100. In FIG. 13, subscriber S2 does not have access to a standard personal computer to hold a video conferencing session. The UIP client set-top box without compression 780 forwards the raw video conferencing transport stream across a subscriber line to a UIP server 786.

The UIP server 786 can be configured to either utilize software compression or hardware compression. FIG. 13 illustrates the case where the UIP server 786 utilizes software compression to format and compress the data for compatibility with the standard video conferencing protocols. The video conferencing data stream is then passed on to IP router 142. The IP router 142 interfaces to the Internet. In the illustrative example of FIG. 13, the IP router 142 routes traffic through the Internet to the IP router 142, in this manner the subscriber 52 is capable of video conferencing with subscriber SI across the Internet.

Subscriber S3 754 utilizes a personal computer without compression 776 for a video conferencing session. The resultant raw video conferencing transport stream at the output of the personal computer without compression 776 is analogous to the traffic out of the UIP client.set top box without compression 780. The raw video conferencing data stream of the personal computer without compression 776 is forwarded to a UIP thin client 782. As in UIP thin client 224, the UIP thin client 782 treats the raw video conferencing data stream as simply a data stream with specific quality of service parameters. The UIP thin client 782 is responsible for the modulation/demodulation capability for forwarding of the raw video conferencing transport stream to the UIP server 288. The UIP server 778 supports the capability of providing dedicated hardware video conferencing compression. Furthermore, the UIP Server 788 can communicate across an ISP network to a different UIP server 786. The ISP network can either reside at the service provider premises or the central office premises, wherein multiple UIP servers are configured to serve different video conferencing clients, either through the use of dedicated set-top boxes or simply personal computers. The illustrative example of a video conferencing session between subscriber S2 and the subscriber S3 utilizes a network based connection and does not occur across the Internet. In one embodiment, UIP servers 226, 786, and 788 all include edge routing capability. Therefore, a specialized router is not required, such as 142, for routing and switching traffic within the UIP Server network.

FIG. 13 illustrates the asymmetric nature of video conferencing when more than two parties are involved. While point-to-point video conferencing is a symmetric task, a multiperson-to-individual video conferencing is an asymmetric task. If subscriber S1 750 were to simultaneously hold a video conferencing session with subscriber S2 752 and subscriber S3 754, all the subscribers S1 750, S2 752 and S3 754 have an upload traffic equal to one video conferencing channel. Subscribers S2 and S3 both will have a downstream traffic equal to one video conferencing channel, in particular from S1, whereas subscriber S1 will have a downstream traffic equal to two video conferencing channel, in particular, from S2 and S3. Thus, the video conferencing bandwidth requirements are symmetric for a point-to-point connection, and highly asymmetric for a point-to-multipoint connection at worst. The current invention of the UIP server can dynamically allocate bandwidth for a plurality of UIP clients on a demand-driven basis to hold multiple video conferencing sessions. When no dedicated hardware compression is available, either with a UIP Client set-top box without compression 780 or a personal computer without compression 776, the upper limit on the video conferencing capability will be the raw bandwidth requirements of the subscriber line. The present invention incorporates the ability for full protocol video conferencing hardware or software compression at the UIP client, the personal computer, or the UIP Server.

Furthermore, the UIP client has the capability to manage traffic on demand-driven basis for managing a video conferencing session. Thus, a PC computer 774 with compression can utilize the compression capability and be able to manage its traffic in an efficient manner, whereas computer 776 without compression would require more advance forms of traffic management to achieve the required bandwidth for the video conferencing needs. In either case, the traffic at the UIP client is managed in a very conservative manner.

K. Voice Conferencing and Voice Communications

Figure 14:
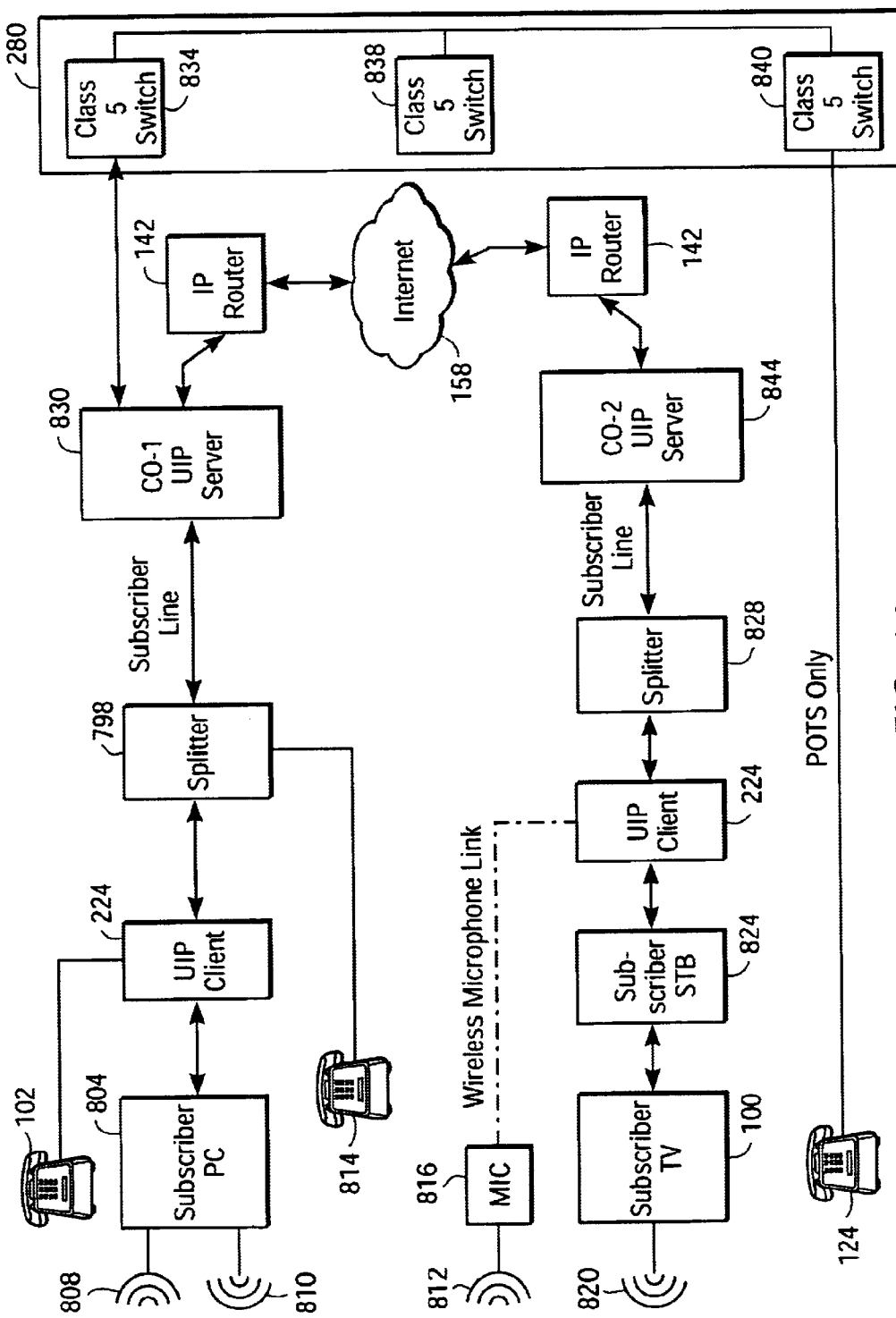
FIG. 14 is a functional block diagram illustrating the voice communication aspect of an embodiment of the present invention.

Multiple means of voice conferencing and voice communication exist within the one embodiment of the present invention. FIG. 14 outlines three such modes of voice communication. POTS peripheral 102 is a standardized telephone that is connected to a UIP client 224. The telephone 102 is a voice over IP standardized phone in that the UIP client 224 compresses and encapsulates the resultant voice traffic from the telephone 102. The telephone 102 itself is a standard POTS peripheral just like the telephone 124. The definition and use of the voice over IP versus the POTS service is a result of the network topology at the subscriber premises. The telephone device connected to the splitter block 798 is designated the POTS phone, it is digitized at either the CO-1 UIP Sever 830, or within the PSTN 280. The telephone device(s) connected to the UIP client 224 is(are) designated the voice over IP (VoIP) phone. The VoIP phone is digitized, compressed, and encapsulated at the UIP client.

FIG. 14 illustrates a computer telephone through use of a subscriber PC 804. The subscriber PC 804 utilizes a microphone 808 and a speaker 810 to communicate with the subscriber. A standard PC can be utilized in this manner, which directly interfaces either a voice over IP protocol within the subscriber PC or through a standard uncompressed voice similar to a digitized POTS traffic through the UIP client 224. FIG. 14 illustrates three means available at subscriber premise 1 for voice communications, namely, POTS, VoIP via a POTS phone, and VoIP over a computer phone.

Subscriber premise 2 comprises of a subscriber television set 100, which has a speaker 820 as well as a wireless microphone transmitter 816 that interfaces to a physical microphone 812. The wireless microphone link connects directly to a UIP client 224. The UIP client 224 interfaces to a subscriber set-top box 824 which decodes and generates the signals required for the subscriber TV 100. The UIP client 224 interfaces to a splitter block 828. The splitter block 828 interface to the subscriber line. The subscriber line interface to the UIP server 844 at the central office. The splitter block 828 in FIG. 14 illustrates that no POTS service is supported. The UIP server 844 at the central office interfaces through an IP router 142 to the Internet 158. The Internet 158 is connected to the IP router 142 which, in turn, interfaces to a UIP server 830 at central office location 1. Subscriber PC 804 communicate with the subscriber TV 100 through the Internet in the prescribed manner from subscriber pc 804, to the UIP client 224, through the splitter block 798, to the UIP server 830 at the central office 830, to the IP router 142, to the Internet 158, to the IP router 142, to the UIP server 844, to the splitter 828, to the UIP client 224, to the subscriber set top box 824 and, finally, to the subscriber television 100.

In the case of standardized POTS traffic, subscriber 3 could be a network subscriber who does not have a UIP client at all. Subscriber 3 can utilize the standard telephone set 124, utilizing the POTS service and directly connect within the PSTN to a Class 5 switch 840. The Class 5 switch 840 through the PSTN's network can communicate directly to a Class 5 switch 834. The Class 5 switch 834 interfaces to the UIP server 830. FIG. 14 illustrates the great flexibility that the architecture of the present invention supports in terms of its ability to interface to an existing PSTN network. POTS traffic across the POTS peripheral 124 occurs in a seamless manner with POTS peripheral 124. Additionally, the POTS traffic across the subscriber TV 100 and microphone 816 also occurs in a seamless manner to the POTS peripheral 124.

1. Voice Traffic Termination

Figure 15:
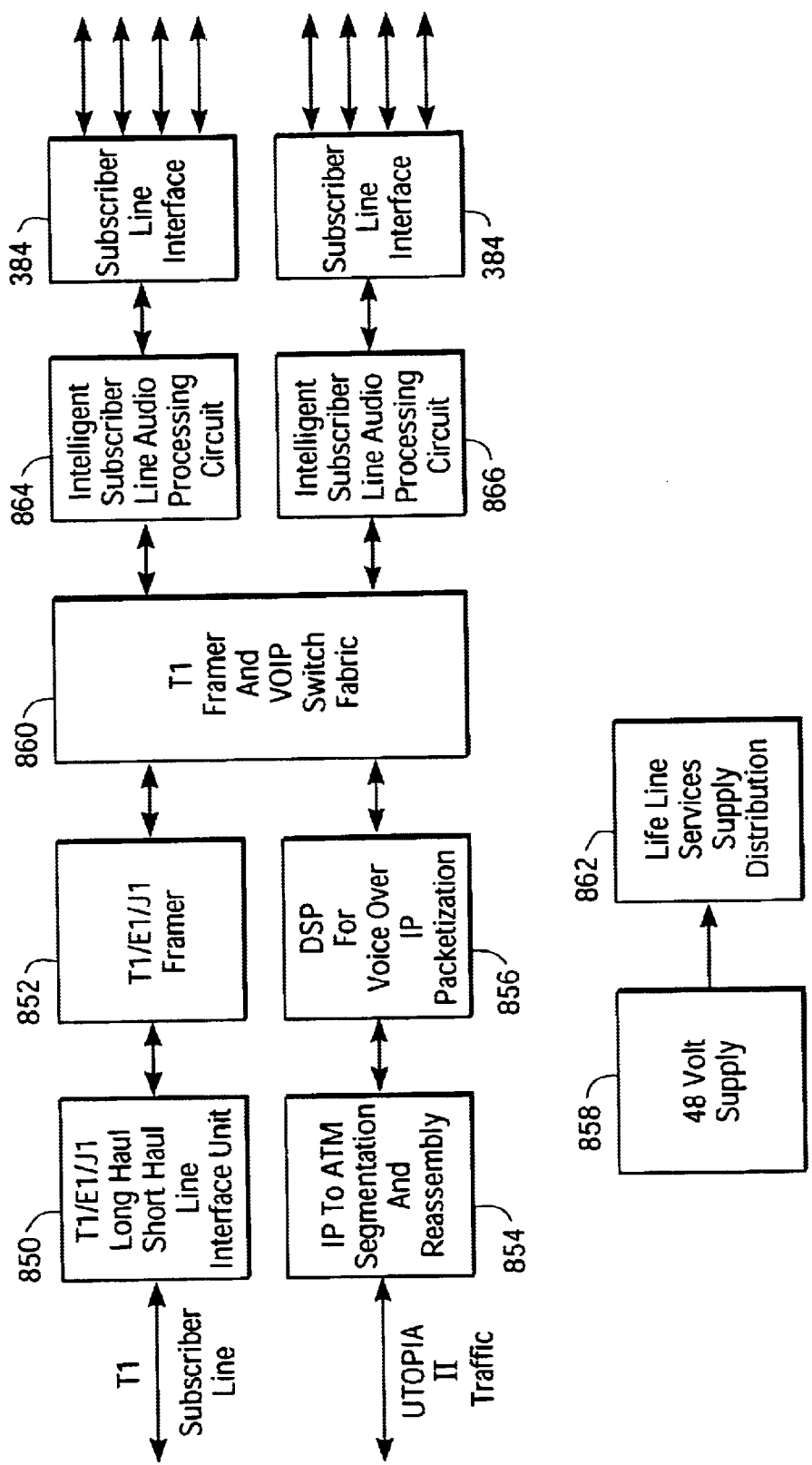
FIG. 15 is a functional block diagram illustrating voice traffic termination.

A number of different means of voice traffic termination exists within the UIP architecture of the present invention. FIG. 15 illustrates the voice over IP switching capability, the POTS switching capability, and the intelligent subscriber line termination at the UIP server. The lifeline power supply distribution 862 and the 48-volt supply 858 provides a reliable means of digitizing voice traffic and integrating within the UIP server the requirements of a high reliability public switched telephone network interface. FIG. 15 illustrates one embodiment featuring voice traffic DS-0 termination, as well as voice over IP packetization. As mentioned earlier, a 48-volt supply capability exists by use of the 48 volt supply 858 that can be utilized for lifeline services supply distribution. The objective of the 48 volt supply and the lifeline services supply distribution is to deliver power to the voice over IP as well as the POTS traffic circuit in an intelligent and conservative manner to extend the operational use of voice capabilities during a power outage. A T1/E1/J1 long-haul/short-haul line interface unit 850 is responsible for aggregating POTS based traffic and interfacing to a class 5 switch. POTS traffic from the subscriber line interface 384 or the subscriber line interface 384 is processed in the form of either standardized POTS traffic or a voice over IP circuit. The voice traffic in the form of voice over IP or POTS is forwarded to an intelligent subscriber line audio processing circuit 864. The combination of the subscriber interface 384 and the intelligent subscriber line audio processing circuit 864 generates digital traffic which has been digitized from the analog POTS traffic across the standard subscriber line. The digitized voice can then be forwarded to a T1 framer and voice over IP fabric 860. The functionality of the T1 framer and voice over IP switch fabric is to route and switch voice traffic for multiple subscribers.

The voice over IP traffic, in one embodiment, is supported over a utopia traffic type to the IP to ATM segmentation and reassembly module 854. The IP to ATM segmentation and reassembly module 854 incorporates the ability to take standardized utopia 11 traffic from the ATM Wide area networking switch and converts it to IP. The IP traffic is forwarded to a DSP for voice over IP packetization 856. The voice over IP traffic is then passed on to the T1 framer and voice IP switch fabric 860. A POTS subscriber connected to the subscriber line at subscriber line interface 384 can communicate using utopia 11 traffic across the IP to ATM segmentation and reassembly module 854. The switch fabric 860 switches and routes the voice traffic. The intelligent subscriber line audio processing circuit 864 converts the digitized voice traffic to analog traffic for transmission across the subscriber line interface. In this manner a voice over IP subscriber can be connected to a standard POTS subscriber by the UIP server.

In addition to the voice over IP to standard POTS connectivity, the T1 framer and voice over IP switch fabric 860 can switch and route one subscriber to another within the same UIP server. As outlined earlier, a SS7 interface 730 from FIG. 11 within the UIP server is able to direct the T1 framer and voice over IP fabric 860 to be able to work in conjunction with a standard SS7 signaling network and Class 5 switch. Also illustrated in FIG. 15 is a T1/E1/J1 framer 852 which can concentrate traffic from a given set of subscriber line interfaces, through use of the switch fabric 860, and form T1 traffic. The resultant T1 traffic is then forwarded to a T1/E1/J1 long-haul short-haul line interface unit 850 whose functionality incorporates analog buffering and processing to interface to a standard T1 subscriber line interface.

L. Multiple Telephone Interfaces

Figure 18:
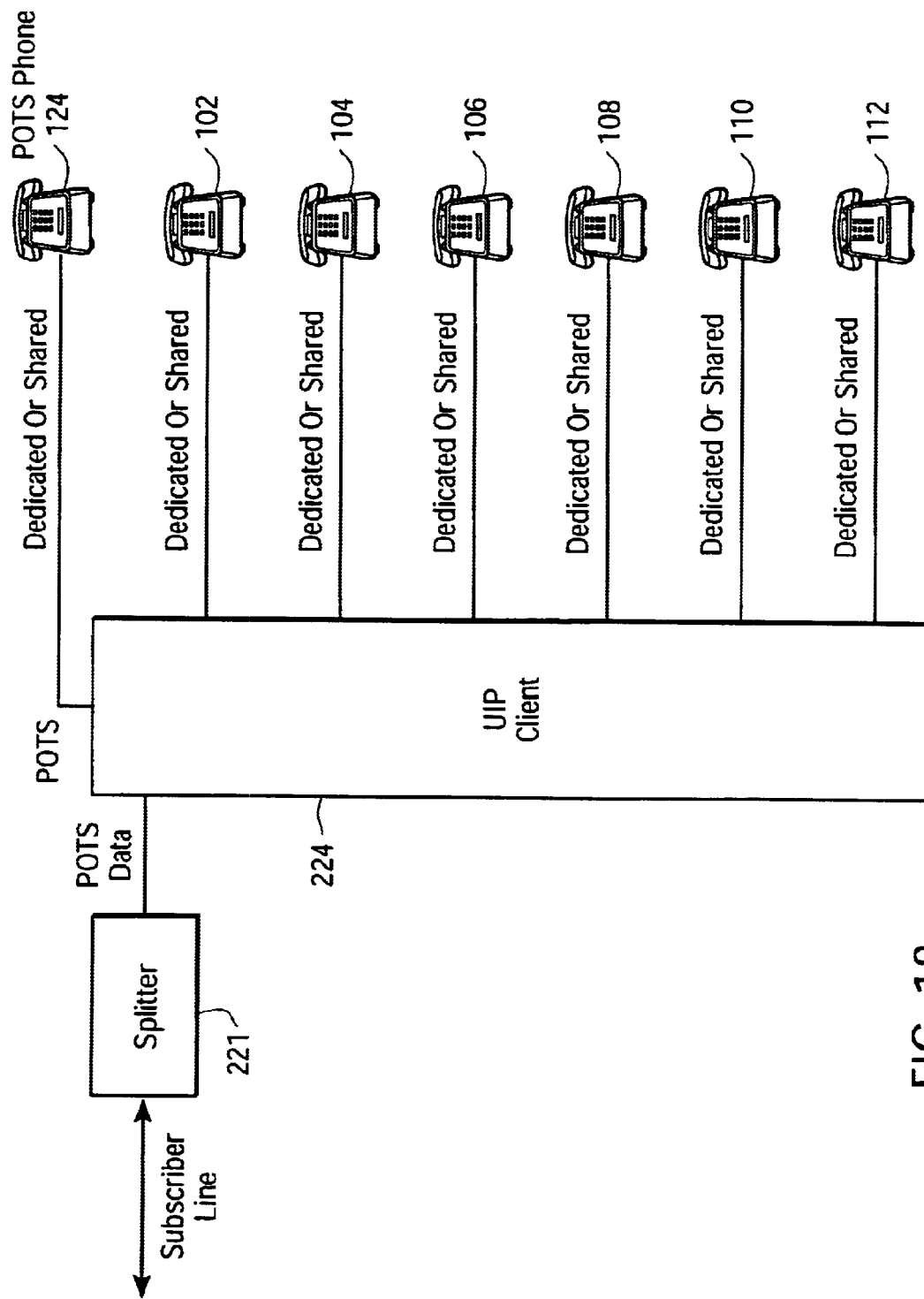
FIG. 18 is a functional block diagram setting forth a UIP client multi-line voice topology.

As illustrated in FIG. 3, the General UIP Client Architecture, the voice-fax CODEC 352 is capable of interfacing with multiple phones, in particular fax-phone modems 104 and 102, and standard telephone peripherals such as telephones 112, 110, 108, and 106. FIG. 3, illustrates the capability of the general UIP client architecture to interface with two non-compressed phones, four voice over IP phones, and a single standard POTS peripheral 124, a standard telephone set. FIG. 3 illustrates only one embodiment of the invention and is only an example. Multiple combinations of these devices can exist at the UIP client, such as three non-compressed phones, and four voice over IP phones. FIG. 18 illustrates seven specific voice circuits of FIG. 3 configured to either have a dedicated phone number per line or a shared phone number for all seven lines, or a combination thereof. FIG. 18 illustrates the POTS peripheral 124 which is a standard POTS telephone. POTS telephone 124 interfaces to the UIP client through the POTS interface port of the UIP Client 224. In the embodiment shown, UIP client 224 has six other telephone peripherals, 102, 104, 106, 108, 110, and 112. The embodiment of FIG. 18 does not distinguish between non-compressed telephones or the compressed voice over IP telephones. The UIP client 224 is able to modulate the POTS telephone line and carry the traffic through the splitter 221 to a standard POTS portion of the digital subscriber line. The UIP Client 224 intelligently manages the voice capability so that the subscriber is able to interface with the UIP Client 224 in his native control methodology such as a keypad interface. The native control methodology is maintained through out one embodiment of the present invention for interfaces such as Video on demand, Remote Video Recorder, and e-mail, among others.

The phones interfaced to the UIP Client 224 can either have shared or dedicated telephone numbers. The UIP client 224 in this case incorporates switching capability to manage the correlation between the telephone numbers and the specific telephone sets. When the UIP Client 224 is configured for a fully dedicated configuration, specific telephone numbers are associated with specific telephone sets. This topology is managed by the UIP client 224 and can be dynamically varied by the subscriber. The service provider dedicates a certain set of numbers for a given UIP client 224. This determines the bandwidth allocation between the UIP server and the UIP client 224. The UIP client 224 then configures the topology of which specific number is correlated to which specific telephone. Only the POTS line is statically configured by the service provider. The dynamic configuration of the POTS line can be accomplished by the service provider by utilizing the subscriber line interface termination circuitry, and the routing within the T1 framer and VoIP switch fabric 860. The subscriber selects the total number of telephone numbers allocated by the service provider to his home telephone network. He can then direct where these phones rings on a dynamic basis.

In one embodiment, voice mail functionality and any other telephony services are uniformly available throughout the home telephone network. This is achievable due to the fact that the origination for all the telephony services is from the UIP Server. The UIP server has the capability to interface with all the VoIP telephone sets. Additionally, the POTS based telephone set can be interfaced either directly at the subscribers UIP server, or through the class 5 switch interface and then to the UIP server. The telephone keypad and touch tones are used to configure the UIP client 224 in a simplified and native manner. The UIP client 224 services these configurational controls in conjunction with the subscribers UIP server at the central office. It is expected that in the case of touch tone or voice recognition functionality the interactive voice response server would reside at the central office server site. Whereas the programming capability and the program storage capability for the configuration would occur at the UIP client site.

The above outlined configurational methodology is only exemplary of one embodiment. Various options exits for the service provider as to his configurational offerings based on the specific embodiment of the invention that is implemented within his network. The UIP client 224 incorporates the capability for a semi-intelligent lifeline service so that, to the extent possible with the battery backup, there is no difference between the POTS line versus the voice over IP lines. Any telephone during a power outage condition may be picked up and will provide lifeline like capabilities. Traffic will be managed during power outage conditions in a conservative manner. As discussed above, in the case of a extended power outage, battery backup is available within the UIP client 224 so that a standard flashlight battery can be connected to a UIP client 224 to power up the voice portion of the network. In this manner, the subscriber is guaranteed that when a power failure occurs at the subscriber premises the telephones can be brought to an operational state for limited periods of time. The batteries can be extracted so that they can be conserved. In the power outage standby mode battery utilization is minimized even during active operation.

L. Load Sharing

Figure 20:
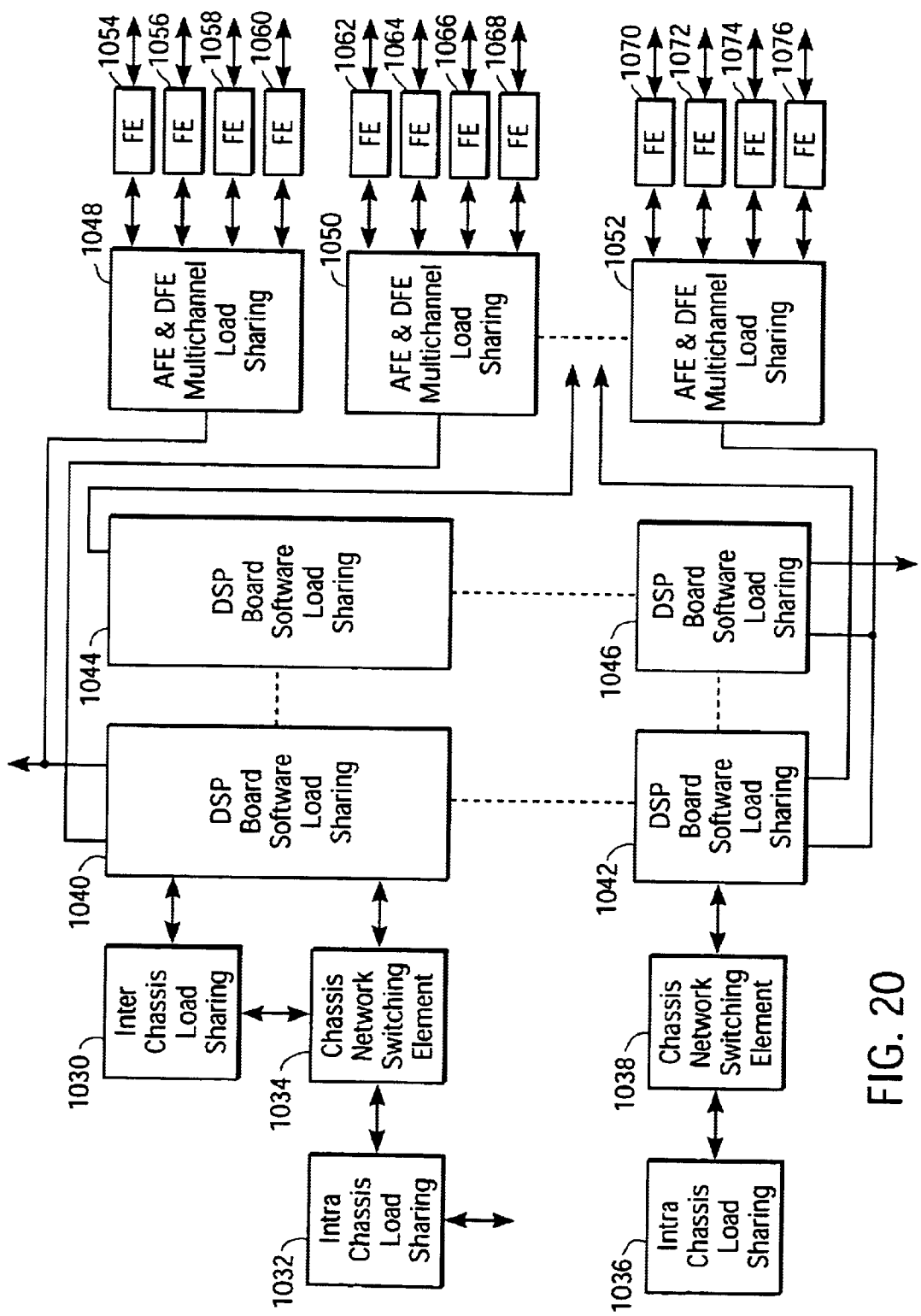
FIG. 20 is a functional block diagram setting forth a load sharing model according to one embodiment of the present invention.

FIG. 20 exemplifies the load sharing model for a specific topology of one embodiment of this invention. Particularly, the embodiment shown in FIG. 20 represents one level of redundancy, one level of load sharing, and one level of traffic policing that takes place within the embodiment of the present invention. FIG. 20 illustrates three distinct levels of load sharing capability designed in one embodiment of the present invention, in particular through use of a multichannel load sharing 1048, 1050, or 1052 capability within a given chassis, the physical connectivity of DSP based software load sharing modules 1040, 1044, 1042, and 1046. This is the first level of redundancy and load sharing capability. The second level of redundancy and load sharing capability occurs between the DSP based software load sharing modules to the chassis network switching elements 1038, 1034 and 1030. These represent an inter-chassis multi-board capability that is switched directly between the individual switching elements. This is the second level of load sharing, redundancy, and traffic policing within an embodiment of the present invention. The third level, where this load sharing, traffic policing, and redundancy can take place, is through intra-chassis load sharing, 1036, 1032, and 1030. In this case, the switch element, instead of forwarding traffic to another switch element within its own chassis, rather routes it to another chassis through the use of the intra-chassis load sharing modules 1036, 1032, and 1030. In this manner the switch element defers traffic from the native DSP based software load sharing module to a different DSP based software load sharing module residing in a different chassis.

More particularly and in one embodiment, frontend interfaces 1054, 1056, 1058, 1060, 1062, 1064, 1066, 1068, 1070, 1072, 1074, and 1076 connect to a subscriber line. The front ends (FEs) shown in FIG. 20 represent the connectivity to the subscriber line and the activity detector circuitry. The front ends 1054 through 1076 connect to multiple analog front ends (AFE) and digital front ends (DFE) capable of multichannel load sharing. Each of the AFE and DFE multichannel load sharing 1048, 1050, and 1052 illustrated in FIG. 20 are capable of interfacing with a plurality of front ends. Furthermore, the AFE and DFE multichannel load sharing 1048, 1050, and 1052 incorporates the capability of aggregating the traffic resultant from the specific front end based on the specific DSL technology. The resultant data stream is then forwarded to one or a plurality of DSP subsystems.

Multiple AFE and DFE multichannel load sharing modules, 1048, 1050, and 1052, are capable of connecting with multiple DSP based software load sharing modules 1040, 1044, 1042, and 1046. The connectivity of multiple AFE and DFEs with multiple DSP subsystems achieves redundancy and greatly improves the reliability of the system so that no single point of failure exists beyond the line interface. Furthermore, the multiple AFEs and DFEs and the multiple DSP subsystems enable load sharing and load forwarding. Thus, 1048, in the case of congestion, could then, instead of forwarding traffic to 1040, forward a bulk of its traffic to 1044. Whereas, item 1040 could also load share between either 1040 or 1044. The redundancy of the AFE and DFE architecture will be a function of the specific embodiment. FIG. 20 illustrates a redundancy and load sharing capability of 2 to 1. The AFE and DFE multichannel load sharing 1052 shows redundancy between DSP based software load sharing 1044 and DSP based software load sharing 1046. One embodiment of the present invention incorporates load sharing across a multiplicity of DSP based software load sharing modules. A redundant shared bus between any two given modules can also be utilized for temporary storage and forwarding to other DSP subsystems. When such functionality is implemented a certain network latency exists. However this can be monitored and managed by the traffic policing mechanism built within the load sharing methodology. In one embodiment, the redundancy inter-connectivity as well as the load sharing interconnectivity interfaces are designed so that any given DSP subsystem indicated by DSP based software load sharing module 1040 connects at least to a plurality of AFE and DFE multichannel load sharing modules 1048 and 1050. FIG. 20 illustrates that the load sharing DSP module 1040 connects to the AFE and DFE 1048 and 1050 modules. Whereas the DSP based software load sharing module 1044 interfaces with module 1050 AFE and DFE and the next AFE and DFE module outlined in FIG. 20 as a dotted line representing a plurality of front ends as illustrated between the dotted line between modules 1050 and 1052. DSP based software load sharing module 1042 interfaces with the AFE and DFE module 1052 as well as a previous AFE and DFE multichannel load sharing module, again indicated by the dots shown between AFE and DFE modules and 1050 to 1052.

The DSP based software load sharing 1046 can interface to two separate and up to a plurality of modules indicated by the connectivity between the AFE and DFE multichannel load sharing module 1050 as well as the next multichannel module. If AFE and DFE multichannel load sharing 1052 module is the last module of a sequence, then the 1046 DSP based software load sharing module can be interconnected to the AFE and DFE 1048.

A second level of load sharing exists in one embodiment of the present invention in its capability of chassis-based network switching. The UIP server utilizes the chassis network switching element 1038, to load share traffic across the intra-chassis load sharing module 1036, to the intra-chassis load sharing module 1032, to the chassis network switching element 1034. In this manner, this embodiment is able to defer traffic on an intra-chassis basis to a different DSP based software load sharing module. The DSP subsystems can either load share based on their internal physical configuration or they can utilize the intra-chassis loading switching mechanism to be able to load share with a plurality of DSP based software load sharing modules across the network. The chassis network switching element 1038 interfaces with more than one DSP based software load sharing module, and, therefore, also provides a means for load sharing. The AFE and DFE passes the raw channel data to a DSP based software load sharing module 1046, which then encapsulates this data in a switchable form, such as either IP or ATM traffic. The switchable data stream is then processed by the chassis network switching element 1038 to be routed to a DSP subsystem on a physically different board but residing within the same chassis. The actual modulation/demodulation processing takes place in a different DSP based software load sharing module than the one directly associated with the subscriber line interface.

M. Unified Access and Searching Capability
[Unified Internet Portal]

Figure 16:
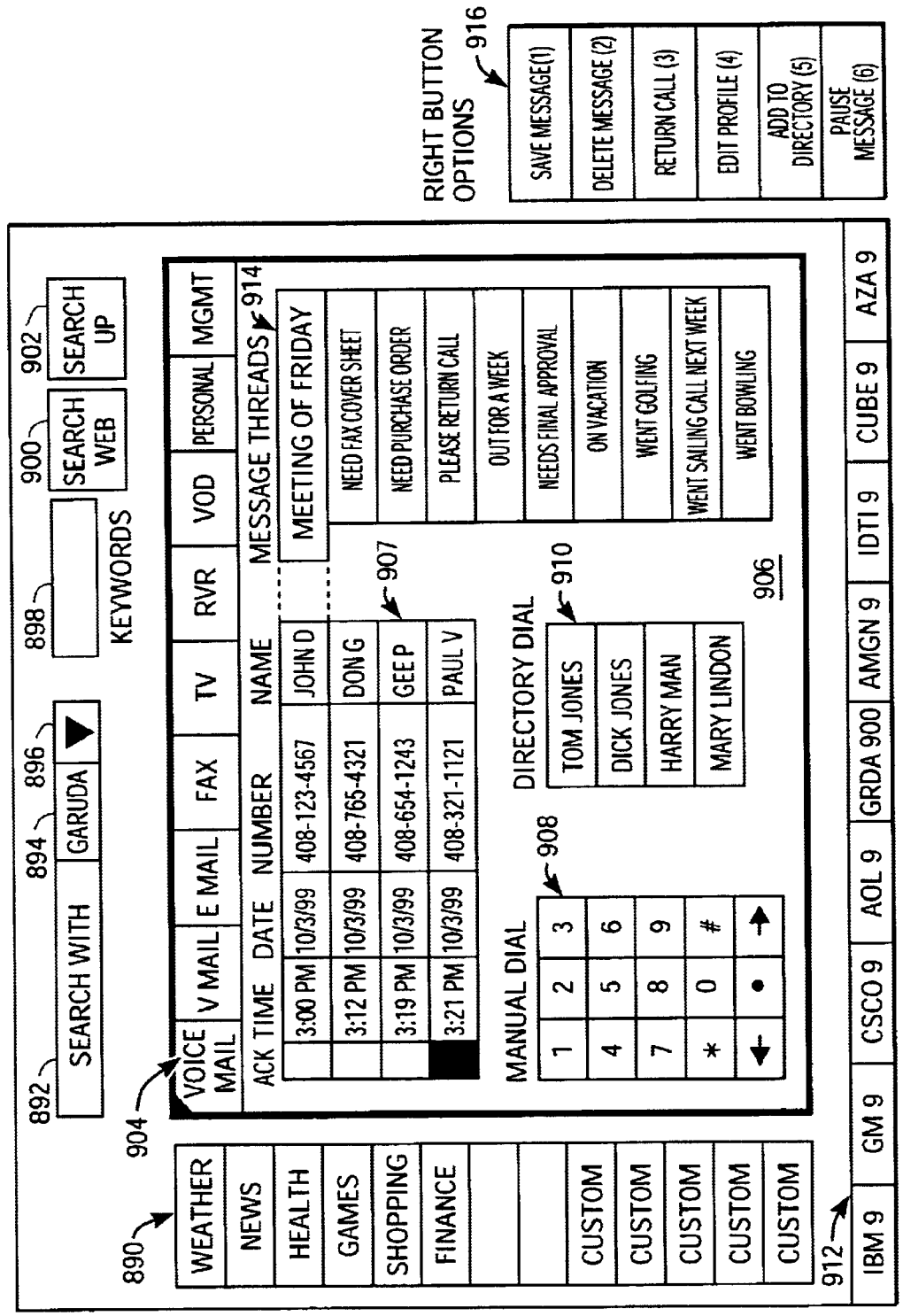
FIG. 16 shows a user interface corresponding to the unified Internet portal aspect of an embodiment of the present invention.

FIG. 16 illustrates a unified communication portal concept with the idea that a portal site exists that enables multiple modes of communication in a unified manner. Within the unified communication portal model common characteristics are used to be able to classify messages. Furthermore, the unified communication portal model utilizes natives modes of communication, such as telephone keypads and remote control buttons, for enabling access by the subscriber to the services that are made enabled by the UIP server and the UIP client. Furthermore, a number of configurable actions exist, such as message forwarding, subscriber paging, voicemail forwarding, cell phone forwarding. The unified communications portal enables a unified communications methodology in that a multitude of communications methodologies and messaging capabilities are unified for the subscriber to achieve a very high retention rate. The objective of the Unified communications portal is to provide a virtual and physical portal for the subscriber of highest performance and broadest utility to attract and retain the subscriber.

One embodiment of the present invention enables a subscriber access to resources that reside at either the UIP server or on the Internet in general, such as, Internet searches, Internet or broadcast weather reports, stock quotes, voice mail, e-mail, Video on Demand, and remote video recording. One embodiment of the present invention enables a Unified Internet Portal capability. In one form, the Unified Internet Portal comprises a plurality of distributed UIP servers where the subscriber-oriented data can be stored at the UIP server corresponding to the subscriber's subscriber line. When content or accessibility to content is pushed right to the edge of the wire, the only real delay experienced by the subscriber will be the delay of the modulation technology, such as the modeming capability. No significant network delay will be experienced by the subscriber since the data is actually residing as close to the subscriber as possible and the correlated UIP server is a distributed architecture. In specific cases, this subscriber specific data can be pushed over to the subscriber. Under certain conditions the delivery to the subscriber will be incomplete, such as the case of a power outage, or in the case of a lack of resources such as a hard drive being full, or in the case where the subscriber is not accepting the data such as video on demand data. The reliable closest point of convergence to the subscriber is the UIP server.

One embodiment of this invention pushes the subscriber specific content as close to the subscriber as possible. The UIP server maintains statistics on the subscribers data previous usage and attempts to predict the subscribers typical data usage. The predicted data is then cached at the corresponding UIP server. The present invention incorporates a pseudo-serving capability as mentioned earlier in the form a proxy server, a form of web caching. The advantage to the subscriber is that the data, due to its proximity to the subscriber, will be delivered in the highest speed manner and will only experience latency in delays and frequency limitation of the dedicated wire between the UIP server and subscriber. The storage of this information can either occur within a remote storage area network where the data is then utilized through a storage area network rather than a local storage, or else local storage at the UIP server itself. Certain performance guarantees are required in the case of a remote storage area network, to achieve the required performance of the UIP server. In particular the storage area network is required to deliver a comparable performance to match a typical seek time and data channel rates of a standard hard drive.

FIG. 16 illustrates a specific embodiment of the Unified Internet Portal. In FIG. 16, zone 892 is a block indicating the action that is being taken. Zone 894 indicates methodology of the action that is being taken. In the case where zone 892 shows a search capability, 894 defines the engine to be used to conduct the search, such as GARUDA, altavista, netscape, etc. FIG. 16 illustrates that a search action is indicated, and the search is to be done by the GARUDA search engine. The GARUDA search engine is a distributed search engine with the capability of searching the plurality of UIP servers. The subscriber is able to select from the variety of engines by selecting the arrow button 896. A menu is presented to the subscriber for selection of the engine. The selected engine is displayed within zone 894. Selected engines are preprogrammed within the Unified Internet Portal typical screen. Once action has been selected in zone 892 and the methodology selected in zone 894, the subscriber can enter one to a plurality of keywords in zone 898. Once the keyword has been selected, the subscriber then has the choice to either perform a search web or search UIP by pressing the search web 900 button or the search UIP 902 button. The search web action causes a search across the Internet, whereas the search UIP action causes a local search within the UIP server, or the UIP client. The differentiating factor between a search across the UIP and a search the Web is the fact that the UIP is a virtual environment for the specific subscriber. Search items in that particular case would specifically be limited to those things that the subscriber has a specific interest in, among other things voice message, e-mail messages, or any of the other services available to the specific UIP client. Whereas, search Web button 900 specifically relates to being able to do a search across the Internet and would typically be able to search only those sites that are serviced by the Internet.

In addition to the general searching and access capabilities to the Internet and the UIP server, one embodiment features a plurality of boards maintained within the Unified Internet Portal typical voice screen as indicated by zone 890. Zone 890 illustrates a variety of different boards, such as a weather board, a news board, a health board, a games board, and a several custom boards available by a single click within the typical Unified Internet Portal site. The subscriber may customize the boards he chooses to display on the Unified Internet Portal typical screen.

In addition, programmability exists within the UIP portal client through use of management to be able to select specific data from either these boards or a push based data delivery service and be able to continually display them through the use of a ticker zone 912. The ticker zone 912 is a custom messaging location where the user is able to preprogram certain dynamically changing data. Once the ticker zone 912 is programmed, it is immediately enabled whenever the subscriber accesses the Unified Internet Portal screen. The ticker zone 912 could, for example, in a specific embodiment display a series of stock quotes, or alternatively display current news stories. The ticker zone can be updated on a zone by zone basis, or on a sliding basis, such as right to left, left to right, top to bottom, or bottom to top. The information will be refreshed on a pre-programmed basis. The subscriber is able to select the frequency of refreshing, as well as the content of the ticker zone.

In certain embodiment, the Unified Internet Portal enables a combination of pull methodologies, such as boards 890, and push methodologies, such as ticker 912. Both the pull based and the push based technologies are aged based on the subscribers preferences. The aged data is then deleted from the UIP server. In addition, to the push and pull communications methodologies, the Unified Internet Portal enables a unified communication methodology. The subscriber is able to access the multitude of communication means within a unified portal strategy. Zone 904 in FIG. 16 illustrates a plurality of communication methodologies, such as voice mail, video mail, e-mail, fax, broadcast TV, remote video recorder RVR capability, video on demand VOD capability, configuration for a personal page site, as well as a management screen. FIG. 16 is an example of one embodiment, it is understood that the scope of the specific communication methodologies will vary based on the configuration of the specific embodiment. Within zone 904, the subscriber selects the specific means of communications by simply clicking of the selection tab. The selection tabs can be either grouped, or itemized. So, for example, voice mail, v-mail, e-mail, and fax can be grouped into a single messaging type. In this case, the subscriber will be offered a series of messaging types and after selecting one, the subscriber would be able to select among the specific modes, such as e-mail, video-mail, voice-mail.

Furthermore, the subscriber has the capability to unify all modes of communications, or any selected set, and view all messaged in a unified means. Along the same theme, broadcast TV, RVR and VOD, for example, can be configured as either itemized or unified as a group, or unified within a multi-group. In either case, the subscriber through use of zone 904 is able to select one of a variety of services. FIG. 16 illustrates a specific configuration of a messaging screen where, the user has selected to itemize his communication services and is currently reviewing his voice mail. Several different messages are displayed in zone 907. Several parameters are displayed associated with each message, such as an acknowledgment tag, time of the message reception, the date of message reception, the telephone number of the caller if available, and the name through a directory lookup. In addition, a message thread is collated based the previous communications with the specific caller and the a set of previous messages is displayed within the message thread 914. The subscriber can choose to select a unified messaging thread, so that all communications from the specific named individual are grouped together, such as email, fax, voicemail, or videomail. The subscriber can select the thread name and classify the individual messages within the thread either manually or on a prescribed manner. The message thread displays a history of the communication and a summary of the specific message such as "Meeting of Friday," "Need fax cover sheet," "Need purchase order," "Please return call," as illustrated in FIG. 16 zone 914.

The unified communication methodology enables a more efficient communication capability for the subscriber. Zone 908 within FIG. 16 illustrates the capability of the subscriber to manually dial a number in the case of voice services through use of a simple keypad interface. Additionally, the keypad mimics the keypad of the telephone set, in that if the subscriber is more familiar with a telephonic access he is able to achieve an analogous means at the computer through use of the virtual keypad, or the physical keyboard keypad. Zone 908 enables the subscriber to use the native mode of control depending of the service type, thus for example during the RVR messaging mode a virtual remote control would be available. Zone 910 within FIG. 16 illustrates a simple directory dial capability where, instead of using manual dial the subscriber can select the recipient from a directory listing. In addition to the zones mentioned above, there is a zone 916 enabled by, perhaps, an action by the subscriber, such as a right key click of a mouse. Zone 916 enables the subscriber to cause action to the specific message being viewed or displayed, such as Save message, Delete message, Return this call, Edit the profile, Add to directory, or Pause message. The edit profile option is one means of editing a message thread entry. The Add to directory option enables the incorporation of the caller into a directory management database. The Pause a message option enables the subscriber to stop the active message midstream which can then be unpaused later with a single click or keystroke. Furthermore zone 916 enables simplified hot buttons, such as 1, 2, 3, 4, 5, 6, which can either be hot buttons at the keyboard or also key buttons pressed through a native means such a telephone keypad, or remote control.

Figure 17:
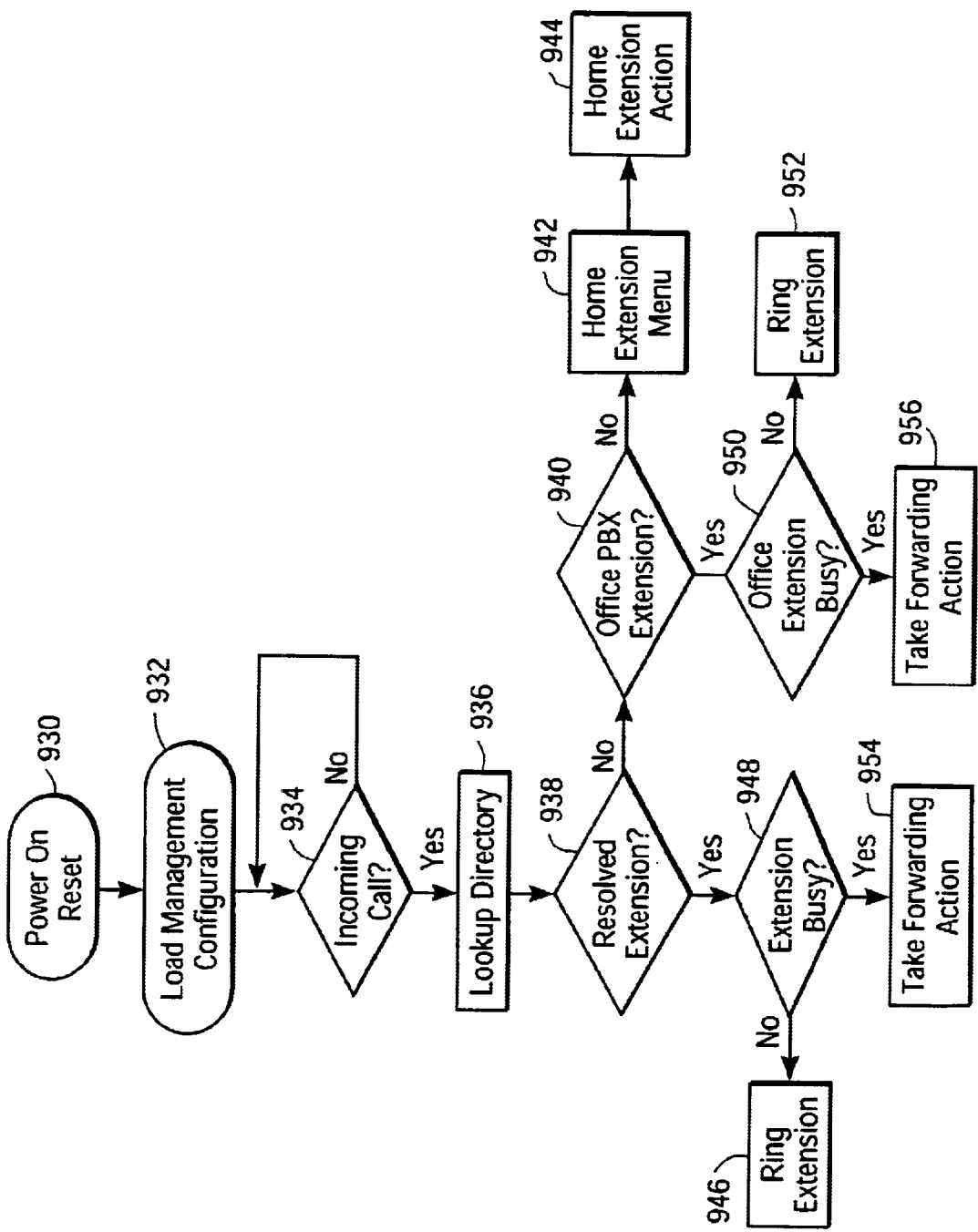
FIG. 17 is a flow chart diagram setting forth a method for voice call processing.

FIG. 17 illustrates the logic flow diagram of the voice call processing for unified access capability. It exemplifies several features and capabilities of the UIP server and the UIP client. The power-on reset 930 algorithm initializes the voice capability and enables the UIP client 224 to load the management configuration. The load management configuration 932 algorithm utilizes the previous state of the network, and the subscriber preferences to enable voice call processing. An incoming call 934 decision processes to see if any caller action is warranted. If no action is warranted, it continues to wait. When an action is warranted, such as an incoming call, it proceeds to a lookup directory function. The lookup directory, reviews previous records to identify who the calling party is. The resolved extension 938 algorithm utilized the caller id information, in conjunction with the subscriber configurational information the action for the caller. For example, if the caller is a business caller forwarded from an office extension, the subscriber can choose to forward the call to a local office voice mail or forward to a specific extension. If the caller is resolved and the action is to forward the call to a specific extension, then the extension busy 948 decision is queried. If the extension is busy then take forwarding action 954 is executed. Take forwarding action 954 determines the forwarding action, such as page subscriber, and forwards the caller in the appropriate manner. Alternatively if the extension is not busy, the ring extension 952 action is taken. If the ring extension 952 action does not evoke a responses, then the ring extension 950 is preprogrammed for alternative action, such as, page subscriber, or forward call. If the caller based extension resolution is incomplete, the office PBX extension query makes a determination based on the called number basis. Thus if a specific telephone number within the home network is classified as an office PBX extension, then the call is resolved to be an office call. If the PBX office extension 940 query determines.that the caller is not an office call but rather a local or a home call, then the caller is either forwarded to a home extension menu 942 messaging system or directly to a home extension action 944, such as ring extension, or forward call. The home extension menu, again, fundamentally looks to see if the extension that can accept that particular call is busy or not. If it is not busy, the extension is rung through home extension action 944. If it is busy, then again 944 takes the appropriate action such as forwarding the call, taking a voice mail.

If look-up directory looks up the information and the receiving extension is resolved, the system queries to see if that specific extension busy 948 or not. The call has been classified as either a home extension call or an office extension call. If the call is determined to be a home office extension, a specific extension associated with the resolved caller is then queried through the extension busy 948 query. If the associated extension is busy, forwarding action is taken similarly as previously described, or else if the extension is not busy then the extension is rung through the ring extension 946 action. Further action is taken if the extension is not answered.

1. Access to Video Data

Figure 19:
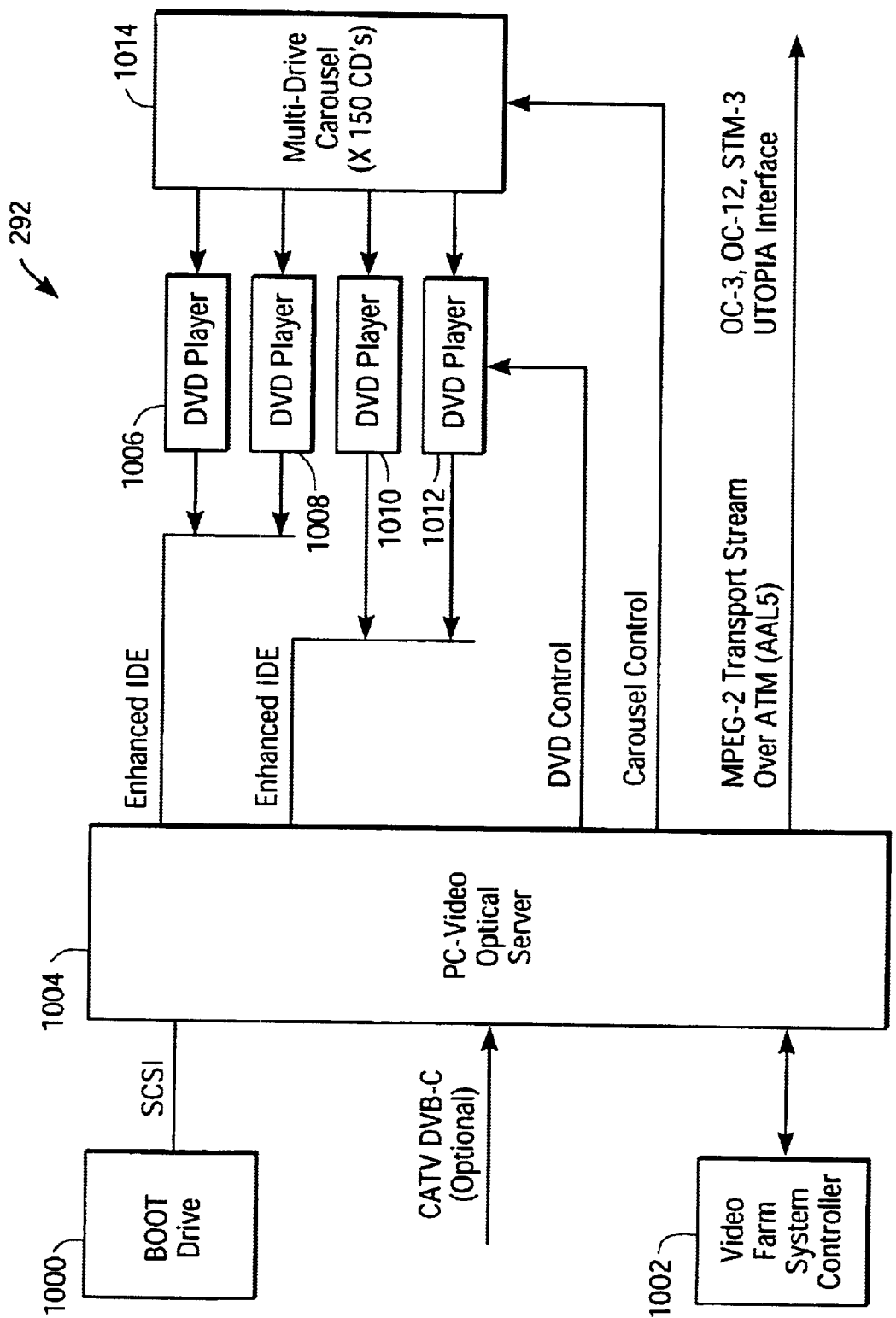
FIG. 19 is a functional block diagram illustrating a video farm element.

In FIG. 2a Scalable Multimedia Switching Network Model, the UIP server 226 was connected through a video traffic connectivity, either using OC-3, OC-12, or STM-3 among others, to a video farm element 292. FIG. 19 is a detailed diagram of the video farm element 292 and illustrates various exemplary components as required for a video delivery capability from an optical farm. The multi-drive carousal 1014 has the capability of holding multiple optical disks and is capable of robotically controlling them so as to be able to insert them in a plurality of DVD players, 1006, 1008, 1010, and 1012. In a simplified configuration, the DVD players 1006, 1008, 1010, 1012 can be utilized through a standard enhanced IDE interface of a personal computer. Up to two DVD players, 1006 and 1008, can be connected to a single interface and another two 1010 and 1012 can be connected into a separate IDE BUS. Both of these buses are then connected to the PC optical server, 1004. In one embodiment, the PC optical server is a personal computer based device and it is capable of boot-strapping through use of a boot drive 1000 and self configuration for service. The boot drive could be boot strapped by a SCSI drive, an IDE drive, or by a network based boot up sequence. The PC-Video optical server 1004 exemplifies a split enhanced IDE topology, however, the PC-Video could incorporate other proprietary means for storage interface. Furthermore, the total number of DVD players 1006, 1008, 1010, and 1012 can range from one to a plurality of DVD players. The PC-video optical server 1004 directly controls the state of the DVD players 1006, 1008, 1010, 1012. The multi-drive carousal 1014 is able to robotically select one or more DVDs to be inserted in a specific DVD player and is able to do this under control of the PC-video optical server 1004. Furthermore, once the system is configured and a video stream is available, the PC-video optical server 1004 can then integrate and process the resultant video stream into a transport stream, such as a MPEG-2 transport stream over ATM.

The ATM traffic, depending on the content, demand and the topology of the PC-video optical server 1004, can utilize one of a variety of interfaces, such as a utopia II interface, a OC-3 interface, a OC-12 interface, or an STM-3 interface, among others. In addition to the optical play capabilities available to the video farm, exemplified in FIG. 19, the PC-video optical server 1004 optionally is capable of supporting a cable TV DVB-C input. The standard cable network is capable of tuning to a plurality of channels. Each of these channels has a plurality of digital streams. In a specific embodiment up to eight transport streams are available per tuned channel. Thus, PC-video optical server can utilize either one or all of these digital streams and be able to co-distribute the video content of these given channels along the MPEG-2 transport stream groomed for optical video on demand traffic.

Furthermore, the PC-Video Optical server 1004 is capable of tuning to a plurality of cable TV channels and, therefore, be able to deliver more than a single channel's worth of digital video stream. For example, the PC-video optical server 1004 could possibly tune differentially to 3 channels, which would then potentially result in 24 separate MPEG-2 digital streams. In this configuration, a given subscriber can be delivered a specific cable broadcast feed directly to his subscriber UIP client. In addition, FIG. 19 also illustrated a video farm system controller 1002. The video farm system controller 1002 is primarily responsible for directing the actions of the PC-video optical server 1004 and the general system of behavior of the FIG. 19 video farm element. The video farm system controller also interacts with the rest of the network for general configuration and optimization. Video caching within the PC-video optical server 1004 is also supported. Furthermore, general video striping methodologies of the UIP server are also incorporated within the PC-Video optical server 1004. The PC-Video optical server 1004 can cache more popular movies within a hard drive, such as the boot drive. In this configuration, the DVD players 1006, 1008, 1010, and 1012 are utilized for less frequently accessed video content.

2. Other Portal Services

Figure 21A:
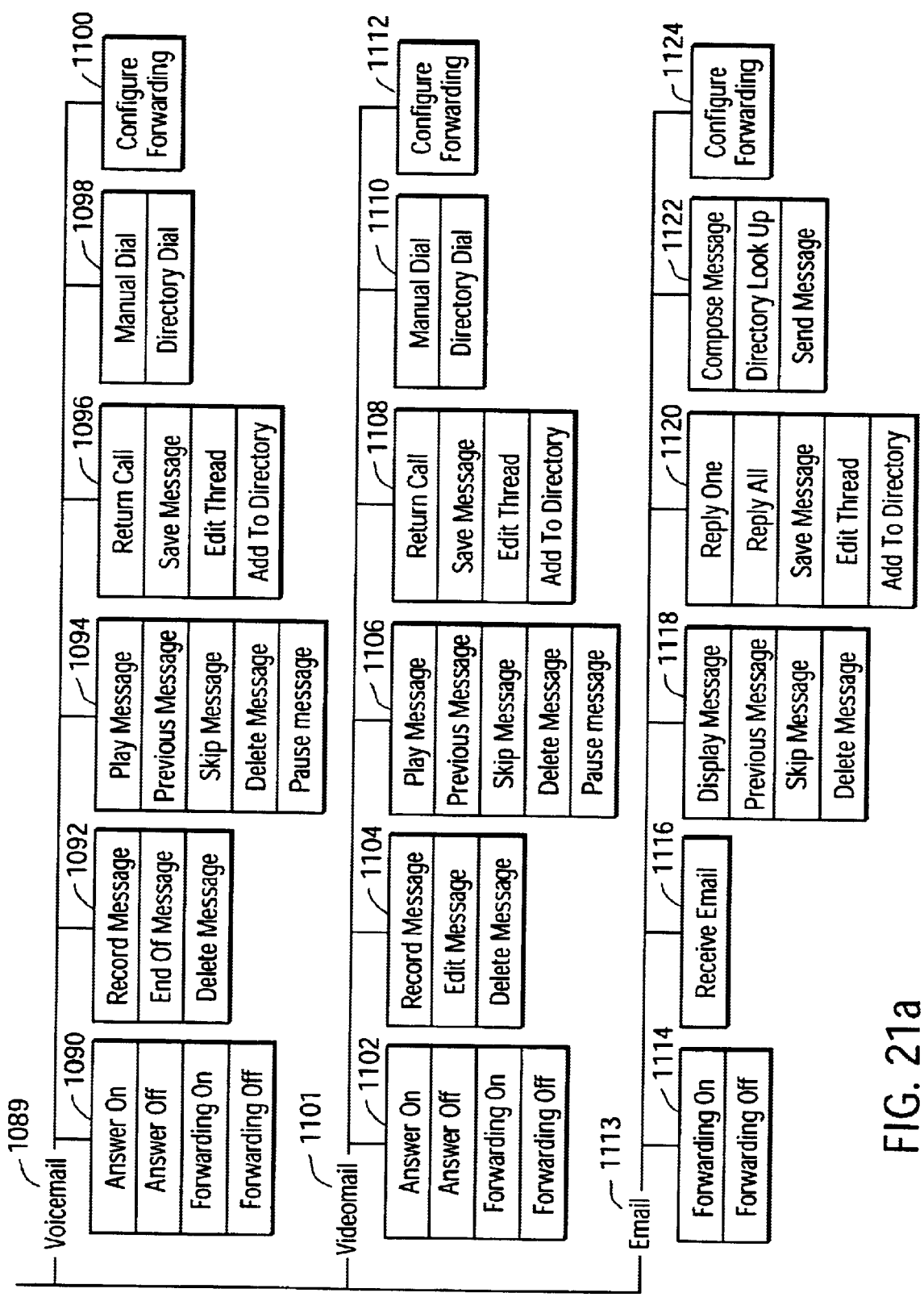
FIGS. 21a, 21b and 21c are diagrams showing a menu of services and options according to one embodiment of the present invention.

The Unified Internet Portal supports a number of services at the portal entry point wherein a subscriber can select from one to a plurality of services based on his management profile. FIGS. 21a, b and c exemplify a typical menu diagram of services and options. The specific service supported by the menu tree is illustrated by the title within the line branch. FIG. 21a illustrates the options and capabilities the subscriber has available to him at every stage.

If the voice mail 1089 option is selected the subscriber is then able to select from a range of different events. The user can cause one of several events, such as an answer event 1090. The subscriber is able to select from a number of options within the answer event 1090, namely, answer on, answer off, forwarding on or forwarding off as illustrated by section 1090 in FIG. 21a. If an answer event 1090 is not selected then a message event 1092 could be selected. The caller is able to select from a number of options within a message event 1092, namely record a message, edit a message, or delete a message. The message 1092 event is a caller perspective event. The message event 1092 is what the caller initiates as he is leaving a message, or chooses to delete a message, or edits his own message. The message event 1092 is not the subscriber perspective event as when the subscriber chooses to listen to the messages. If a message event 1092 is not selected then a play event 1094 could be selected. When the subscriber chooses to listen to his messages, he selects the play event 1094. The subscriber is able to select from a number of options within a play event 1094, namely, play a message, play previous message, skip message, delete message, or pause message. If the subscriber chooses to pause a message he can then either continue to play the message by reasserting pause, or he can begin to replay the message from the beginning by re-asserting play. When the subscriber selects an action event 1096, he causes an action to the present message. He can choose between the following actions, return the call, save the message, edit the thread or add to the directory. The edit the thread option enables the system to add a custom thread message associated with the voice mail message that is currently active. The subscriber can then classify the related messages on a thread basis. The thread classification can either simply classify the content of the conversation, or on the basis of to-do lists for the subscriber. The add to directory option within action event 1096 of FIG. 21a illustrates the ability of being able add the caller of the current message to a directory. Other options available during the voice mail option is the dialing event 1098. The dialing event 1098 option enables either a manual dial capability or a direct dial capability. Another event that can take place is a manage event 1100. A manage event 1100 in FIG. 21a illustrates a configuration option, or a configure forward event. The configure forward action enables the subscriber to control and select what specific configuration/action can take place, such as forwarding a call, or configuring for e-mail notification via paging.

If the videomail 1101 option is selected the subscriber is then able to select from a range of different events. The subscriber can cause one of several events, such as an answer event 1102. The answer event 1102 is similar to the answer event 1090 giving the subscriber the ability to enable the answering capability through answer on, or disable the answering capability through answer off, or to enable forwarding capability through forwarding on, or to disable the forwarding capability through forwarding off. The subscriber can cause a message event 1104. If the message event 1104 is selected the caller has the choice of several message options namely, record message, edit message and delete message. The message event is driven by the calling party for composing the message to the subscriber and is not the action that the subscriber takes to actually listen to his messages. The subscriber can cause a play event 1106. If a play event is selected the subscriber has the choice to either play a message, play a previous message, skip a current message, delete message, and pausing a message. A paused message could then be continued by reasserting the pause option pause. An action event 1108 can be caused by the subscriber to either return a video mail, or save the message, or edit a thread, or add to directory. The subscriber can also cause a dialing event 1110. A dialing event 1110 of FIG. 21a illustrates two different means of dialing an outgoing video message namely, either manual dial, or direct dial. The videomail 1112 illustrates a manage event 1112. One of the things that a manage event 1112 can do is to configure forwarding capability, such as paging numbers, or e-mail paging notification.

If the e-mail 1113 option is selected the subscriber is then able to select from a range of different events. The subscriber can cause one of several events, such as an forwarding event 1114. The forwarding event 1114 gives the subscriber the ability to either enable the forwarding action upon receipt of an e-mail, or to disable the forwarding action upon receipt of an e-mail. The answer event of 1102 and 1090 does not exist within the scope of e-mail since the e-mailer assumes that the system is always able to accept a message. A message event 1116 is analogous to the message event 1104, except that the e-mailer does not have any interactive ability, thus the subscriber can only select the condition of either receiving the e-mail or refusing it. The receive option selects a global refusal of delivery to all senders. Various filtering options within the manage event enable a sender based, or address based, or subject based, or content based filtering. The subscriber has the option of selecting a view event 1118. The view event is responsible for displaying the message, or displaying a previous message, or skipping the current message, deleting a specific message. The subscriber further has the option of selecting a reply event 1120. When a message is read it is possible for the subscriber to directly either reply to the sender, reply to the sender and everybody else who has received the message, simply save the message, edit the topic of the thread for classification, or to add the sender or anyone else on the mailing list to the directory. Within the e-mail 1113 service option the subscriber can cause a compose event 1122. A compose event 1122 allows the subscriber to compose a message. The recipient can be selected within the compose event either through a directory lookup or a direct entry, and finally the compose event 1122 allows the subscriber to send the message. The subscriber within the email 1113 service option can cause a manage event 1124. In one embodiment of the present invention, the subscriber only has the option of configuring forwarding action.

Figure 21B:
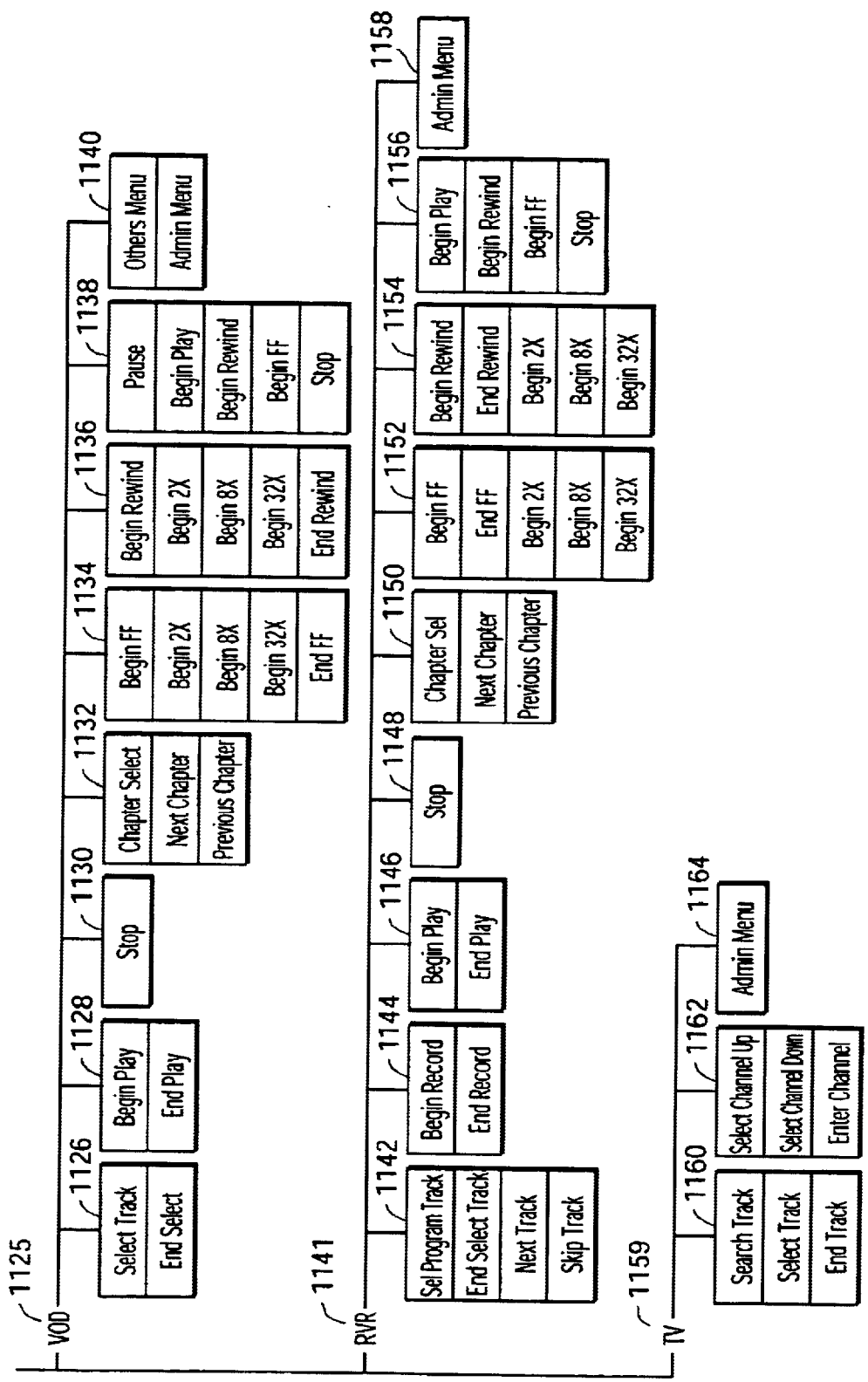

FIG. 21b is a continuation of the exemplary typical menu diagram of services and options of the unified Internet portal. One embodiment of the present invention incorporates the capability of semi-interactive content delivery, such video on demand, remote video recording capability, and broadcast television capability. If the voice on demand 1125 option is selected the subscriber is then able to select from a range of different events. The user can cause one of several events, such as a program event 1126. The program event enables the subscriber to select a track and then within the track be able to select a specific movie selection that is available in the video on demand capability. Once a track has been selected and a movie selected, program event 1126 then enables the subscriber to be able to end the selection process and thereby configures that particular movie or track to be played on a demand basis. Once a movie has been selected the subscriber is capable of asserting a play event 1128. Within the play event 1128, the subscriber has the capability to either begin playing the video on demand or else to end playing the selected video on demand. If a selected movie is not completed by the subscriber certain service provider based remuneration capability exists where the subscriber can select to continue watching the movie at a later time, or pay a more nominal price for the movie. To support short interruptions, one embodiment of the present invention supports the capability of asserting a stop event 1130. A stop event 1130 is differentiated from an end play option of the play event 1128 in that the end event actually terminates the movie session, whereas, the stop event stops it temporarily. The subscriber only has the option of stopping the currently selected movie within the stop event 1130. In addition to the stop event 1130 the subscriber has the capability of selecting a chapter event 1132. The chapter event 1132 enables the subscriber to actually skip portions of the selected movie and be able to skip to either a next chapter or be able to review a previous chapter. The policy within this capability is set by the service provider. The general methodology available in one embodiment has the capability to log the specific events so that the service provider can select custom billing methodology. If a Video on Demand event is selected the subscriber is capable of inserting a fast forward event 1134. The fast forward event 1134 enables the subscriber to either fast forward the movie, play the movie at a two times mode, play the movie at a eight times mode, play the movie at a thirty two times mode, or to be able to stop the fast forward event. Analogous to the fast forward event 1134 is the rewind event 1136. The rewind event 1136 enables the subscriber to either rewind the movie, rewind and reverse play the movie at a two times mode, rewind and reverse play the movie at a eight times mode, rewind and reverse play the movie at a thirty two times mode, or to be able to stop the rewind event. In addition to the rewind and fast forward events another event available is a pause event 1138. The pause menu event enables the subscriber to be able to pause a movie for some indefinite period of time, begin playing the movie after the pause function, directly go into a rewind mode, or directly go into a fast forward mode or else to stop the movie for a longer, indefinite period of time. The differentiating factor between a stop and a pause function is that during a pause event, the current content of the video is displayed, whereas in the case of the stop event some alternative background banner or screen is displayed. In addition to the pause event 1138 the subscriber can select a miscellaneous event 1140. The subscriber has the capability of accessing the administrative menu from the miscellaneous event 1140.

3. Remote Video Recording

Analogous to the Video on Demand, 1125 event, is the RVR event 1141. The RVR event represents a remote video recording capability where, based upon a subscribers selection, a segment of a broadcast service, either an Internet broadcast or a TV broadcast, across the UIP server architecture can be recorded. The subscriber is able to play, rewind, fast forward the remotely recorded broadcast stream. The functionality is analogous to the VOD except the fact that in the case of the RVR event 1141 the segment of data that has been stored on the UIP server is targeted towards single subscriber premises. Thus, the RVR event 1141 is viewed in context of a given subscriber or a given set of subscribers. Selection events available for the RVR 1141 are, among other things, a program event 1142 which enables the subscriber to either select a program track, end a select track, program a particular selection, skip to a next track, or skip to the previous track. The RVR capability of one embodiment enables multiple track recordings. A given program selected to be recorded, selects the track to use for recording, such as track 1, track 2 up to a service provider selected maximum number. One embodiment implements an aging mechanism wherein old recorded track that the subscriber has recorded earlier can be purged based on a subscriber aging configuration setting. The differentiation between program select and the track select is that once the subscriber has selected a specific track, he then selects which program to record on that track. The program select eventually tags the selected time-slot so that during the associated broadcast the UIP server is able to record the selected program within the selected track. One of the options available during the RVR 1141 option is the record event 1144. This is an interactive capability that enables the subscriber to either begin recording the current television broadcast, or Internet television broadcast, or stop recording it.

Another option available to the subscriber is the play event 1146. The play event 1146 enables the subscriber to either begin playing a given program within a track or to terminate the playing session. The stop event 1148 is analogous to the video on demand stop event where the remote video stream that is currently being viewed is temporarily suspended. A stop event 1148 is differentiated from an end play option of the play event 1146 in that the end event actually terminates the movie session, whereas, the stop event stops it temporarily. The subscriber only has the option of stopping the currently selected program within the stop event 1148. The subscriber has the option of selecting a chapter event 1150. The chapter event 1150 enables the subscriber to select a specific chapter within the remote video recording, or skipping to the next chapter, or skipping backwards to a previous chapter. This capability is directly analogous to the chapter capability 1132 within the video on demand 1125 functionality. The subscriber has the capability to record a video on demand selection within the remote video recorder. This capability is optional and is under the control of the service provider. The advantage to the service provider for providing this capability is that the remote video recording function of the video on demand movie can take place on a available bit rate basis. Whereas the video on demand would need to be delivered on a constant bit rate basis. In this manner the service provider is able to further optimize his network performance.

Within a RVR event 1141, the subscriber has the option of selecting a fast forwarding event 1152. The fast forward event 1152 enables the subscriber to either fast forward the program, play the program at a two times mode, play the program at a eight times mode, play the program at a thirty two times mode, or to be able to stop the fast forward event. Analogous to the fast forward event 1152 is the rewind event 1154. The rewind event 1154 enables the subscriber to either rewind the program, rewind and reverse play the program at a two times mode, rewind and reverse play the program at a eight times mode, rewind and reverse play the program at a thirty two times mode, or to be able to stop the rewind event.

In addition to the rewind and fast forward events another event available to the subscriber is a pause event 1156. The pause menu event enables the subscriber to be able to pause a program for some indefinite period of time, begin playing the program after the pause function, directly go into a rewind mode, or directly go into a fast forward mode or else to stop the program for a longer, indefinite period of time. The differentiating factor between a stop and a pause function is that during a pause event, the current content of the video is displayed, whereas in the case of the stop event some alternative background banner or screen is displayed. In addition to the pause event 1156 the subscriber can select a miscellaneous event 1158. The subscriber has the capability of accessing the administrative menu from the miscellaneous event 1158.

4. Broadcast Television

In FIG. 21*b* a standard broadcast TV capability also exists indicated by the TV option 1159. Once the TV option 1159 has been selected a number of events are available to the subscriber. In particular, a track event 1160 enables the subscriber to search track, to select a track, and to end a track. A track in the context of a television broadcast refers to a general category of selection such as, for example, a comedy track or an adventure track or a drama track. The channel event 1162 enables the subscriber to select the program to watch on a channel basis analogous to the standard cable TV infrastructure. Within the channel event 1162, the subscriber can be either change the channel up or he can change the channel down or he can manually enter a channel number. The channel event, 1162, is made available so that the subscriber is able to use his native, intuitive form of interfacing with a broadcast television system within one embodiment of the present invention. In addition to the track event 1160 and the channel event 1162, the subscriber can select a miscellaneous event 1164. The subscriber has the capability of accessing the administrative menu from the miscellaneous event 1164.

5. Fax Transmissions

Figure 21C:
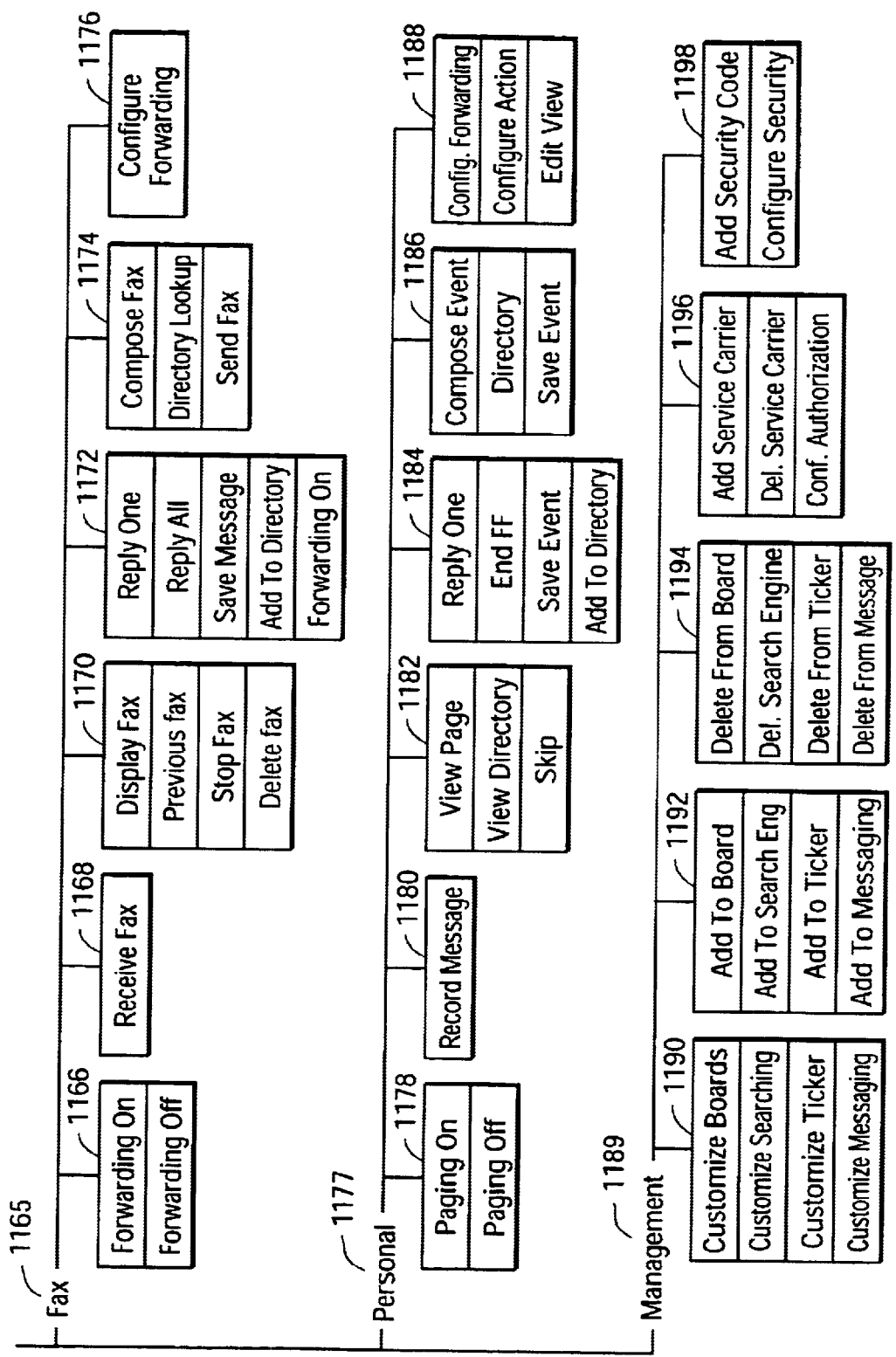

FIG. 21*c* is a continuation of the exemplary typical menu diagram of services and options of the unified Internet portal. One embodiment of the present invention incorporates the capability of fax delivery and composition, as well as configurational capability. FIG. 21*c* illustrates the fax option 1165, the personal option 1177, and the management option 1189, of one embodiment of the present invention. The subscriber has the option of selecting a fax option 165. If the subscriber chooses the fax option 1165, he has the capability of selecting from one of several events. The forwarding event 1166 enables the subscriber to choose to either forward his incoming fax or to cause a page alert or cell phone alert to inform the subscriber that an incoming fax has been received. The specific action is selected within the manage event. The forwarding event 1166 enables the subscriber to either enable the forwarding action, or to disable the forwarding action. A receive event 1168, takes place when a fax is received. Typically, when a fax is received, the unified Internet portal messaging system is notified. The unified Internet portal messaging system is the repository for all messages either incoming, or outgoing. When the unified Internet portal messaging system is notified it in turn reviews the configuration to see if a specific forwarding action is to be taken, as described earlier, and takes the appropriate forwarding action. A view event 1170 enables the subscriber to either display the selected fax, to view a previous fax, to skip to the next fax, or to delete the selected fax with or without viewing it. In addition to the view event it is possible that the subscriber can select a reply event 1172. A reply event 1172 enables the subscriber to reply to a received fax. One embodiment of the present invention enables a unified communications model, in that a unified suite of messaging features are available to the subscriber regardless of the specific form of service being used. Thus the fax messaging event enables the capability of replying to the fax sender. A reply event 1172 enables the subscriber to either a reply to the sender of the fax based on either a name correlation, or a telephone number correlation, or a combination of both. Furthermore, the subscriber can reply to all the receivers on the fax based on either a name correlation, or a telephone number correlation, or a combination of both. In addition to the reply one and reply all, a reply event enables the subscriber to save the message, to edit a thread, and to add the fax sender to a standard directory. The message event 1174 enables the subscriber to either compose a fax, to do a directory lookup based recipient search, and to sent the fax. In addition to the message event 1174 the subscriber has the ability to assert a manage event 1176. The manage event 1176 allows the subscriber to configure the forwarding action such as pager alert on fax reception, automated fax forwarding either via e-mail or via faxing upon fax reception, as well as cell phone alert upon reception.

6. Paging, Messaging and Management Functions

The personal option 1177 of FIG. 21*c* illustrates a page event. The page event 1178 enables the subscriber to configure an embodiment of the present invention to cause a page. The subscriber has the option of either enabling the paging capability or disabling the paging capability. The manage event 1188 enables the subscriber to configure the paging event 1178. The manage event 1188 allows for multiple number paging capability. Forwarding action can be configured such as page upon fax, email, or voicemail. The manage event 1188, also enables the subscriber to edit the view. Edit view is the ability to select a specific look and feel of the unified Internet portal. Within the edit view there are be a number of menus to customize and program the specific look and feel of the various components of the unified Internet portal. Within the personal option 1177 the subscriber can cause a message event 1186. A message event allows the subscriber to compose a personal event, to perform a directory look-up, and finally to send an event.

One embodiment of the present invention has the capability of responding to a page and be able to take paging services. The receive event 1180 allows the unified Internet portal messaging system to receive an event. An event is defined as any processable piece of data delivered to the unified Internet portal messaging system with the intent of causing a follow-up action. The specific action is configured by the subscriber. An example of a personal event would be a stock quote. The unified Internet portal messaging system can be programmed to send a page to the subscriber if a given stock hits a certain price. Thus, the unified Internet portal messaging.system is either notified of the current price of the selected stock, or is simply notified of the qualifying event. Based on the configuration within the manage event, the unified Internet portal messaging system notifies the subscriber by sending a page, or by calling his cellular number with a message. A view event, enables the subscriber to view any paging events and their associated received events. The subscriber has the capability to either view the page, view a previous page, or simply skip the current page. The view event 1182, the reply event 1184, and the compose event 1186 would all three be a function of how the system was configured.

FIG. 21*c* exemplifies a simple paging mechanism, however multiple Internet based forwarding actions can be taken such as configure paging so that when, for example, a specific stock hits a certain price the subscriber is directly notified either through phone, page, e-mail, or which-ever mode of communication the subscriber so chooses. In the case where a page event response is required, multiple receiving parties can be paged based on a received page event. If, for example, a stock price has hit a particular ceiling the personal option 1177 can be configured to compose an event 1186 indicating the stock name and the price. The composition of an event can either automatically send the event to a recipient list, or can be configured for manual intervention. In addition, a directory look-up exists which enables a specific event to be correlated to a specific set of individuals so that more than one individual can be notified of a specific event, and multiple recipient lists can be maintained.

The subscriber can cause a reply event 1184 in case of a received event 1177. A reply event is an action caused as a consequence of a prior event such as a prior receive event 1180. Several options are available within the reply event 1184, namely, reply one to reply back to the sender of the event, reply many to reply to a list of multiple recipients, save event to save the event, and add to directory to save the name of the sender to a directory. A view event 1182 enables the subscriber to view a specific event. It also enables the subscriber to view a previous event such as a previous page or to skip the current event and go to the next event.

FIG. 21*c* further illustrates the management option 1189 that the subscriber can choose within the exemplary typical menu diagram of service and options of the unified Internet portal. The management option 1189 enable the subscriber to choose from a number of events. A customize event 1190 enables the management of the specific look and feel of the Unified Internet Portal entry page and includes such capability as, customize boards which enables customization of the boards accessible to the subscriber, customize the search engines, customize the ticker, customize messaging which allows customization of the initial access into the unified Internet portal messaging system. The subscriber can choose to assert the add event 1192. An add event 1192 enables the subscriber to add a board to the unified Internet portal entry page, add a search engine, add a new ticker, add to messaging. The add a new ticker option configures the unified Internet portal entry page to display either the new ticker info within an existing ticker zone, or generate an entirely new ticker zone. Furthermore, the add to messaging option allows adding display fields within the various messaging screens. The subscriber can for example, add a weather board to be able to get access to weather services from the unified Internet portal entry page, or add a search engine such as altavista, or to add the price of IBM and any news on IBM to the ticker zone. A delete event 1194 is analogous to the add event except it accomplishes the opposite of the add event. The delete event 1194 enables the subscriber to delete a board from the unified Internet portal entry page, to delete a specific search engine, delete a ticker item or ticker zone, delete from messaging. The authorization event 1196 enables the subscriber to authorize the use of specific service carriers and policies. The subscriber has the ability to add specific services carriers to the selection of authorized service carriers, to delete specific service carriers from the selection of authorized service carriers, and to configure the authorization codes required for a per transaction based service authorization. Furthermore, the subscriber has the capability to configure the authorization event 1196 so that specific security codes are mandated for specific service usage. The subscriber can assert a security event 1198 that enable the subscriber to adding a security code, to configure the various security options of the subscriber and the multiple users of the services.

N. System Configuration and Initialization

Figure 22:
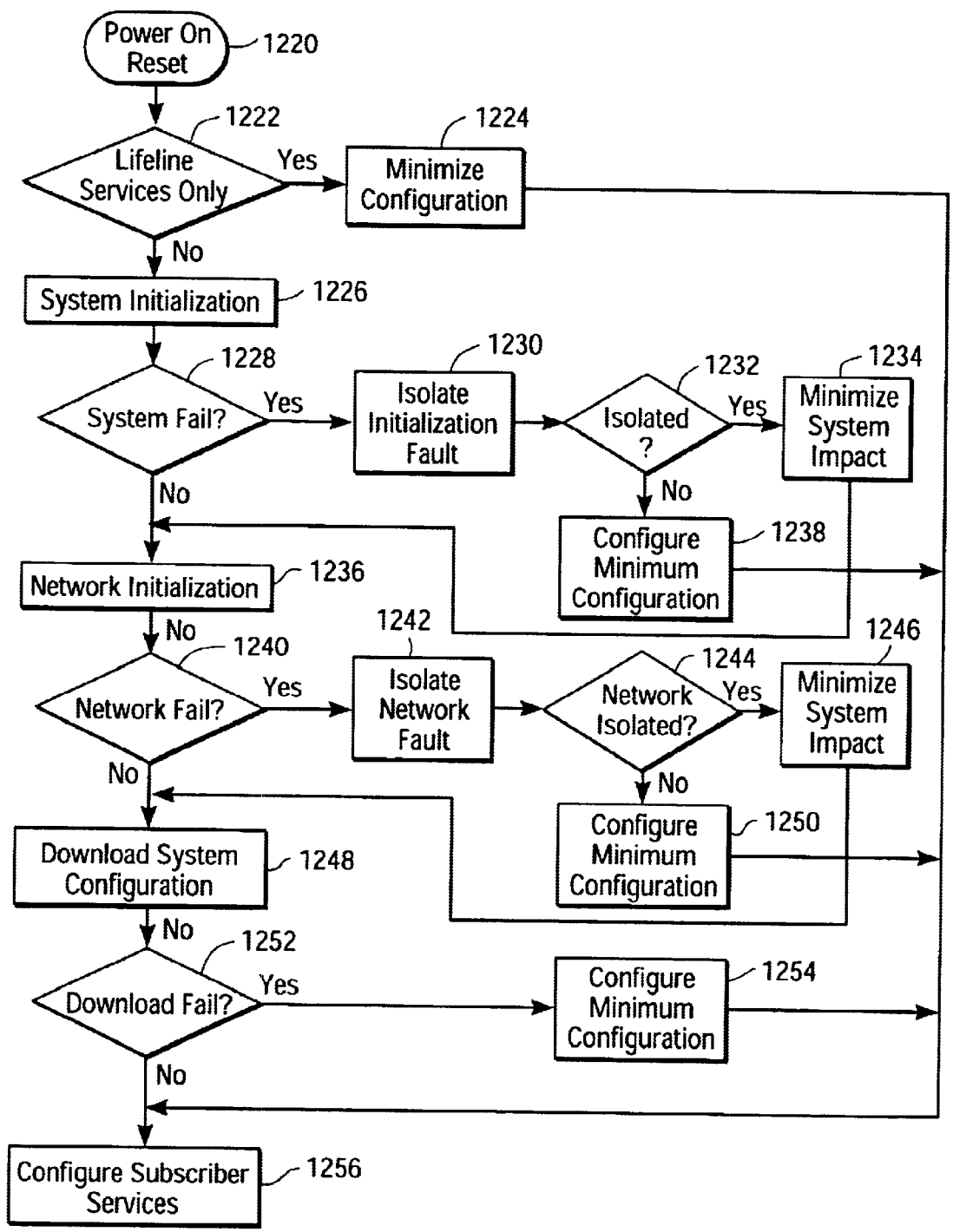
FIG. 22 is a flow chart setting forth an initialization method for self straping.

One embodiment of the present invention has the ability upon the application of power to be able to be able to come up in a minimum default configuration without the aid of any storage device such as a hard drive or a remote storage area network. FIG. 22 illustrates the algorithmic flowchart for the self strapping capability and the typical power on initialization for the self strapping mechanism. The Power on Reset 1220 state is asserted when either power is applied or a reset is asserted within the system. Once the system has configured itself from a reset condition, the system attempts to determine if an external power outage condition exists by the query Lifeline services only 1222. If the lifeline service only determination is answered affirmatively, the system is placed in a standby mode wherein power is conserved to maximize the length of service. Accordingly, video and data service can be terminated based on a service provider configuration, and the system placed in a standby mode. The system is configured to be a minimal voice only configuration as indicated by minimize configuration 1224. Once the system has been configured as a minimized configuration 1224 the system then advances to the configure subscriber services 1256 based on the minimal configuration 1224. The configure subscriber services 1256 notifies the subscriber that only voice services are available and specifically that the central office is in a lifeline services only mode and consequently no data or video services are enabled.

If a lifeline service only 1222 query does not detect a lifeline service only condition then the system advances to the system initialization 1226. Once initialization is complete the system is queried by the fail query 1228. The fail query 1228 attempts to determine if the system was initialized with the appropriate system initialization parameters. If the fail 1228 determines that the system failed to initialize appropriately then the system proceeds to isolate initialization fault 1230. Once an initialization fault is isolated by the isolated 1232 query the system is placed in a minimal system impact 1234 mode. In a minimal system impact mode 1234, the system determines the fault condition and isolates it by providing a pathway around the fault where possible. For example, if one of the DSP resource is determined to be at fault, the system utilizes load sharing methodologies for circumventing the failed sub system. After a minimal system impact mode 1234, the system proceeds to the network initialization 1236 module. In the case where a fault that caused the system initialization failure is not isolated by the isolated 1232 query, the system is configured into a configure minimum configuration 1238. The system then proceeds to the configure subscriber services 1256. The configure subscriber services 1256 notifies the subscriber that the system is in a minimal configuration mode and the specific reason for it being that certain system initialization failures have occurred. Once the subscriber is aware of why the failure occurred and what services are available the UIP client is automatically configured.

When the system completes the network initialization 1236 module, the system is queried by the network fail 1240 query. The network fail 1240 query attempts to determine if the network was initialized with the appropriate network initialization parameters. If the network fail 1240 query determines that the network failed to initialize appropriately then the system proceeds to isolate network fault 1242. Once a network fault is isolated by the network isolated 1244 query the system is placed in a minimize network impact 1246 mode. In a minimize network impact 1246 mode the system determines the fault condition, isolates it by providing a pathway around the fault where possible. For example if one of the ports of the chassis network switching element 1038 is determined to be at fault, the system utilizes load sharing methodologies for circumventing the failed port. After a minimize network impact 1246 mode the system proceeds to the download system configuration with extended OS kernel 1248 module. In the case where a fault that caused the network initialization failure is not isolated by the network isolated 1244 query the system is configured into a configure minimum configuration 1250. The system then proceeds to the configure subscriber services 1256. The configure subscriber services 1256 notifies the subscriber that the system is in a minimal configuration mode and the specific reason for it being that certain network initialization failures have occurred. Once the subscriber is aware of what the failure is and what services are available the UIP client is automatically configured.

When the system completes the download system configuration with extended OS kernel module 1248, the system is queried by the download fail 1252 query. The download fail query 1252 attempts to determine if the system was downloaded with the appropriate code. If the download fail query 1252 determines that the download failed to initialize appropriately then the system proceeds to configure minimum configuration 1254. Once the system has been configured into a minimum configuration 1254. The system then proceeds to the configure subscriber services 1256. The configure subscriber services 1256 notifies the subscriber that the system is in a minimal configuration mode and the specific reason for it being that the system failed to download the code. Once the subscriber is aware of what the failure is and what services are available the UIP client is automatically configured. If the download fail 1252 query determines that the download was successful, the download fail 1252 query notifies the subscriber that the system is fully configured. Once the subscriber is aware of successful configuration the UIP client is automatically configured with the full suite of authorized services.

O. Service Provider Capabilities

Figure 25A:
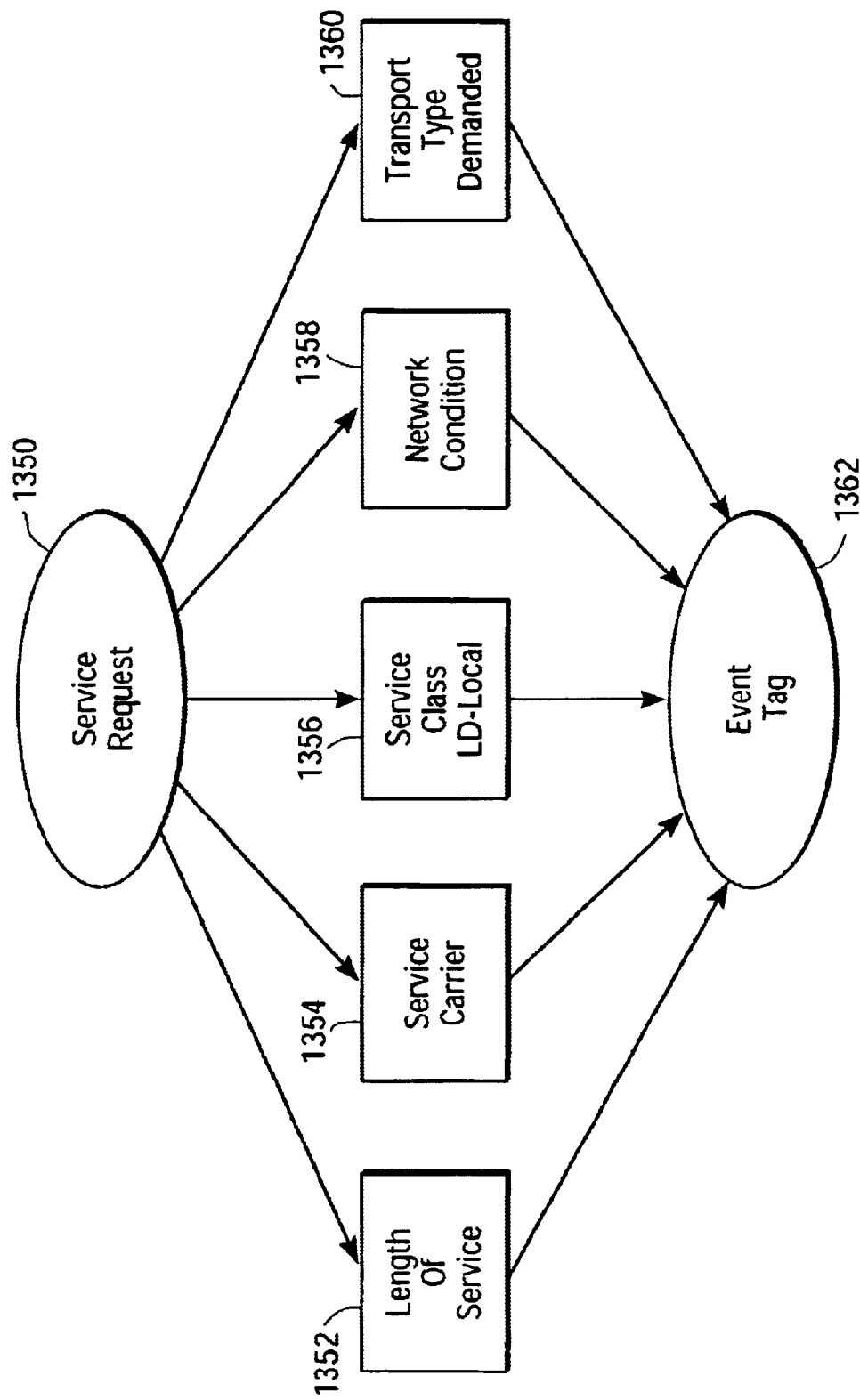
FIGS. 25a and 25b outline the bandwidth on demand event tag mechanism and the event based debit charge and monthly billing model associated with the bandwidth on demand event tag.
Figure 25B:
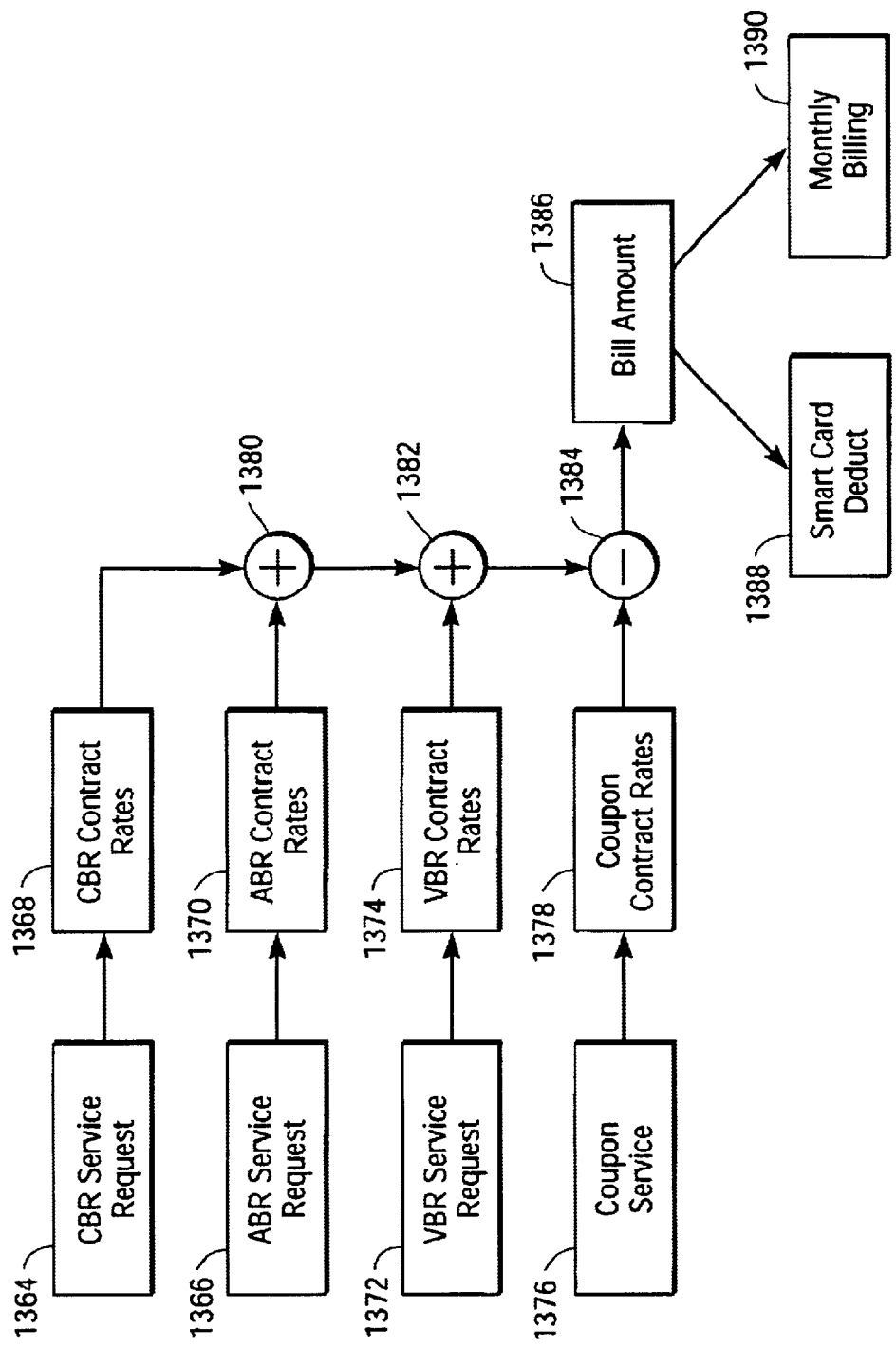

One of the enabling capabilities of certain embodiments of the current invention is that it is possible to deliver a variable class of services. FIGS. 25a and 25b outline the bandwidth on demand event tag mechanism and the event based debit charge and monthly billing model associated with the bandwidth on demand event tag. In one embodiment of the present invention, the subscriber has the capability to select one or more service parameters. For example, service request 1350 within FIG. 25a indicates that the subscriber has requested a service.

One of the service parameters the subscriber can select is the transport type 1360, such as SDSL, ADSL or IDSL. When the service request is made by the subscriber, this event is logged with the transport type demanded. Another service parameter the subscriber can select is the network conditions 1358, such as congested during ABR, uncongested during VBR. When the service request is made by the subscriber he chooses the traffic type such as constant bit rate CBR, available bit rate ABR, unspecified bit rate UBR, as well as the quality of delivery, such as direct delivery, buffered.delivery, or recorded delivery. This event is logged with the network condition.

Another service parameter the subscriber can select is the service class 1356, such as long distance telephony call or local telephony call. When the service request is made by the subscriber he chooses the class of service such as a VoIP call over the PSTN network, a regular local PSTN call, a VoIP call over the Internet, a video on demand movie, or a remote video recorded program. This event is logged with the class of service. In addition to the service class category, another factor that enters into the bandwidth on demand event tag is the service carrier 1354. The service carrier 1354 represents the specific content provider or link provider whose network resources are eventually utilized beyond the UIP server. For example, a PSTN call may require going across international boundaries to engage with international service carriers having tariffs and different fee structures. This event is logged with the service carrier. Another factor that enters into the event tag is the length of service 1352. A fifteen minute telephone call will necessarily cost more than say a 2 minute telephone call, assuming all other parameters being equal. FIG. 25a illustrates that when a specific service is requested a number of parameters are logged within an event tag, which represents the cost of the carrier. Furthermore, the event tag is finally used to compute the eventual service cost to the subscriber, based on the agreement contract between the subscriber and the service provider.

FIG. 25b illustrates the event based debit charge or monthly billing model. Once the subscriber either requests the service or completes the service transaction, an event tag is generated. In one embodiment, the subscriber can choose to either pay for this event on a smart card deduction basis 1388 (see FIG. 25b). Alternatively, the subscriber can choose to pay for this event on a monthly billing 1390 basis. The computation will be a function of several factors in particular, all the constant bit rate service requests 1364 are multiplied by the CBR contract rates 1368 based on the event tag. The computation then adds 1380 all the available bit rate service requests 1366 are multiplied by the ABR contract rates 1370 based on the event tag. The computation then adds (see FIG. 25b, ref. no. 1382) all the variable bit rate service requests 1372 multiplied by the VBR contract rates 1374 based on the event tag. The computation then subtracts (see FIG. 25b, ref. no. 1384) all the coupon services 1376 utilized by the subscriber multiplied by the coupon contract rates 1388 based on the event tag. The coupon service model enables the service provider to provide incentives for utilizing either introductory services, or to provide a subscriber controlled advertising supported service model. An example of coupon service may be that a local advertiser offers the subscriber the choice of watching a advertisement and in exchange could subsidize the cost of watching the movie by use of coupon service within the event tag model.

The resultant computation of the billing amount 1386 is passed on to either a monthly billing 1390 module, or to a smart card deduct module 1388. The billing module determines the mode of deduction based on the previous level of agreements with the subscriber. If the monthly billing and credit is in place then that amount is posted to a monthly bill at the time of the event. Whereas, if a smart card based deduction is agreed upon then a smart card deduct 1388 module is initiated. The smart card deduct 1388 module directly deducts the required amount from the subscribers credit of the smart card which is inserted in the UIP client. FIG. 25b illustrates a monthly billing 1390 capability and a smart card deduct 1388 billing capability. In either case the billing is accomplished on a event basis.

Figure 26:
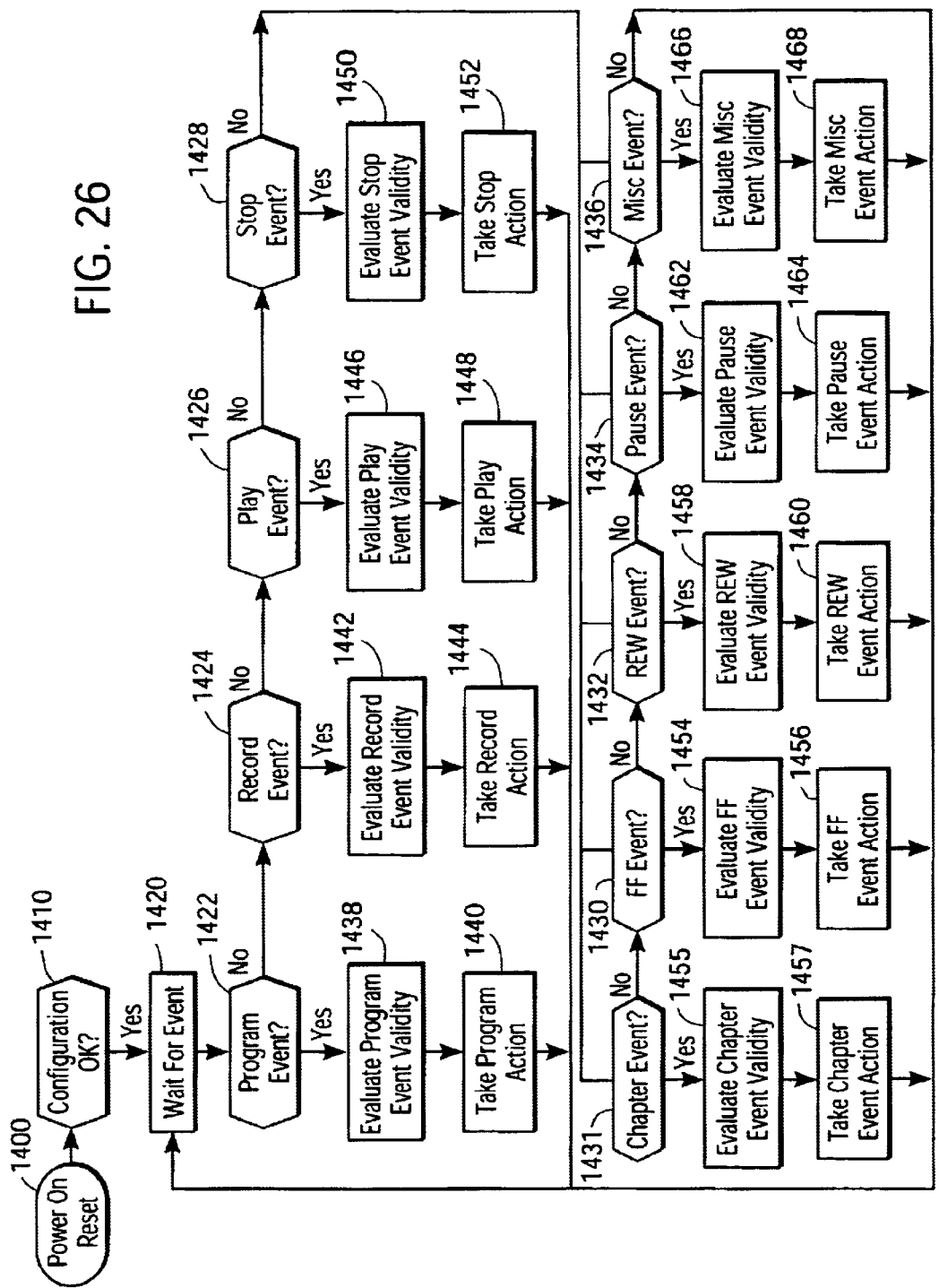
FIG. 26 is a flow chart diagram setting forth a method relating to a remote video recording event.

One embodiment of the present invention supports a number of different service capability, such as remote video recording, video on demand, broadcast tv, video conferencing, video mail, voice mail, email, among others. The general flow diagram of each of these services is unique, however, similarities between the varied services exists. FIG. 26 exemplifies a typical service flow diagram, in particular it illustrates the remote video recorder service flow diagram. When the system is either first powered on, or the system asserts a reset it transfers control to the power on reset 1400 module. The power on reset 1400 is responsible to initialize and configure the system. The system is then queried by the configuration OK 1410 query. If the system fails configuration, the configuration OK 1410 query attempts a preliminary recovery. If no recovery is achieved, the configuration OK 1410 query notifies the system controller. Typically, the system controller would then disable the associated service. If the configuration OK 1410 query determines that the system was configured properly, then the system proceeds to a wait for event 1420 module. The wait for event 1420 module waits for either the subscriber, or an incoming service event to take place, such as a program event, or a record event, among others.

Once an event is detected the system then attempts to determine the source of the event. The system either accomplishes this in parallel or in a serialized fashion. The parallel mode of determination could be made by using an encoded status word. A jump to service routine is computed directly from the state of the status word. A simple example would be a one-hot encoded status word, with the jump to service routine indexed by the status word. Thus, for example, the play event may result in the status word having the value of hexadecimal 01. The jump to service looks up the address at table offset 01 which holds the value of the service routine for the play event. Whereas the pause event may result in the status word having the value of hexadecimal 08. The jump to service looks up the address at the table offset 08 which holds the value of the service routine for the pause event. FIG. 26 however, illustrates a serialized decoding method, where each bit of the status word is evaluated serially. The artifact of such a decoding methodology is that there is an implicit priority encoding as a consequence. The system designer needs to intelligently select the serializing capability to minimize this artifact.

Once an event is detected the system then proceeds to the program event 1422 query. If the program event 1422 query determines that the received event is not a program event the system then proceeds to the record event 1424 query. If the program event 1422 query determines that the received event is a program event 1422 the system then proceeds to the evaluate program event validity 1438. The program event validity 1438 module attempts to verify that the selected program event is valid within the scope of the current state of the system. If the program event validity 1438 module fails to validate the received event the invalid event is reported to the system controller and the system nulls the received event so the take programming action 1440 module effectively passes thru without taking any action. The system then proceeds to the take program action 1440 module which then takes the required valid program action.

If the record event 1424 query determines that the received event is not a record event the system then proceeds to the play event query 1426. If the record event 1424 query determines that the received event is a record event 1424 the system then proceeds to the evaluate record event validity 1442. The record event validity 1442 module attempts to verify that the selected record event is valid within the scope of the current state of the system. If the record event validity 1442 module fails to validate the received event the invalid event is reported to the system controller and the system nulls the received event so the take record action 1444 module effectively passes thru without taking any action. The system then proceeds to the take record action 1444 module which then takes the required valid record action.

If the play event 1426 query determines that the received event is not a play event the system then proceeds to the stop event 1428 query. If the play event 1426 query determines that the received event is a play event 1426 the system then proceeds to the evaluate play event validity 1446. The play event validity 1446 module attempts to verify that the selected play event is valid within the scope of the current state of the system. If the play event validity 1446 module fails to validate the received event the invalid event is reported to the system controller and the system nulls the received event so the take play action 1448 module effectively passes thru without taking any action. The system then proceeds to the take play action 1448 module which then takes the required valid play action.

If the stop event 1428 query determines that the received event is not a stop event the system then proceeds to the chapter event 1431 query. If the stop event 1428 query determines that the received event is a stop event 1428 the system then proceeds to the evaluate stop event validity 1450. The stop event validity 1450 module attempts to verify that the selected stop event is valid within the scope of the current state of the system. If the stop event validity 1450 module fails to validate the received event the invalid event is reported to the system controller and the system nulls the received event so the take stop action 1452 module effectively passes thru without taking any action. The system then proceeds to the take stop action 1452 module which then takes the required valid stop action.

If the chapter event 1431 query determines that the received event is not a chapter event the system then proceeds to the fast forward event 1430 query. If the chapter event 1431 query determines that the received event is a chapter event 1431 the system then proceeds to the evaluate chapter event validity 1455. The chapter event validity 1455 module attempts to verify that the selected chapter event is valid within the scope of the current state of the system. If the chapter event validity 1455 module fails to validate the received event the invalid event is reported to the system controller and the system nulls the received event so the take chapter action 1457 module effectively passes thru without taking any action. The system then proceeds to the take chapter action 1457 module which then takes the required valid chapter action.

If the fast forward event 1430 query determines that the received event is not a fast forward event the system then proceeds to the rewind event 1432 query. If the fast forward event 1430 query determines that the received event is a fast forward event 1430 the system then proceeds to the evaluate fast forward event validity 1454. The fast forward event validity 1454 module attempts to verify that the selected fast forward event is valid within the scope of the current state of the system. If the fast forward event validity 1454 module fails to validate the received event the invalid event is reported to the system controller and the system nulls the received event so the take fast forwarding action 1456 module effectively passes thru without taking any action. The system then proceeds to the take fast forward action 1456 module which then takes the required valid fast forward action.

If the rewind event 1432 query determines that the received event is not a rewind event the system then proceeds to the pause event 1434 query. If the rewind event 1432 query determines that the received event is a rewind event 1432 the system then proceeds to the evaluate rewind event validity 1458. The rewind event validity 1458 module attempts to verify that the selected rewind event is valid within the scope of the current state of the system. If the rewind event validity 1458 module fails to validate the received event the invalid event is reported to the system controller and the system nulls the received event so the take rewinding action 1460 module effectively passes thru without taking any action. The system then proceeds to the take rewind action 1460 module which then takes the required valid rewind action.

If the pause event 1434 query determines that the received event is not a pause event the system then proceeds to the misc event 1436 query. If the pause event 1434 query determines that the received event is a pause event 1434 the system then proceeds to the evaluate pause event validity 1462. The pause event validity 1462 module attempts to verify that the selected pause event is valid within the scope of the current state of the system. If the pause event validity 1462 module fails to validate the received event the invalid event is reported to the system controller and the system nulls the received event so the take pausing action 1464 module effectively passes thru without taking any action. The system then proceeds to the take pause action 1464 module which then takes the required valid pause action.

If the misc event 1436 query determines that the received event is not a miscellaneous event the system then proceeds to the wait for event 1420 module. If the misc event 1436 query determines that the received event is a misc event 1436 the system then proceeds to the evaluate misc event validity 1466. The misc event validity 1466 module attempts to verify that the selected misc event is valid within the scope of the current state of the system. If the misc event validity 1466 module fails to validate the received event the invalid event is reported to the system controller and the system nulls the received event so the take misc action 1468 module effectively passes thru without taking any action. The system then proceeds to the take misc action 1468 module which then takes the required valid misc action.

1. Service System Architecture and Load Sharing

One embodiment of the current invention optimizes the architecture of the system at several levels. In particular, an embodiment utilizes multiple levels of load sharing and load shedding. The system further implements a service striping mechanism for multi-media service storage.

Figure 27A:
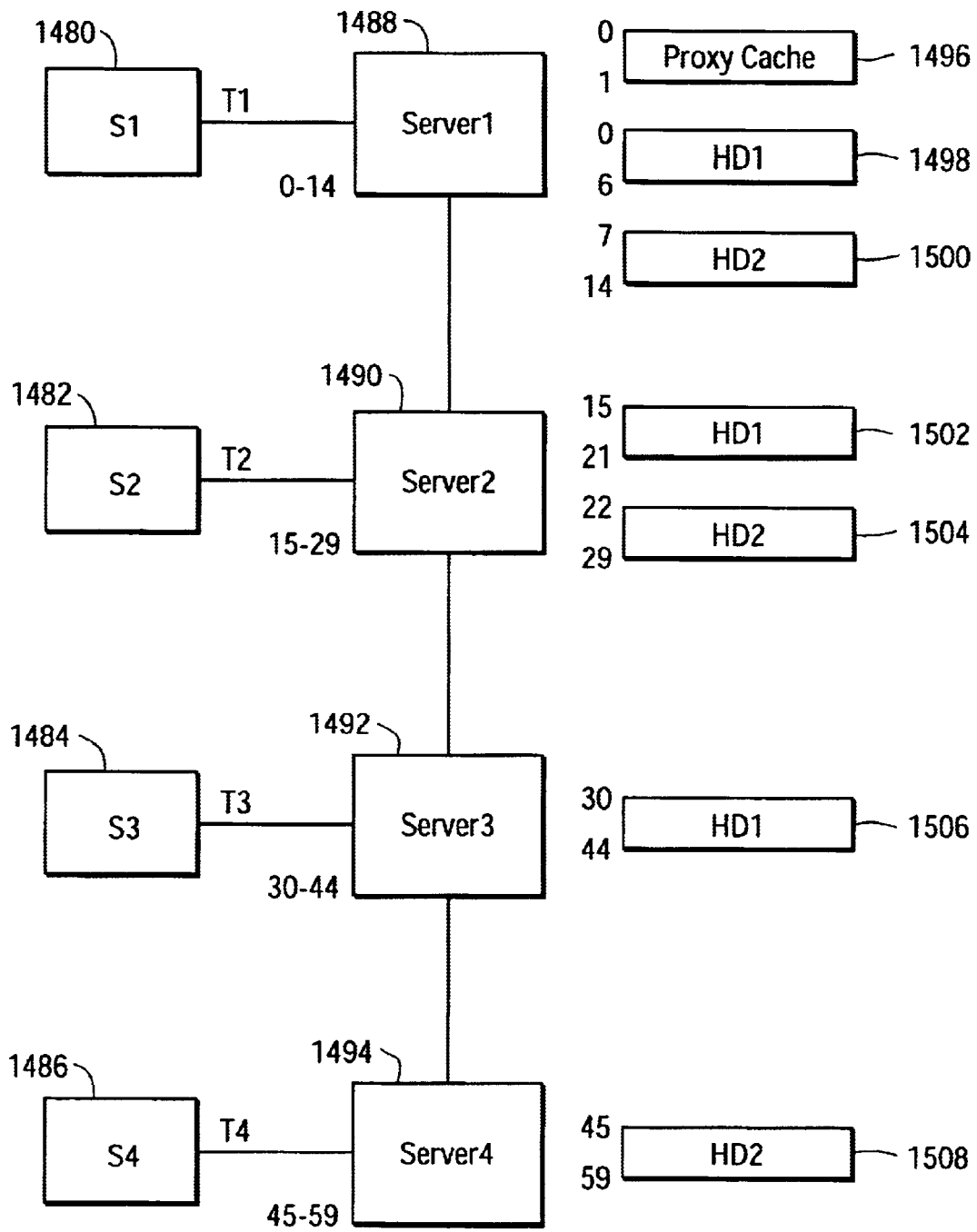
FIG. 27a is a functional block diagram illustrating a service striping model.

FIGS. 27*a*, 27*b*, 27*c* and 27*d* illustrate the video on demand service striping methodology. However, service striping can occur for any data that is delivered to the subscriber either on a dedicated basis or on a shared basis. FIG. 27*a* is a exemplary service striping model which illustrates 4 different subscribers, namely S1 1480, S2 1482, S3 1484, and S4 1486. Subscribers S1, S2, S3, and S4 each requests a movie on demand at time T1, T2, T3, and T4 respectively. One important characteristic of the striping model is that the data for the specific service is spread across a host of servers. FIG. 27*a* illustrates a server1 1488, a server2 1490, a server3 1492, and a server4 1494. Each server hold fifteen minutes of the selected video on demand movie. Even though subscriber 1 and subscriber 2 are serviced by 2 different servers each of them will receive a fifteen minute segment of the selected movie from all 4 servers. An alternative would be for each server to hold a separate copy of the video on demand movie, however, that alternative would require far more storage capability. Furthermore, the alternative model is not easily scalable due to the fact that if a given server gets movie request from several of its native subscribers, his capacity may be exceeded. Whereas the striped service model spreads the video server load across the whole network and the system is much more scalable as a consequence. In the striped service model, the bottleneck becomes a transport limited problem, rather than a server limited problem.

Figure 27B:
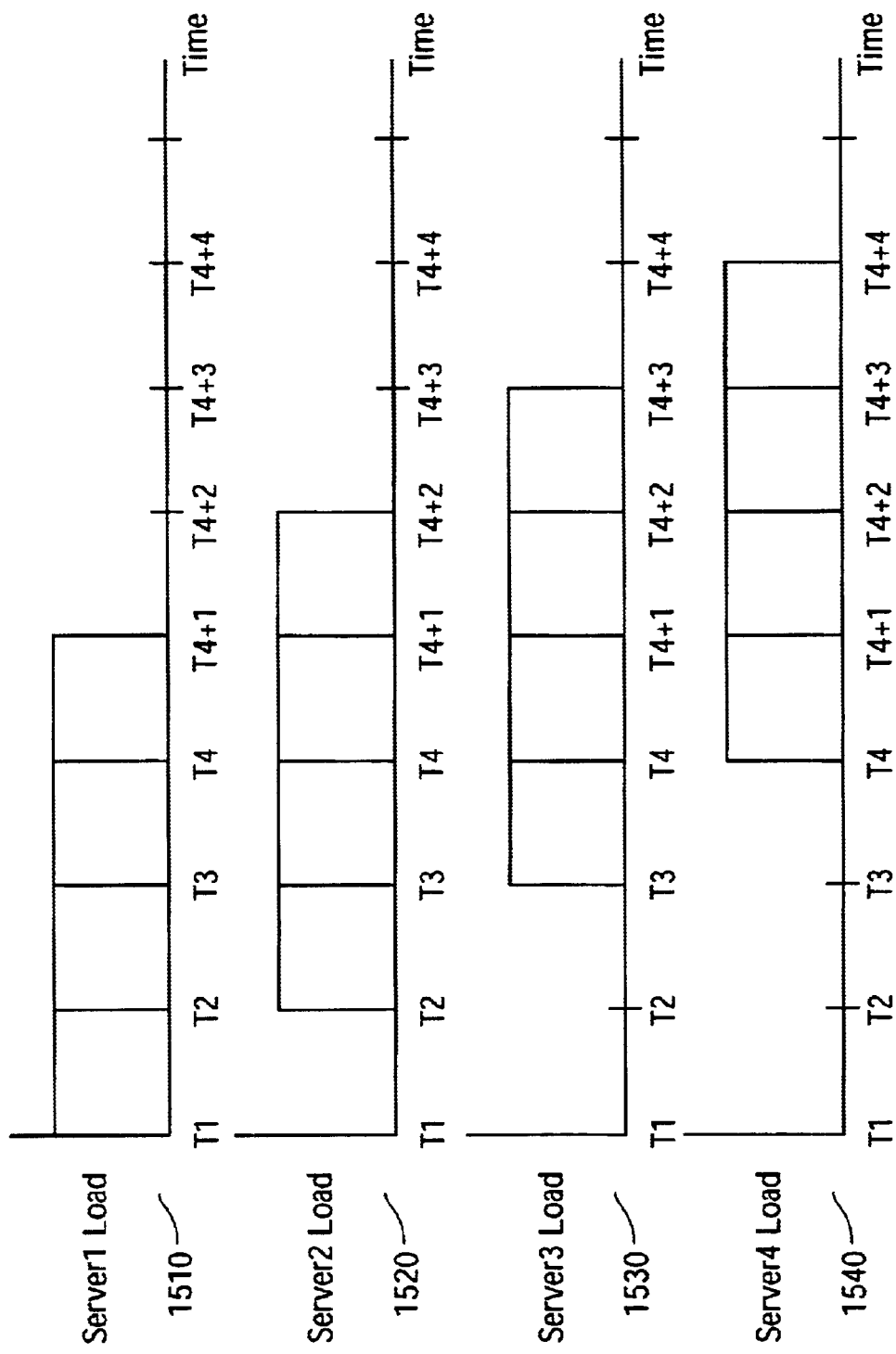
FIG. 27b is a service striping load diagram.

The exemplary diagram of FIG. 27*a* illustrates how server1, server2, server3, and server4 can share resources and be able to statistically average the movie or service on demand load across the whole network. FIG. 27*a* illustrates the ideal scenario where T1, T2 T3 & T4 are all separated by fifteen minute intervals, this is the exactly the striping interval. Thus when S1 requests a movie from server 1 the load on server 1 as illustrated by FIG. 27*b* server1 load 1510 and is unity. In other words, the server1 is playing the first fifteen minutes of the movie for subscriber S1 from the time interval T1 to T2. When S2 requests a movie from server 2 at time T2 the load on server 1 as illustrated by FIG. 27*b* server1 load 1510 is again unity. Thus server1 is playing the first fifteen minutes of the movie for subscriber S2 from the time interval T2 to T3. Similarly server1 is plays the first fifteen minutes of the movie for subscriber S3 from T3 to T4, and then for subscriber S4 form T4 to T5. In this manner the server1 load is unity from the time interval T1 to T4+1 as illustrated in FIG. 27*b* server1 load 1510.

When S1 requests a movie, the second fifteen minutes of the movie are stored at server2. The load on server2 has a latency of the striping interval, and thus the load for server2 is unity starting from the time interval T2 and services subscriber S1 from T2 to T3, then subscriber S2 from T3 to T4, then subscriber S3 from T4 to T4+1, and then subscriber S4 from T4+1 to T4+2. In this manner the server2 load is unity from the time interval T2 to T4+2 as illustrated in FIG. 27*b* server2 load 1520.

When S1 requests a movie, the third fifteen minutes of the movie are stored at server3. The load on server3 has a latency of the striping interval, and thus the load for server3 is unity starting from the time interval T3 and services subscriber S1 from T3 to T4, then subscriber S2 from T4 to T4+1, then subscriber S3 from T4+1 to T4+2, and then subscriber S4 from T4+2 to T4+3. In this manner the server3 load is unity from the time interval T3 to T4+3 as illustrated in FIG. 27*b* server3 load 1530.

When S1 requests a movie, the fourth fifteen minutes of the movie are stored at server4. The load on server4 has a latency of the striping interval, and thus the load for server4 is unity starting from the time interval T4 and services subscriber S1 from T4 to T4+1, then subscriber S2 from T4+1 to T4+2, then subscriber S3 from T4+2 to T4+3, and then subscriber S4 from T4+3 to T4+4. In this manner the server4 load is unity from the time interval T4 to T4+4 as illustrated in FIG. 27*b* server4 load 1540.

As illustrated in FIG. 27*b* the load on each of the server is load balanced and thus no server is over subscribed, even if all the subscribers were native to only a single server. The example cited in FIG. 27*a* and FIG. 27*b* is ideal in the requesting interval is the same as the striping interval. The actual striping interval will vary based on the popularity of the movie, the length of the movie, the number of servers striping the movies, the number of pseudo servers available, among other parameters.

One embodiment of the present invention is further load balanced on a per server basis. Each server in one embodiment of the invention has the capability of having multiple storage elements, for example two hard drives. The striping interval of the specific movie can be further subdivided within he server on a resource basis. Thus if the given server has three hard drives, then the single striping interval for that server can be subdivided into three sub-striping intervals. In the case of a fifteen minute striping interval, each storage element will receive a five minute sub-striped interval.

One embodiment of the present invention further achieves latency balancing by the use of cache service and proxy cache service. Each server shall have the ability to store in volatile memory such as dram the first 1 to few minutes of the striping interval for the most popular movies. The cache service enables the server to immediately begin service for the requested striping interval and absorb the server storage latency. One embodiment further defines a proxy cache. The proxy cache is analogous to the primary cache, except that it is the alternative to the striping cache. Thus if the cache server is unable to meet the performance requirements, then one to a plurality of proxy caches attempt to service the request. FIG. 27*a* illustrates server1 1488 which incorporates two hard drives 1498 and 1500 and a proxy cache 1496. Server2 1490 illustrates two hard drives 1502 and 1504 but no proxy cache. Server3 1492 illustrates a single hard drive 1506, as does server4 1494 hard drive 1508.

In addition to the multi device sub-striping interval, one embodiment implements the concept of striping proxy servers. In this methodology one or more alternative servers are designated proxy servers for the primary servers. If the network loading causes a performance degradation, then one or more proxy servers can be utilized for providing an alternative loading topology. Thus, for example, if the network has 8 servers, server 1 through server 4 can be-designated the primary servers. Whereas servers 5 thru server 8 can be designated proxy servers for server 1 through server 4 for a given movie. Then, alternatively, based on specific statistical basis, for a second movie a different set of servers can be the primary servers and different set of servers can be proxy servers. Once the network detects that a given server is getting over subscribed and is about to reach a congested state, then instead of utilizing that primary server the network has the ability to utilize the proxy server to achieve better load balancing, and thus better network performance.

It is reasonable to assume that a new release of a movie will achieve high usage immediately after release, and then a reduced usage as the movie becomes old. In fact, by using Zipf's law one can make a reasonable prediction regarding the demand for a popular movie, versus a not so popular movie. One embodiment of the present invention utilized this relationship to not only select the striping intervals, the total number of primary server, the length of primary cache, the number of proxy servers, and the number of proxy caches. The striping algorithm is automatic, and is self modifying.

Figure 27C:
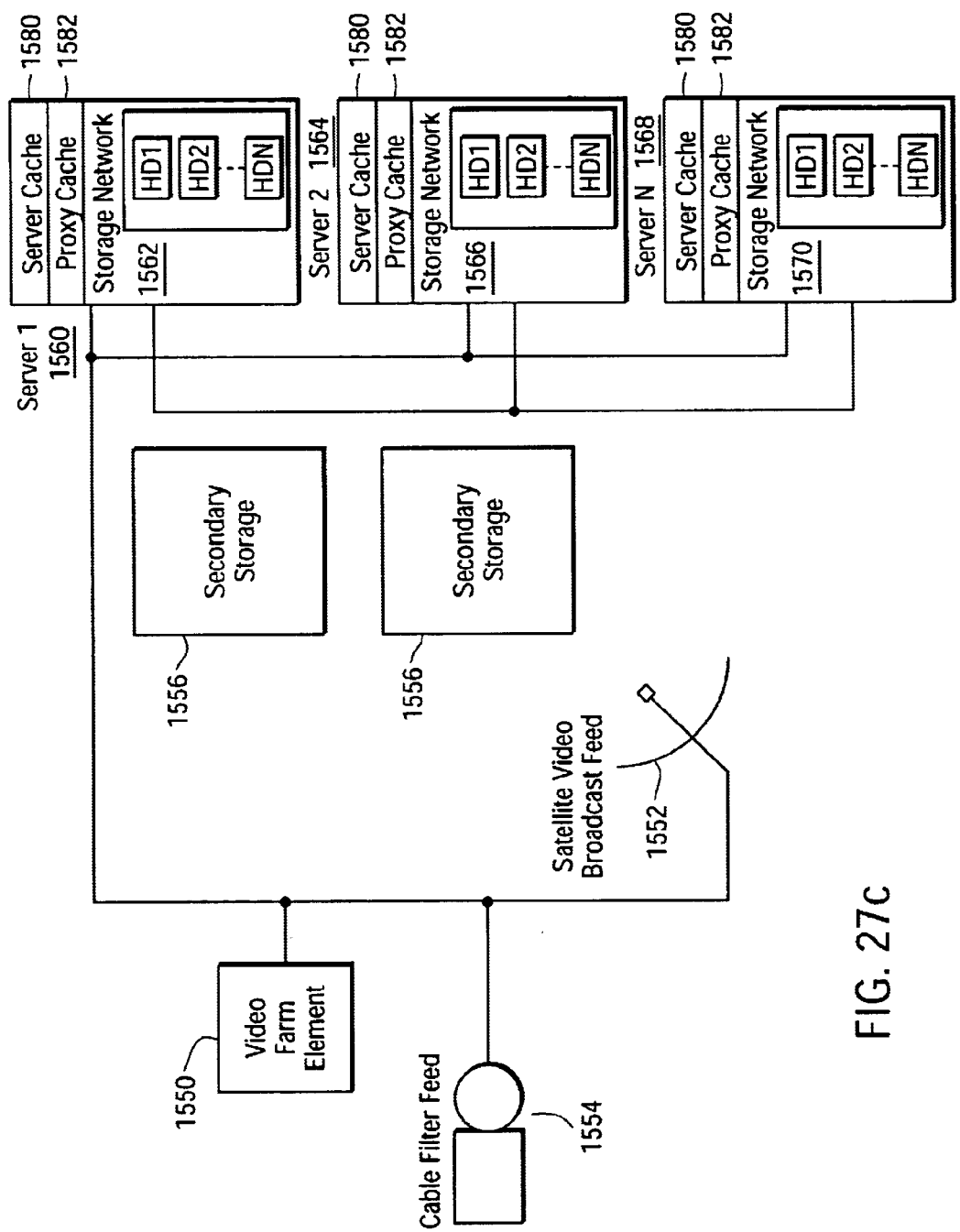
FIG. 27c is a functional block diagram showing a striping architecture topology.
Figure 27D:
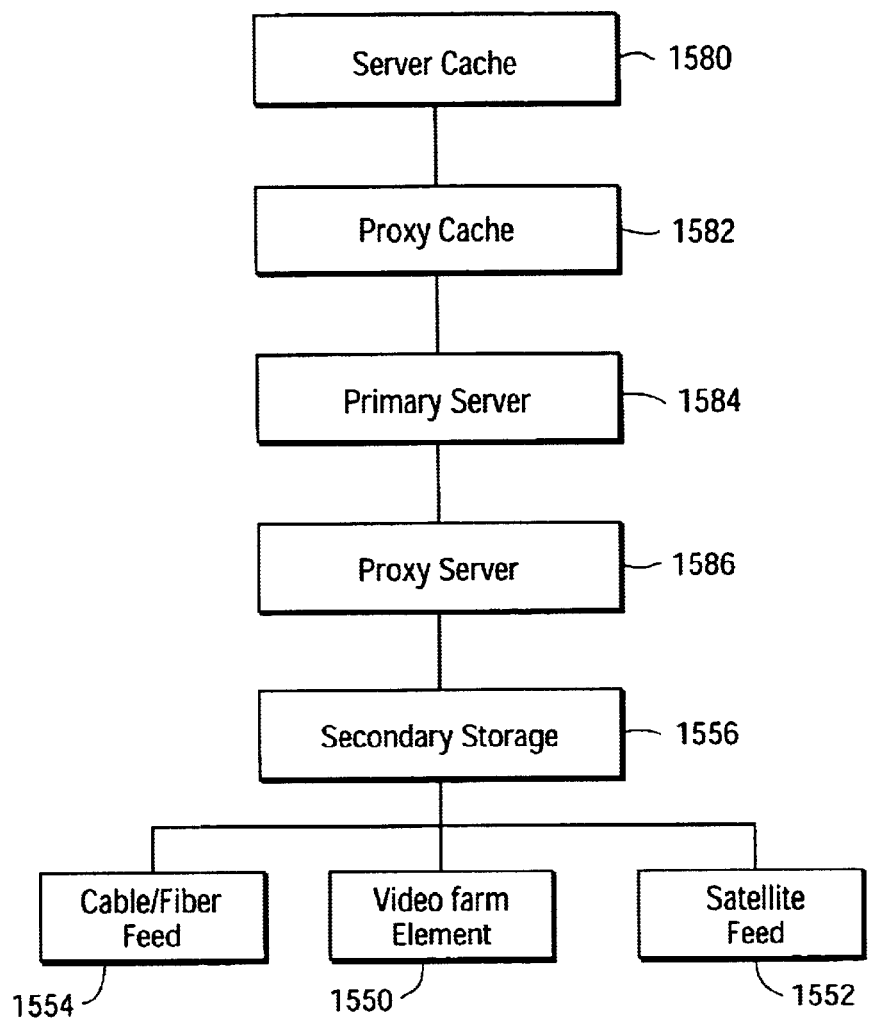
FIG. 27d is a functional block diagram setting forth a striping fetch hierarchy.

FIG. 27c and FIG. 27d illustrate the striping fetch methodology in one embodiment-of the present invention. As noted earlier fetch statistics can be used so that depending on the popularity of the various movies, the striping interval can dynamically allocate storage within the network. A plurality of storage elements exists within the stripping network. FIG. 27d illustrates, a server cache 1580, which is the primary latency reducing semiconductor device based cache. Additionally, FIG. 27d illustrates a proxy cache 1582 as defined earlier. FIG. 27d illustrates a primary server 1584, which has a large hard disk based remote or local storage area network 1562, 1566, 1570, capability. Furthermore, FIG. 27d illustrates a proxy server which is an alternative server within the network for load balancing in case of a server congestion. FIG. 27D and FIG. 27c illustrate a secondary storage 1556. The secondary storage 1556 is a remote magnetic storage device used as a repository for the data content. FIG. 27c and FIG. 27d illustrate a video farm element 1550, a satellite feed 1552, and a cable fiber feed 1554.

2. Smart Card and Debit Card Commerce

Figure 23:
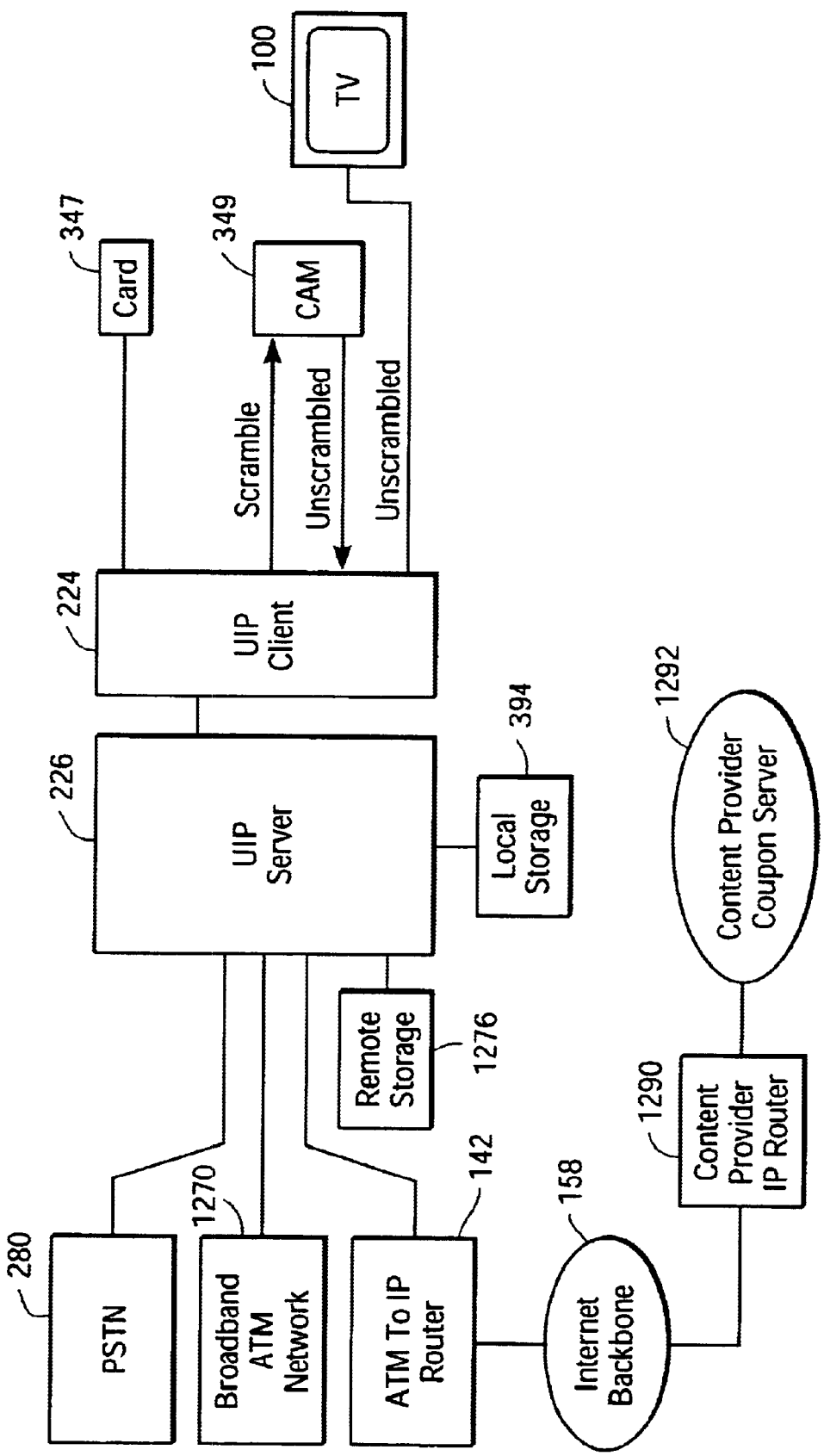
FIG. 23 is a functional block diagram illustrating a smart card-based e-commerce mechanism.

An embodiment of the present invention incorporates the capability of enabling smartcard, debit card, and credit card based electronic commerce solutions. In particular, the UIP client 224 illustrated in FIG. 23 interfaces with a card reader 347. The card reader 347 module may be substituted by a either a debit card reader, a credit card reader, or a smart card reader. The primary characteristic of the card 1284 module is that it is a device to confirm the physical presence and identification of either a smartcard, a debit card or a credit card. In addition to the of card reader 347 module the UIP client 224 also interfaces with a conditional access module 349. The conditional access module has the capability for decryption and encryption of a data stream. The resultant data stream may then be further forwarded to a television set 100. As illustrated in FIG. 23, a content provider coupon server 1292 exists remote to the subscriber and the service provider.

When a subscriber requests an electronic transaction at the UIP client 224, such as among others a purchase of a specific item, or purchase of bandwidth on demand for a video on demand movie, the UIP Client 224 forwards this request to the UIP server 226. The UIP server 226 processes the request to determine the requirements of the transaction. In the exemplary case of a purchase of a video on demand movie, the content provider coupon server is notified for a request for the coupon. The coupon can be limited time decryption key specific for one or more subscribers or UIP clients. In case of a video on demand movie, the contents of the video are already stored within the UIP server 226 network either within the local storage 394 or within the remote storage 1276. However, based on the agreement with the content provider, the content may be encrypted and would demand the need of a decryption coupon to be able to decrypt the content stream. Due to the simplified nature of the decryption coupon, it possible for the UIP server to request the decryption coupon either by use of a Broadband ATM network 1270, or the PSTN network 280, or the Internet backbone 158 by use of an ATM to IP router 142 and an IP router 1290. When the UIP server requests the coupon, the content provider coupon server logs the request for billing purposes, and then issues a decryption coupon.

Once the UIP server 226 receives the coupon from the content provider, it processes the content provider coupon to generate a UIP service coupon. The UIP service coupon is forwarded to the UIP client 224 along with the content stream requested. FIG. 23 illustrates a means of securely delivering content on demand capability wherein the content is distributed in an encrypted or scrambled form within the service providers network. An embodiment provides a means for distributing either encrypted or un-encrypted content stream within the service providers network so that based on the content provider and the service providers agreement the content provider can certify the frequency of use of the content. In this manner, the content provider is able to mitigate content abuse of content stealing and uncompensated royalty payments, among others.

In addition, the combination of the card reader 347 and the conditional access module 349 enables the concept of subscription credits. The smartcard, debitcard or creditcard can be used to authorize specific electronic purchases over the Internet as well as specific communication capabilities such as watching video on demand, or any other functionality within the UIP client 224. A subscription credit is an electronic encrypted cash credit generated by a physical correlation of either one or both a smartcard, debitcard, or creditcard and the specific conditional access module. The physical presence of either one or both separate components at the UIP client 224 generates an encrypted subscription credit, if the smartcard, debitcard or creditcard is so authorized. In case of a smartcard or debitcard, the credit balance is verified, and based on the subscription credit is automatically deducted before completion of the transaction.

The transaction is a two-step process of verifying credit authorization, and then directing the actual transfer. One embodiment of the present invention tags the transaction with the subscription credit tag, so that the physical presence of either or both a smartcard, debitcard or creditcard and a specific conditional access module is required to initiate and complete an electronic commerce transaction. For example, a given smart card can have stored within it certain encryption key which when processed by a specific conditional access module 349 generates a unique combination, in conjunction with the properly authorized amount, the UIP server 226 can authenticate the transaction. Furthermore, the use of a debit based smartcard enables subscriber privacy of the electronic transaction. The debit based smartcard can be purchased through typical retail distribution chains, like 7-Eleven, Albertsons, Safeway, among others.

P. Optimization of Computational Resources

Figure 24A:
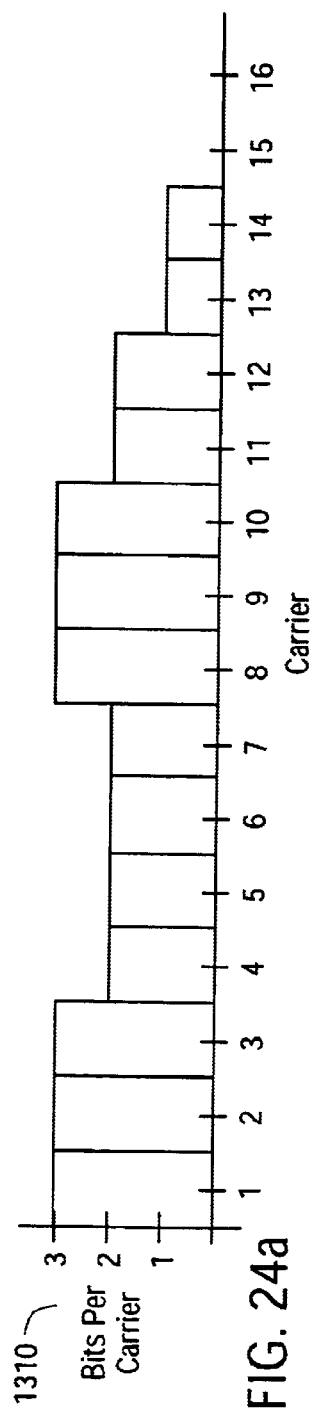
Figure 24B:
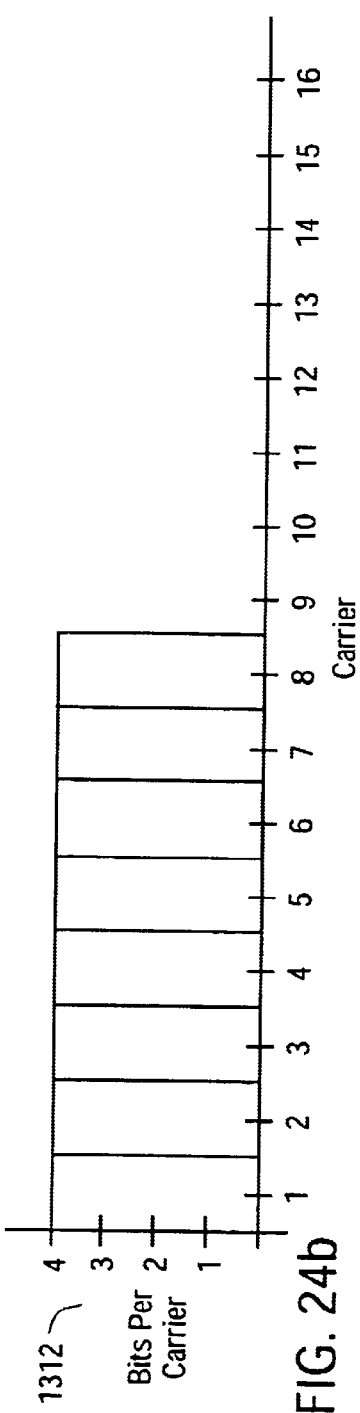
Figure 24C:
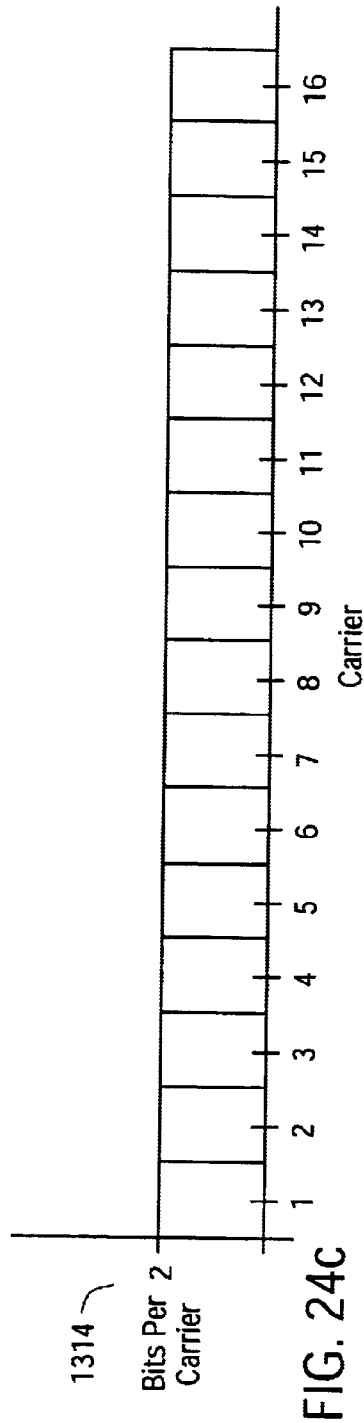

One embodiment of the present invention attempts to optimize computational capability within all levels of the architecture. In the example of ADSL, one of the primary computational penalties of the protocol is the computation of a Fast Fourier Transform (FFT). It is apparent that the FFT computation plays a critical role in the cost of service deployment. This embodiment of the present invention optimizes the FFT computation to increase computational capability. FIGS. 24a, 24b and 24c illustrate one of the computational strategies incorporated within the present invention. In particular, FIG. 24a depicts the bits per carrier versus carrier graph 1310. The Y axis illustrates the number of bits that are encoded per carrier. The X axis illustrates the specific carrier. FIG. 24a illustrates carriers 1 through 14 each carrying differing bits per carrier. In particular, carrier 1, 2, 3, 8, 9, and 10 carry 3 bits per carrier, carrier 4, 5, 6, 7, 11, 12 carry 2 bits per carrier, and carrier 13, 14, carry 1 bit per carrier. Thus the total bit carrying capacity of the channel within FIG. 24a is 32 bits per symbol. In comparison FIG. 24b illustrates carriers 1 through 8 each carrying the same bits per carrier. In particular, carrier 1, 2, 3, 4, 5, 6, 7, 8, carry 4 bits per carrier. Thus the total bit carrying capacity of the channel within FIG. 24b is 32 bits per symbol. In comparison FIG. 24c illustrates carriers 1 through 16 each carrying the same bits per carrier. In particular, carrier 1, 2, 3, 4, 5, 6, 7, 8, 9,10, 11, 12, 13, 14, 15, 16, carry 2 bits per carrier. Thus the total carrying capacity of the channel within FIG. 24c is 32 bits per symbol.

FIGS. 24a, 24b, and 24c all illustrate identical bit carrying capacity, namely 32 bits per symbol. However, the actual computational load is not identical. Due to the nature of the ADSL modulation demodulation and the FFT computation, if a given carrier does not carry any information, the FFT computation does not have to be computed. The training phase of the ADSL protocol negotiates the specific bits per carrier relationship between the UIP server and the UIP client. Thus, at the time of the actual symbol processing for communications, both the UIP server and the UIP client already know what the carrier density profile looks like. The UIP server, UIP client complex require both the use of an Fast Fourier Transform and an Inverse Fast Fourier Transform. The operations of both processes are nearly identical. This document refers to both an IFFT and a FFT interchangeably. It must be recognized that these processes are a means of traversing between the two domains, namely, from time domain to frequency domain, and from frequency domain to time domain. In this regard, the FFT computational load of FIG. 24a is for the total of 14 carriers, of FIG. 24b is for the total of 8 carriers, of FIG. 24c is for the total of 16 carriers. In a fixed precision FFT computation, this can be normalized to a load of 14, 8, and 16 for FIG. 24a, FIG. 24b, and FIG. 24c.

The multiplexed architecture of the present invention utilizes the above relationship to reduce its computational load thereby improving performance and reducing cost of the system. One embodiment of the present invention automatically negotiates a high bit density, low carrier channel when provisioning the channels. Furthermore, through use of dynamic provisioning the system continually attempts to reduce the computational load based on the bandwidth requirements of the subscriber. In this manner, through the use of statistical multiplexing and the shared multi channel FFT computational resources, and computational load sharing this embodiment of the present invention optimizes computational resources within either a fixed precision or variable precision architecture.

FIG. 24d illustrates the use of a smaller fixed precision ALU 1315 and an iteration controller 1316 to compute a larger precision computation. Furthermore, FIG. 24d illustrates a FFT controller 1317 which is an algorithm of a plurality of numerical additions, multiplications, and divisions to compute a FFT of a larger precision number. A larger precision FFT will require more lower precision computations and more cycles through the iteration controller. The exact ratio of the cycles to precision is a function of exact technology and method of implementation. Throughout the discussion of FIG. 24 one embodiment approximates this relationship to a linear ratio. Thus, an 8-bit FFT is approximated to require twice as many cycles as a 4 bit FFT. A 16 bit FFT is approximated to require twice as many cycles as an 8-bit FFT. A 32-bit FFT is approximated to require twice as many cycles as a 16-bit FFT. FIG. 24e illustrates this relationship where a fixed 4-bit precision FFT is normalized to a ratio of 1 cycle, an 8-bit precision FFT is approximated by 2 cycles, a 16-bit precision FFT is approximated by 4 cycles, and finally a 32-bit FFT is approximated by 8 cycles.

FIG. 24f illustrates a quadrature amplitude modulation QAM bit encoding mechanism which is used in one embodiment employing ADSL methodology. FIG. 26f illustrates a graph 1320 of four constellations with a QAM bit encoding of two bits per carrier. Thus four separate points can be transmitted by use of a two bit encoding pair X and Y as illustrated in FIG. 24f. The X and Y values form a complex conjugate pair which is Fourier transformed as a single point associated with a given carrier. In one embodiment, X represents the real term whereas Y represents the imaginary term. The four possible constellation point comprise a single carrier. FIG. 24f illustrates a carrier that has been encoded with two bits of precision due to the signal and noise considerations. FIG. 24g illustrates a carrier that has been encoded with four bits of precision due to the signal and noise considerations. In the example of ADSL technology, the signal to noise of the channel primarily determines the precision of the computational requirements. Thus, for example, if a given carrier has a poor signal to noise, such as in case of FIG. 24f, then doing a high precision computation is futile. It is possible in the exemplary case of a limited precision ALU to conserve the computational requirement by selectively correlating the high signal to noise carriers with high precision computation, and the low signal to noise carriers with low precision computation. In the exemplary variable precision computation model, a fixed 4 bit ALU is used with an associated FFT controller capable of either computing a four bit FFT (4FFT), an eight bit FFT (8FFT), a sixteen bit FFT (16FFT), or a thirty-two bit FFT (32FFT). The algorithm used is selected based on the signal to noise ratios of the correlated carriers. This is illustrated within FIG. 24h and FIG. 24i.

FIG. 24h illustrates a varied bit carrier density. In particular graph 1324 depicts the specific carrier in the X axis, and depicts the associated bits encoded within that carrier in the Y dimension as a consequence of the signal to noise within the channel. The graph 1324 of FIG. 24h illustrates carrier 1 through 8. Carriers 1 and 8 have a four bit encoded density, Carrier 2 has a eight bit encoded density, Carriers 3, 5, 6, and 7 have a two bit encoded density, and Carrier 4 has a six bit encoded density. FIG. 24i illustrates the associated variable precision computation of FIG. 24h. graph 1326 depicts the specific carrier in the X axis, and depicts the associated precision of computation within that carrier in the Y dimension as a consequence of the signal to noise within the channel. The graph 1326 of FIG. 24i illustrates carrier 1 through 8. Carriers 1 and 8 have an eight bit computation precision; Carrier 2 has a thirty two bit computation precision; Carriers 3, 5, 6, and 7 have a four bit computation precision; and, Carrier 4 has a sixteen bit computation precision. Thus, FIGS. 24h and 24i illustrate how the precision of the FFT is managed with a correlation to the total number of bits being carried through the specific channel rather than by a general high precision notations. When a channel does not carry too many bits across some of their carriers then the high precision computations are saved for those situations where a channel does carry the high precision.

FIG. 24j illustrates a high precision total cycle computation based on a smaller fixed precision ALU. The exemplary case of 32 bit high precision is used with a four bit fixed precision ALU. FIG. 24j illustrates the normalized FFT computational load of thirty two four cycles times eight carriers), see FIG. 24e. FIG. 24k illustrates a variable precision total cycle computation based on a smaller fixed precision ALU. The exemplary case of FIG. 24e is used. FIG. 24k illustrates the normalized FFT computational load of the sum of two, four, one, three, one, one, one, and two associated with carriers 1, 2, 3, 4, 5, 6, 7, and eight. The total computational load of FIG. 24k is fifteen. Thus, FIG. 24j and FIG. 24k illustrate a reduced computational load of over fifty three percent.

Q. Automated Subscriber Management

One embodiment of this invention incorporates the capability of providing an automated subscriber management methodology wherein the subscriber is dynamically provisioned. In addition to the event tag based billing methodology which enables varying subscriber provisioning, this embodiment automatically negotiates bandwidth with a service provider upon initial power-up, as well as dynamically.

Figure 7:
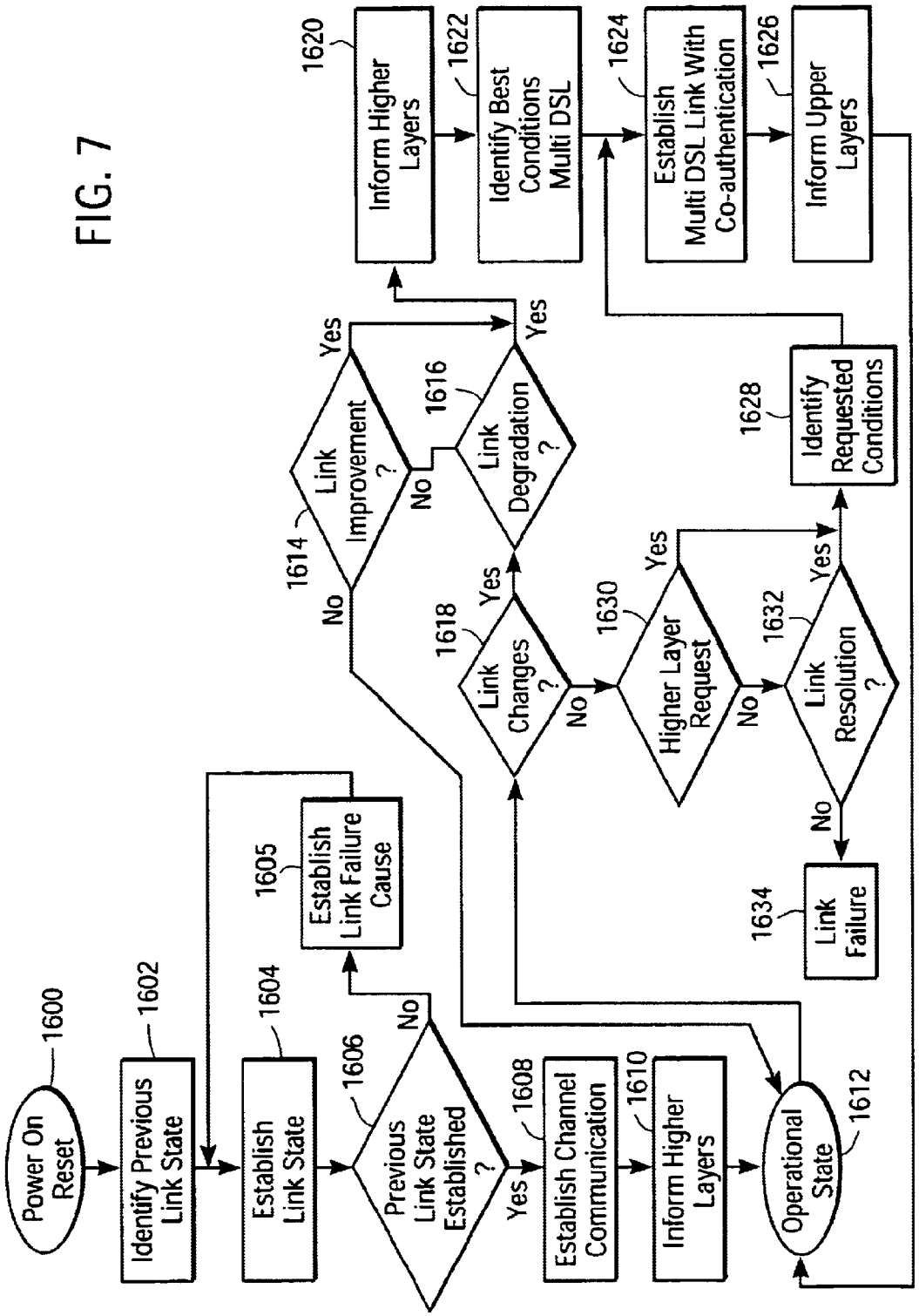
FIG. 7 is a flow chart setting forth a method for subscriber provisioning.

FIG. 7 illustrates a UIP Client based flow chart for subscriber provisioning and illustrates specific negotiation between the subscriber and service provider equipment. FIG. 7 illustrates an exemplary flowchart for subscriber provisioning, in that the system auto negotiates with the service provider and establishes a best use communications channel. Additionally, the subscriber has the capability to manually configure a link within the service level agreement of the service provider.

More specifically and as FIG. 7 shows, a power up reset 1600 algorithm is granted control upon a system reset due to either initial power up or a power outage condition. The system tries to identify the previous link state 1602 and tries to establish the previous link state 1604. Once the previous link state is identified, establishment occurs as long as no specific parameters have changed. The system then attempts a previous link state established 1606 query. The previous link state established 1606 query attempts to query the state of the link to see if the previous required state has been established. If the previous link state established 1606 query reports that the previous link state was not established, the process is forwarded to the establish link failure cause 1605. The establish link failure cause 1605 attempts to identify the failure and isolate it to attempt re-establishment of a link state circumventing the failure cause. The system then proceeds to the establish link state 1604.

Alternatively, if the previous link state established 1606 query reports that the previous link state was established, the process is forwarded to the establishment of the communications channels 1608. The system then proceeds to inform higher layers 1610. The system then proceeds to establish an operational state 1612.

Once an operational state is established the system waits for an event to cause operational state change. If such an event takes place, the system then proceeds from the operational state to a link changes 1618 query. If the link changes 1618 query determines that no link change has occurred the system is further queried to see if the request was a higher layer request 1630. If the higher layer request 1630 query determines that no higher layer request 1630 was made then the system queries to see if can achieve link resolution 1632. It the system is unable to achieve link resolution 1632, then the system proceeds to report link failure 1634 and waits for direction of the system controller. If the link resolution 1632 query determines that the system was able to achieve link resolution, the system then proceeds to identify the requested conditions 1628. The system then advances to establish multi-DSL link with central office authentication 1624. The system then proceeds to inform upper layers 1626. The system then proceeds to operational state 1612.

If the higher layer request 1630 query determines that the cause of the transition out of operational state was due to a higher layer request 1630, the system then proceeds sequentially through the following states, identify requested conditions 1628, establish multi-DSL link with central office authentication 1624, inform upper layers 1626, and finally to operational state 1612. If the link changes 1618 query determines that the cause of the transition out of operational state was due to a link change then the system proceeds to the link degradation 1616 query.

If the link degradation 1616 query determines that the cause of the transition out of operational state was not due to degradation in the link, the system then proceeds to the link improvement 1614 query. If the link improvement 1614 determines that the cause of the transition out of the operational state was not due to an improvement in the link, the system then proceeds to operational state 1612. If either the link degradation 1616 query determines that the cause of the transition out of the operational state was due to the degradation in the link, or the link improvement 1614 query determines that the cause of the transition out of the operational state was due to the improvement in the link, the system then proceeds to inform higher layers 1620. Inform higher layers 1620 notifies the higher layers of the protocol stack that the previous line conditions are no longer valid. The system then proceeds to the identify best conditions multi-DSL 1622. The identify best conditions multi-DSL 1622 routine identifies the best operational conditions, based on the service provider agreements, and the line conditions, and the subscriber requests. The system then proceeds sequentially through the following states, identify requested conditions 1628, establish multi-DSL link with central office authentication 1624, inform upper layers 1626, and finally to operational state 1612.

What is claimed is:

1. An apparatus for an intelligent scalable switching network comprising a unified Internet portal server (UIP Server) having multi-line capability, wherein the UIP server comprises a single server chassis incorporating all of a plurality of processing elements, the UIP Server being capable of providing a plurality of services using a Digital Subscriber Line (DSL), the UIP Server being located remote from a Subscriber Location (SL); and a unified Internet portal client (UIP Client) incorporating functionality of a Customer Premise Equipment (CPE) DSL Modem, the UIP Client being capable of communicating with the UIP Server via a network to provide a service to a subscriber using the UIP Client, wherein the UIP Client is capable of deploying DSL capability, the UIP Client being located at the SL.

2. The apparatus of claim 1, wherein the DSL capability is configured for the UIP Client remotely via software.

3. The apparatus of claim 1, wherein the DSL capability is a DSL standard selected from the group consisting of SDSL, ADSL, HDSL, VDSL and IDSL.

4. The apparatus of claim 1, further comprising a storage element wherein the storage element stores configurational capabilities and initialization parameters for operation of the apparatus.

5. The apparatus of claim 4, wherein the storage element is a hard disk drive.

6. The apparatus of claim 5, wherein the hard disk drive is located in the UIP Server chassis.

7. The apparatus of claim 6, wherein the hard disk drive provides for video on demand capability.

8. The apparatus of claim 6, wherein the hard disk drive provides for remote recording capability.

9. The apparatus of claim 4, wherein the storage element is a semiconductor memory.

10. The apparatus of claim 4, wherein the storage element is located at a Central Office (CO).

11. The apparatus of claim 10 further comprising a multi-channel stack controller.

12. The apparatus of claim 4, wherein the storage element is located at a location remote from the CO and the storage element is connected to the UIP Server.

13. The apparatus of claim 12, wherein the connection is via a Wide Area Network.

14. The apparatus of claim 1, wherein the UIP Client includes a self strapping capability whereby the UIP Client can configure basic functionality of the UIP Client.

15. The apparatus of claim 14, wherein the basic functionality of the UIP Client includes initialization parameters for operation of the apparatus.

16. The apparatus of claim 1, further comprising an ATM based interface for interfacing with an ATM network, the ATM based interface is selected from the group consisting of OC-N wherein N is an integer.

17. The apparatus of claim 1, further comprising a video farm element.

18. The apparatus of claim 17, wherein the video farm element is a DVD based optical video player architecture.

19. The apparatus of claim 17, wherein the UIP Server can deliver a video stream to the UIP Client via the single communication line.

20. The apparatus of claim 1, further comprising a standard cable TV interface.

21. The apparatus of claim 20, wherein the UIP Server includes a digital tuner which can be used to tune the UIP Client to a given broadcast signal.

22. The apparatus of claim 1 further comprising a means of multi-channel statistical multiplexing wherein a plurality of DSL channels are treated as a single pool of DSL channels whereby the single pool of DSL channels are dedicated to the single UIP Server chassis such that a first UIP Client has access to all of the resource of the single pool of DSL channels.

23. The apparatus of claim 22, wherein the first UIP Client is charged consistent with the first UIP Client's use of the resource of the single pool of DSL channels.

24. The apparatus of claim 1, further comprising dynamic provisioning wherein a service feature provided to the UIP Client can be configured on the UIP Server from the UIP Client.

25. The apparatus of claim 24, wherein the UIP Client can be configured to use a semi dynamic profile wherein the subscriber can select a first bandwidth and a first performance characteristic of the service and the first bandwidth and the first performance characteristic is set as a preferred configuration.

26. The apparatus of claim 24, wherein the UIP Client can be configured to use a dynamic profile wherein the subscriber can select a second bandwidth specific to an application.

27. The apparatus of claim 26, wherein the application is a symmetric application and the service feature is a symmetric DSL technology.

28. The apparatus of claim 26, wherein the application is an asymmetric application and the service feature is an asymmetric DSL technology.

29. The apparatus of claim 24, wherein the UIP Client can be configured to use a dynamic profile wherein the subscriber can select a second bandwidth specific to a session.

30. The apparatus of claim 1, wherein the plurality of services can be selected from the group consisting of video, voice and data.

31. The apparatus of claim 1, further comprising a set-top box wherein the set-top box is capable of connecting to the UIP Server via the network and the set-top box is capable of requesting data from the UIP Server.

32. The apparatus of claim 31, wherein the set-top box is capable of storing the data received from the UIP Server.

33. The apparatus of claim 31 wherein the network is the Internet.

34. The apparatus of claim 1 wherein the network is the Internet.

35. The apparatus of claim 1, wherein the UIP Server includes an ATM switch whereby the UIP Server is capable of providing a switching capability.

36. The apparatus of claim 1, wherein the UIP Server includes a router whereby the UIP Server is capable of providing a routing capability.

37. The apparatus of claim 1, wherein the UIP Server includes a striping methodology whereby a stream of data is divided into a plurality of data sets, the plurality of data sets being capable of intelligent distribution through the network.

38. The apparatus of claim 37, wherein the striping methodology is used in video on demand.

39. The apparatus of claim 37, wherein the data sets are distributed across a plurality of UIP Servers, the plurality of UIP Servers being located on the network, such that each of the plurality of UIP Servers provides one of the plurality of data sets to each of a plurality of UIP Clients.

40. The apparatus of claim 1, further comprising a unified Internet portal proxy server (UIP Proxy Server) wherein the UIP Proxy Server communicates with the UIP Client during the unavailability of the UIP Server.

41. The apparatus of claim 40, wherein the unavailability of the UIP Server is caused by congestion on the network.

42. The apparatus of claim 40, wherein each of the UIP Server and the UIP Proxy Server include a striping methodology whereby a stream of data is divided into a plurality of data sets, the plurality of data sets being capable of intelligent distribution through the network.

43. The apparatus of claim 1, further comprising a mechanism for load shedding.

44. The apparatus of claim 43, wherein the mechanism for load shedding is performed at a line level.

45. The apparatus of claim 43, wherein the mechanism for load shedding is performed at an application level.

46. The apparatus of claim 1, further comprising a lifeline service capability wherein during a power outage the service provided to the subscriber from the UIP Server only includes a voice support component and a basic DSL Modem functionality support component, whereby the lifeline service capability is available on a plurality of voice extensions through the UIP Client.

47. The apparatus of claim 1, wherein the UIP Server includes a data caching capability.

48. The apparatus of claim 47, wherein the data caching capability is Internet based.

49. The apparatus of claim 1, further comprising a plurality of UIP Servers located on the network, the plurality of UIP Servers providing for a distributed server capability whereby a stream of data is divided into a plurality of data sets, the plurality of data sets being capable of intelligent distribution through the network wherein the data sets are distributed across the plurality of UIP Servers such that each of the plurality of UIP Servers provides one of the plurality of data sets to each of a plurality of UIP Clients.

50. The apparatus of claim 1, further comprising a portable charging mechanism.

51. The apparatus of claim 50, herein the service is content delivery.

52. The apparatus of claim 51, wherein the content is a video feed.

53. The apparatus of claim 50, wherein the portable charging mechanism is a smart card wherein the smart card includes a couponing debit capability whereby the service provided from the UIP Server to the subscriber using the UIP Client can be debited to the smart card, the smart card requiring a decryption coupon that is used to access the service, the service being provided via a unidirectional, secure transmission via the network.

54. The apparatus of claim 50, wherein the portable charging mechanism is a credit card.

55. The apparatus of claim 50, wherein the portable charging mechanism is a debit card.

56. The apparatus of claim 50, wherein the service is e-commerce.

57. The apparatus of claim 1, wherein the UIP Server includes the capability of statistically multiplexed modulation and demodulation.

58. The apparatus of claim 57, wherein the UIP Server includes the capability of statistically multiplexed channel processing.

59. The apparatus of claim 1, further comprising a plurality of ATM traffic support modules.

60. The apparatus of claim 59, wherein the plurality of ATM traffic support modules can be selected from the group consisting of Available Bit Rate, Constant Bit Rate, Variable Bit Rate and Unspecified Bit Rate.

61. The apparatus of claim 1, wherein the UIP Client includes a capability to store recorded video content on the UIP Server.

62. The apparatus of claim 1, further comprising a means for providing voice messaging services.

63. The apparatus of claim 1, further comprising a means for an interactive voice response (IVR) service.

64. The apparatus of claim 1, further comprising a video conferencing capability including a front end located at the SL, the front end being responsible for Analog to Digital conversion, Digital to Analog Conversion, compression and formatting of data, and a back end located at the CO, the back end being responsible for protocol compliance with a video conferencing standard.

65. The apparatus of claim 64, wherein the video conferencing standard is H.320.

66. The apparatus of claim 1, wherein the UIP Client is a UIP Thin Client having only one interface.

67. The apparatus of claim 66, wherein the only one interface is a standard data interface.

68. The apparatus of claim 1, further comprising a storage element wherein the storage element stores application data for operation of the apparatus.

69. The apparatus of claim 68, wherein the application data is stored at the UIP Server.

70. The apparatus of claim 68, wherein the application data is capable of being accessed from a point source.

71. The apparatus of claim 70, wherein the point source is a telephone.

72. The apparatus of claim 70, wherein the point source is a personal computer.

73. The apparatus of claim 70, wherein the point source is a DSL line.

74. The apparatus of claim 68, wherein the storage element is semiconductor memory.

75. The apparatus of claim 1, wherein the UIP Server includes the capability to achieve a power conservation mode during an outage of the UIP Server.

76. The apparatus of claim 1, wherein the UIP Client includes the capability to achieve a power conservation mode during an outage of the UIP Client.

77. A method of providing an intelligent scalable switching network, the method comprising the steps of:

providing a unified Internet portal server (UIP Server) having multi-line capability, the UIP Server being located remote from a Subscriber Location (SL), the UIP Server being capable of providing a plurality of services using a Digital Subscriber Line (DSL);

incorporating all of a plurality of processing elements within a single UIP Server chassis;

providing, at a Subscriber Location (SL), a unified Internet portal client (UIP Client) wherein the UIP Client is capable of deploying DSL capability;

incorporating functionality of a Customer Premise Equipment (CPE) DSL Modem in the UIP Client; and providing for communication of the UIP Client to the UIP Server via a network, whereby the UIP Client is capable of providing a service to a subscriber using the UIP Client.

* * * * *